United States Patent
Ahn et al.

(12) 
(10) Patent No.: US 10,779,233 B2
(45) Date of Patent: Sep. 15, 2020

(54) WIRELESS COMMUNICATION METHOD AND APPARATUS USING WAKEUP RADIO

(71) Applicant: WILUS INSTITUTE OF STANDARDS AND TECHNOLOGY INC., Gyeonggi-do (KR)

(72) Inventors: Woojin Ahn, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 16/138,965

(22) Filed: Sep. 21, 2018

(65) Prior Publication Data

US 2019/0028967 A1 Jan. 24, 2019

Related U.S. Application Data

(63) Continuation of application No. PCT/KR2018/007486, filed on Jul. 2, 2018.

(30) Foreign Application Priority Data

Jun. 30, 2017 (KR) .................. 10-2017-0083855
Jul. 9, 2017 (KR) .................. 10-2017-0086873
(Continued)

(51) Int. Cl.
*H04W 52/02* (2009.01)
*H04B 7/02* (2018.01)
(Continued)

(52) U.S. Cl.
CPC .......... *H04W 52/0216* (2013.01); *H04B 7/02* (2013.01); *H04L 27/0008* (2013.01);
(Continued)

(58) Field of Classification Search
None
See application file for complete search history.

(56) References Cited

U.S. PATENT DOCUMENTS

2017/0142652 A1* 5/2017 Liu .................... H04W 72/046
2018/0295595 A1* 10/2018 Shellhammer ........ H04W 88/06
2018/0376419 A1* 12/2018 Li .................... H04W 52/0235

FOREIGN PATENT DOCUMENTS

KR 10-2011-0069671 6/2011
KR 10-2014-0053857 5/2014
(Continued)

OTHER PUBLICATIONS

International Search Report for PCT/KR2018/007486 dated Oct. 29, 2018, and its English translation from WIPO (published as WO 2019/004803).

(Continued)

*Primary Examiner* — Adnan Baig
(74) *Attorney, Agent, or Firm* — Ladas & Parry, LLP

(57) ABSTRACT

Provided is a wireless communication terminal that communicates wirelessly. The wireless communication terminal includes: a first wireless transceiver for transmitting and receiving a signal modulated by a first modulation method; a second wireless receiver for receiving a signal modulated by a second modulation method different from the first modulation method; and a processor. The processor is configured to receive a wake-up radio frame (WUR frame) from a base wireless communication terminal through the second wireless receiver, and based on the WUR frame, wake-up the first wireless transceiver to receive a beacon frame from the base wireless communication terminal according to a predetermined first reception period through the first wireless transceiver.

12 Claims, 53 Drawing Sheets

(30) Foreign Application Priority Data

| Jul. 13, 2017 | (KR) | ......................... 10-2017-0088869 |
| Aug. 18, 2017 | (KR) | ......................... 10-2017-0104947 |
| Sep. 11, 2017 | (KR) | ......................... 10-2017-0115610 |

(51) Int. Cl.
    *H04L 27/00*     (2006.01)
    *H04W 74/00*     (2009.01)
    *H04L 5/00*     (2006.01)
    *H04W 84/12*     (2009.01)

(52) U.S. Cl.
    CPC ....... *H04L 5/0007* (2013.01); *H04W 52/0229* (2013.01); *H04W 74/006* (2013.01); *H04W 84/12* (2013.01)

(56) References Cited

FOREIGN PATENT DOCUMENTS

| KR | 10-2014-0054071 | 5/2014 |
| KR | 10-2016-0068090 | 6/2016 |
| KR | 10-2017-0057268 | 5/2017 |
| WO | 2019/004803 | 1/2019 |

OTHER PUBLICATIONS

Written Opinion of the International Searching Authority for PCT/KR2018/007486 dated Oct. 29, 2018 and its English machine translation by Google Translate (published as WO 2019/004803).
Notice of Allowance dated Jan. 29, 2019 for Korean Application No. 10-2018-7027881 and its English translation from Global Dossier.
Office Action dated Dec. 14, 2018 for Korean Application No. 10-2018-7027881 and its English translation from Global Dossier.
Notice of Allowance dated Jan. 29, 2019 for Korean Application No. 10-2018-7030334 and its English translation from Global Dossier.
Office Action dated Dec. 15, 2018 for Korean Application No. 10-2018-7030334 and its English translation from Global Dossier.
InTel, LP-WUR (Low-Power Wake-Up Receiver) Follow-UP, doc.: the IEEE 802.11-16/0341r0, Mar. 14, 2016.
Wilus, Wake-up and Data Exchange Sequences, doc.: the IEEE 802.11-16/1470r0, Nov. 8, 2016.
Wilus et al., WUR-based Broadcase Reference Signal, doc.: the IEEE 802.11-16/1217r0, Sep. 12, 2016.
ZTE, Discussion of WUR Packets Design, doc.: the IEEE 802.11-16/1504r1, Nov. 7, 2016.
Hanseul Hong, et al., Multi-User access for Wake-Up Radio, doc.: the IEEE 802.11-16/1243r2, Sep. 13, 2016.
Intel, Consideration of EDCA for WUR Signal, doc.: the IEEE 802.11-16/0652r0, May 8, 2017.

* cited by examiner

WIRELESS COMMUNICATION METHOD AND APPARATUS USING WAKEUP RADIO

CROSS-REFERENCE TO RELATED APPLICATIONS

This application is a continuation of International Patent Application No. PCT/KR2018/007486 filed on Jul. 2, 2018, which claims the priority to Korean Patent Application No. 10-2017-0083855 filed in the Korean Intellectual Property Office on Jun. 30, 2017, Korean Patent Application No. 10-2017-0086873 filed in the Korean Intellectual Property Office on Jul. 9, 2017, Korean Patent Application No. 10-2017-0088869 filed in the Korean Intellectual Property Office on Jul. 13, 2017, Korean Patent Application No. 10-2017-0104947 filed in the Korean Intellectual Property Office on Aug. 18, 2017, and Korean Patent Application No. 10-2017-0115610 filed in the Korean Intellectual Property Office on Sep. 11, 2017, the entire contents of which are incorporated herein by reference.

TECHNICAL FIELD

The present disclosure relates to a method for improving transmission efficiency, and more particularly, to various methods, devices, and systems for improving transmission efficiency by proposing an improved channel access method in a wireless LAN.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

In addition, while developing technology that increases the speed and efficiency of a wireless LAN simultaneously, in order to extend the battery life of mobile devices equipped with a wireless LAN and to equip devices operating based on a very limited power source such as a battery with a wireless LAN, it is necessary to develop an efficient wireless LAN power saving technique. The existing WLAN power saving techniques are methods of periodically entering devices into a sleep mode to reduce power, but in this case, as the power saving efficiency of the device increases, the device wakes up in a longer period, so that communication with the device is further delayed. To solve this problem, it is necessary to study a power saving technique using a separate low-power wake-up radio.

DISCLOSURE OF THE INVENTION

Technical Problem

An object of the present disclosure is to provide a power saving wireless communication terminal using a low power wake-up receiver in a wireless LAN environment.

Technical Solution

According to an embodiment of the present disclosure, a wireless communication terminal that communicates wirelessly includes: a first wireless transceiver for transmitting and receiving a signal modulated by a first modulation method; a second wireless receiver for receiving a signal modulated by a second modulation method different from the first modulation method; and a processor.

The processor may receive a wake-up radio frame (WUR frame) from a base wireless communication terminal through the second wireless receiver, and based on the WUR frame, wake-up the first wireless transceiver to receive a beacon frame from the base wireless communication terminal according to a predetermined first reception period through the first wireless transceiver. The WUR frame may be a frame modulated through the second modulation method, and the beacon frame is modulated through the first modulation method and transmitted periodically.

The WUR frame comprises an indicator that triggers the wireless communication terminal to receive the beacon frame. The processor may receive the beacon frame based on the indicator.

The processor may maintain a state in which transmission and reception through the first wireless transceiver is capable, at least for a predetermined time from an expected reception time at which reception of the beacon frame is expected according to the predetermined first reception period.

The expected reception time indicates the nearest reception period that comes after a WUR reception time of receiving the WUR frame.

The expected reception time indicates the nearest reception period that comes after a PCR transition delay of the wireless communication terminal elapses from a WUR reception time of receiving the WUR frame. The PCR transition delay indicates a time required for transitioning from a state in which transmission and reception through the first wireless transceiver are not capable to a state in which transmission and reception through the first wireless transceiver are capable.

The processor may determinate a wake-up time for waking-up the first wireless transceiver, based on the expected reception time and a PCR transition delay, and wake-up the first wireless transceiver based on the wake-up time. The PCR transition delay indicates a time required for transitioning from a state in which transmission and reception through the first wireless transceiver are not capable to a state in which transmission and reception through the first wireless transceiver are capable.

The beacon frame may be a beacon frame in which group downlink data is subsequently transmitted after transmission of the beacon frame. The group downlink data is transmitted to a plurality of wireless communication terminals including the wireless communication terminal, and indicates downlink data whose receiver address is a group address. The processor may receive the group downlink data transmitted subsequently to the beacon frame from the base wireless communication terminal through the first wireless transceiver based on the indicator.

The processor may maintain a state in which transmission and reception through the first wireless transceiver are capable for a predetermined time from an expected reception time at which reception of the beacon frame is expected according to a predetermined second reception period. The predetermined second reception interval may be set to an integral multiple of the predetermined first reception period.

The predetermined second reception period is longer than the predetermined first reception period.

The processor may receive the group downlink data subsequently transmitted to the beacon frame from the base wireless communication terminal through the first wireless transceiver based on the indicator.

The beacon frame may include bitmap information including a bit indicating whether the group downlink data is buffered in the base wireless communication terminal. The processor may receive the group downlink data subsequently transmitted to the beacon frame based on the bitmap information.

The processor may maintain at least a state in which transmission and reception through the first wireless transceiver are capable based on the bitmap information from an expected reception time at which reception of the beacon frame is expected according to the predetermined second reception period to a time at which at least part of the group downlink data is received from the base wireless communication terminal.

The WUR frame may be a wake-up frame that triggers a wake-up of the first wireless transceiver.

The processor may maintain the first wireless transceiver in a doze state at least for a predetermined time from an expected reception time at which the beacon frame reception is expected according to at least the predetermined first reception period before receiving the WUR frame. The doze state may indicate a state in which transmission and reception through the first wireless transceiver are not capable.

The processor may transmit an awake frame to the base wireless communication terminal after waking-up based on the WUR frame. The processor may receive downlink data in a transmission standby state in the base wireless communication terminal based on a response frame for the awake frame through the first wireless transceiver. The awake frame may indicate a first frame transmitted through the first wireless transceiver after the first wireless transceiver wakes-up.

The processor may determine a downlink data reception sequence for each access category of downlink data through a link establishment procedure with the base wireless communication terminal. The processor may receive the downlink data corresponding to the first AC from the base wireless communication terminal based on the response frame. The first AC may indicate an access category in which the base wireless communication terminal is used to transmit the downlink data.

A frame type of the awake frame may differ from a first frame type requesting the downlink data corresponding to the first AC. At this point, the processor may receive the downlink data based on a reception sequence corresponding to the first AC and the response frame.

The first AC may be an access category in which a service period for receiving a predetermined number of data frame is set based on the awake frame. In addition, the data frame may be a data frame including at least a part of the downlink data. If the frame type of the awake frame is different from the first frame type, the processor may determine that the service period starts from a time point at which the response frame for the awake frame is received, and may receive the downlink data based on the service period.

The data frame may include access category information indicating an access category of the downlink data. The processor may receive a data frame transmitted from the base wireless communication terminal after a time when the response frame was received, and receives the downlink data based on the access category information included in the data frame. The processor may determine that the service period starts from the time when the response frame for the awake frame is received based on the access category information and receive the downlink data based on the service period.

The first AC may be an access category that transmits a data unit including at least a part of downlink data corresponding to the first AC by receiving a frame requesting downlink data corresponding to the first AC. At this point, if the frame type of the awake frame is different from the first frame type, the processor may receive the data unit after a time when the response frame is received.

The frame type of the awake frame may be a second frame type requesting the downlink data corresponding to a second AC. At this point, the second AC may be an access category in which a service period for receiving a predetermined number of downlink data frames is set based on a frame corresponding to the second frame type. The data unit may include access category information indicating an access category of the downlink data. The processor may receive the data unit and transition from a state in which transmission and reception through the first wireless transceiver are capable to a state in which transmission and reception through the first wireless transceiver are not capable from a time when the data unit is received, based on the access category information.

According to an embodiment of the present disclosure, a method of operating a wireless communication terminal that communicates wirelessly includes: receiving a WUR frame modulated by a first modulation method from a base wireless communication terminal; receiving a beacon frame according to a predetermined first reception period from the base wireless communication terminal through wireless transceiver by waking-up the wireless transceiver, based on the WUR frame. The wireless transceiver is a wireless transceiver that receives a modulated frame through a second modulation method different from the first modulation method, and the beacon frame may be a frame modulated through the second modulation method and transmitted periodically.

According to an embodiment of the present disclosure, a base wireless communication terminal that communicates wirelessly includes a wireless transceiver that transmits and receives a signal transmitted in a first modulation method, and a signal transmitted in a second modulation method different from the first modulation method, and a processor.

The processor may transmit a wake-up frame indicating a wake-up of a wireless communication terminal through the wireless transceiver. In addition, the processor may receive a awake frame first transmitted from the wireless communication terminal after transmitting the wake-up frame through the wireless transceiver, and may transmit the downlink data in a transmission standby state in the wireless communication terminal to the wireless communication terminal regardless of the frame type of the received awake frame based on the awake frame.

The processor may determine a downlink data transmission sequence for each access category of downlink data through a link establishment procedure with the wireless communication terminal and transmit the downlink data based on a first AC indicating the access category of the downlink data.

The frame type of the awake frame may be different from the first frame type requesting downlink data corresponding to the first AC. At this point, the processor may transmit the downlink data according to a transmission sequence corresponding to the first AC based on the awake frame.

The first AC may be an access category in which a service period for transmitting a predetermined number of data frame is set by receiving a frame requesting downlink data corresponding to the first AC. In addition, the data frame may be a data frame including at least a part of the downlink data. At this point, if the frame type of the awake frame is different from the first frame type, the processor may set the service period based on the awake frame, and transmit the downlink data based on the service period.

The first AC may be an AC that transmits one data unit including at least a part of downlink data corresponding to the first AC by receiving a frame requesting downlink data corresponding to the first AC. At this point, if the frame type of the awake frame is different from the first frame type, the processor may transmit the one data unit based on the awake frame.

The processor may transmit an immediate response frame for the awake frame and the data unit through a backoff contention procedure after transmitting the immediate response frame.

The downlink data in the transmission standby state may include first downlink data corresponding to the first AC and second downlink data corresponding to a second AC that is different from the first AC, and the first AC may have a higher transmission priority than the second AC. At this point, if the frame type of the awake frame does not correspond to any of the first frame type and a second frame type requesting downlink data corresponding to the second AC, the processor may transmit the first downlink data based on the sequence determined according to the first AC based on the transmission priority.

Advantageous Effects

According to an embodiment of the present disclosure, an efficient power saving operation is performed through a wake-up receiver in a wireless LAN environment, and a subsequent data exchange sequence may be efficiently performed after a device wakes-up.

MODE FOR CARRYING OUT THE INVENTION

Terms used in this specification may be currently widely used general terms in consideration of functions in the present disclosure but may vary according to the intents of those skilled in the art, customs, or the advent of new technology. Additionally, in certain cases, there may be terms the applicant selects arbitrarily and in this case, their meanings are described in a corresponding description part of the present disclosure. Accordingly, terms used in this specification should be interpreted based on the substantial meanings of the terms and contents over the whole specification.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. In addition, the limitations of "more than or equal to" or "less than or equal to" based on a certain threshold value may be appropriately replaced with "more than" or "less than", respectively.

Figure 1:
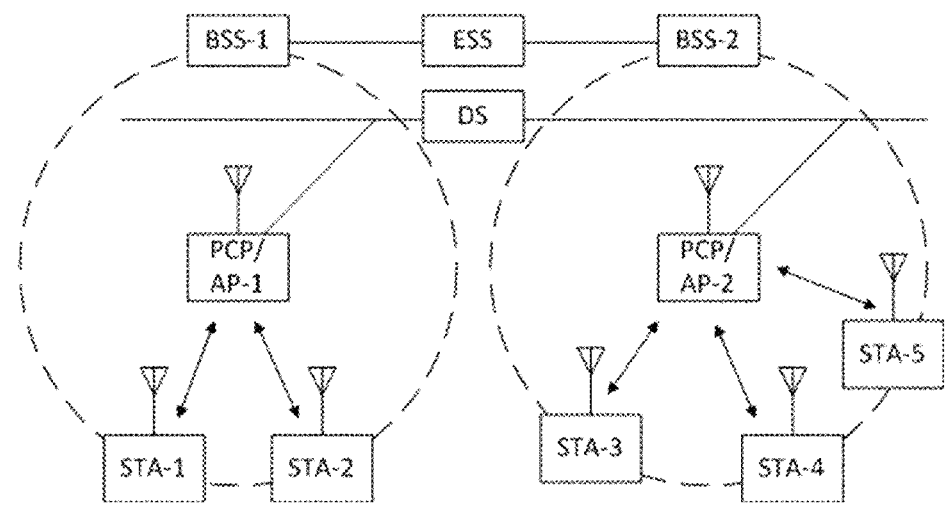
FIG. 1 shows a wireless LAN system according to an embodiment of the present disclosure.

FIG. 1 is a diagram illustrating a wireless communication system according to an embodiment of the present disclosure. For convenience of description, an embodiment of the present disclosure is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The reception of a frame or packet in the present disclosure may indicate a successful reception. For example, successful reception may mean reception determined as not failing through a frame check sequence (FCS) contained in a frame or packet.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present disclosure, the AP is used as a concept including a personal BSS coordination point (PCP) and may include concepts including a centralized controller, a base station (BS), a node-B, a base transceiver system (BTS), and a site controller in a broad sense. A plurality of infrastructure BSSs may be connected with each other through the distribution system (DS). In this case, a plurality of BSSs connected through the distribution system is referred to as an extended service set (ESS).

Figure 2:
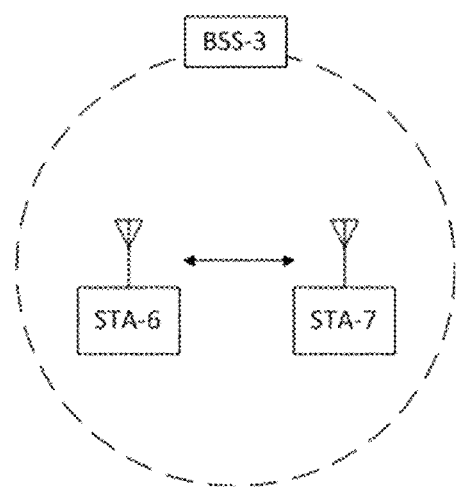
FIG. 2 shows a wireless LAN system according to another embodiment of the present disclosure.

FIG. 2 illustrates an independent BSS which is a wireless communication system according to another embodiment of the present disclosure. For convenience of description, another embodiment of the present disclosure is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
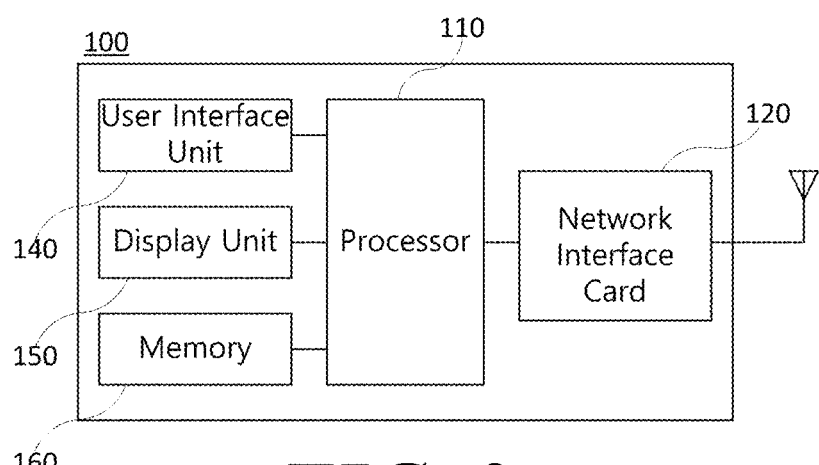
FIG. 3 shows a block diagram illustrating a configuration of a station according to an embodiment of the inventive concept.

FIG. 3 is a block diagram illustrating a configuration of a station 100 according to an embodiment of the present disclosure.

As illustrated in FIG. 3, the station 100 according to the embodiment of the present disclosure may include a processor 110, a network interface card (NIC) 120, a user interface unit 140, a display unit 150, and a memory 160.

First, the NIC 120 transmits and receives a wireless signal such as a wireless LAN physical layer frame, or the like and may be embedded in the station 100 or provided as an exterior. According to the embodiment, the NIC 120 may include at least one transmit and receive module using different frequency bands. For example, the NIC 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The NIC 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present disclosure may execute various commands or programs and process data in the station 100. Further, the processor 110 may control the respective units of the station 100 and control data transmission/reception among the units. According to the embodiment of the present disclosure, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. A detailed embodiment thereof will be described below.

The station 100 illustrated in FIG. 3 is a block diagram according to an embodiment of the present disclosure, where separate blocks are illustrated as logically distinguished elements of the device. Accordingly, the elements of the device may be mounted in a single chip or multiple chips depending on design of the device. Further, in the embodiment of the present disclosure, some components of the station 100, for example, the user interface unit 140 and the display unit 150 may be optionally provided in the station 100.

Figure 4:
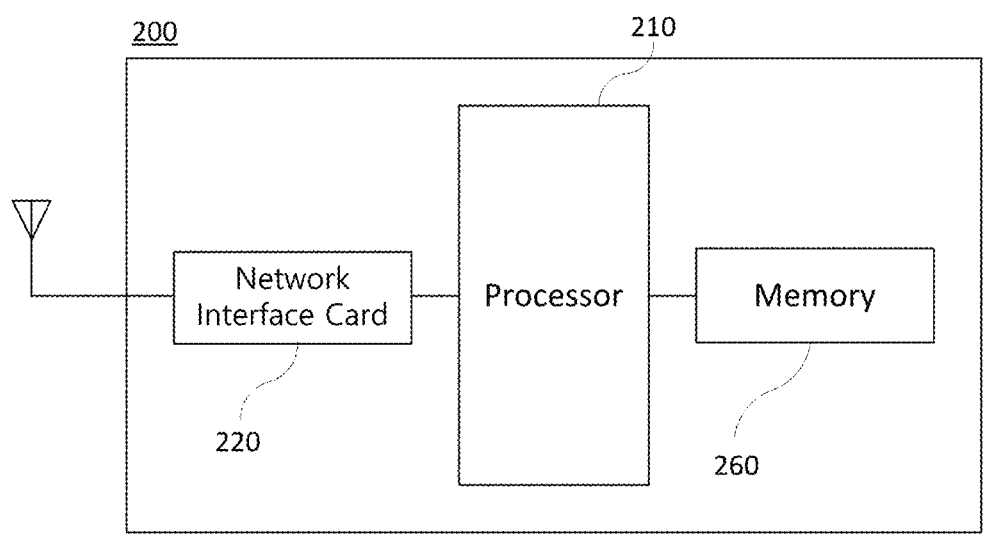
FIG. 4 shows a block diagram illustrating a configuration of an access point according to an embodiment of the present disclosure.

FIG. 4 is a block diagram illustrating a configuration of an AP 200 according to an embodiment of the present disclosure.

As illustrated in FIG. 4, the AP 200 according to the embodiment of the present disclosure may include a processor 210, a NIC 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present disclosure includes the NIC 220 for operating the BSS in at least one frequency band. As described in the embodiment of FIG. 3, the NIC 220 of the AP 200 may also include a plurality of transmit and receive modules using different frequency bands. That is, the AP 200 according to the embodiment of the present disclosure may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The NIC 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present disclosure, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. A detailed embodiment thereof will be described below.

Figure 5:
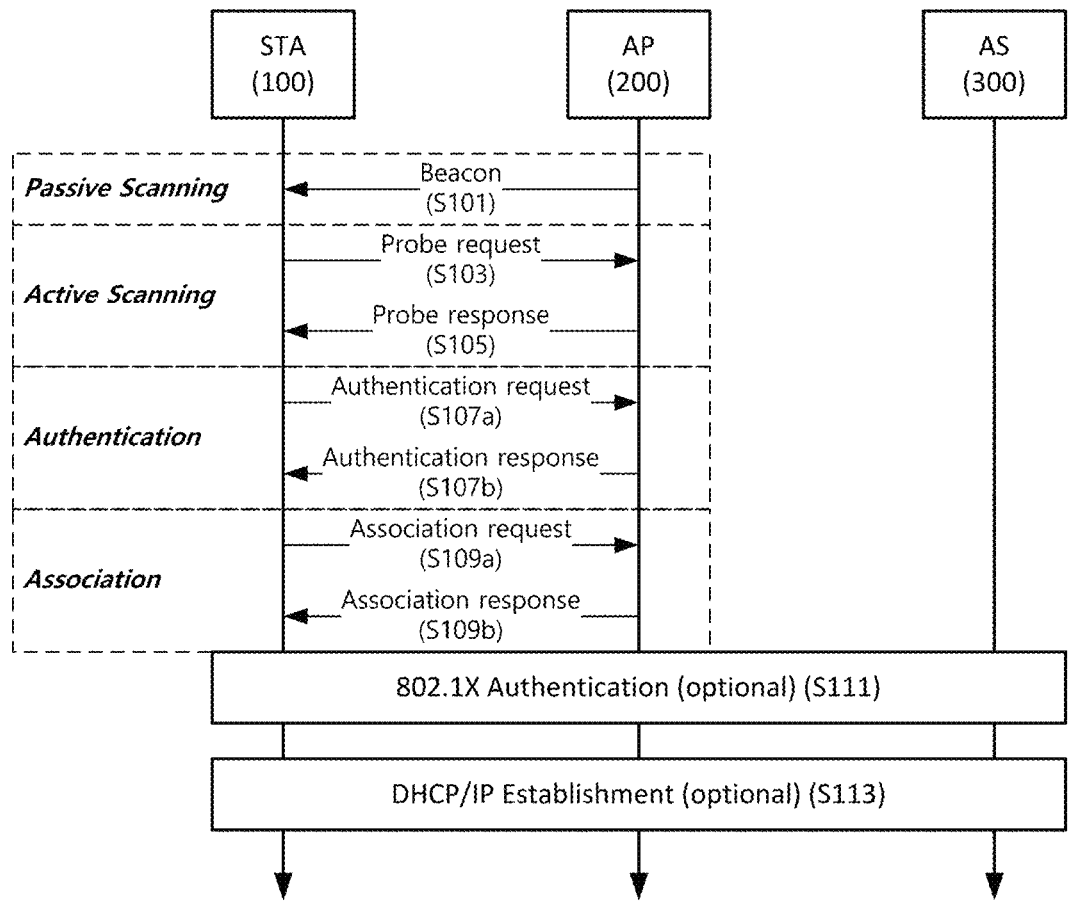
FIG. 5 shows a process that a station sets an access point and a link according to an embodiment of the present disclosure.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP.

Meanwhile, a wireless communication terminal may operate in a power save mode (hereinafter referred to as a PS mode) for energy efficiency. At this point, a wireless communication terminal operating in a PS mode may enter a PCR doze state when the wireless communication terminal does not perform any operation. In addition, the wireless communication terminal operating in the PS mode may stop the PCR doze state and enter a PCR awake state to receive the radio signal from the external device. In the present disclosure, "PCR" may be used to refer to Primary Connected Radio (hereinafter referred to as "PCR") that represents a general WLAN distinguished from wake-up radio described below. In present disclosure, a typical WLAN may represent a radio capable of transmitting and receiving a 20 MHz non-high throughput (HT) physical layer protocol data unit (PPDU) defined in IEEE 802.11. The PCR doze state may indicate a state in which the wireless communication terminal cuts off power associated with a part of the functions of the wireless communication terminal to increase energy efficiency. Specifically, in the PCR doze state, the wireless communication terminal may restrict the communication function through the PCR transceiver. In the PS mode, it may be referred to as a wake-up that the wireless communication terminal transition from the PCR doze state to the PCR awake state. In the PS mode, the wireless communication terminal may periodically wake-up to receive a radio signal from an external device. This operation may lower the operation efficiency of the wireless communication terminal.

When the wireless communication terminal wakes-up according to a wake-up radio (WUR) signal that triggers a wake-up of the PCR transceiver, the operation efficiency of the wireless communication terminal may be improved. Specifically, when the wireless communication terminal wakes-up according to the WUR signal, unnecessary wake-up operations may be reduced. In addition, when WUR is used, the time during which the wireless communication terminal stays in the PCR doze state may be increased. Thus, the power efficiency of the wireless communication terminal may be increased. Therefore, the wireless communication terminal may include a wake-up receiver (WURx) which operates with a lower power than the PCR transceiver. In addition, when the wireless communication terminal needs to transmit a WUR signal, the wireless communication terminal may include a wake-up transmitter. The wireless communication terminal may wake-up according to the WUR signal in the PCR doze state in which the PCR transmission/reception function is stopped. For convenience of description, in the present disclosure, a power save operation with the WUR signal is referred to as a WUR-based power save operation.

A part of the WUR signal may be transmitted in a different modulation method from the modulation of the PCR signal. For example, a part of the WUR signal may be transmitted by using On-Off Keying (OOK). Specifically, the PCR transceiver may transmit and receive modulated signals through a wave-form modulation method using the WURx and other wave forms.

Hereinafter, an operation of a wireless communication terminal including a WURx and a wireless communication method using WUR will be described according to an embodiment of the present disclosure.

Figure 6:
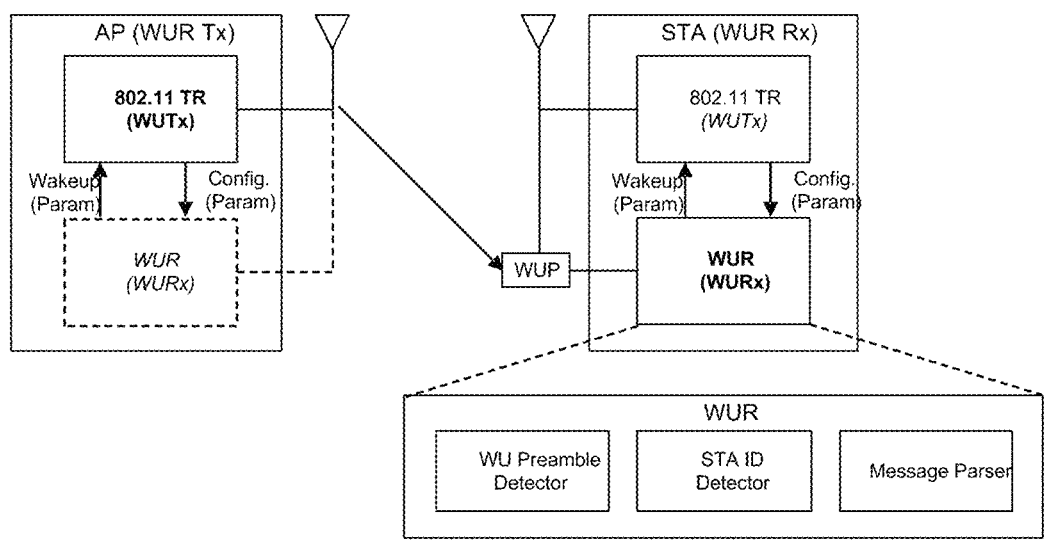
FIGS. 6 and 7 are diagrams illustrating a network including wireless communication terminals supporting the WUR-based power save according to an embodiment of the present disclosure.
Figure 7:
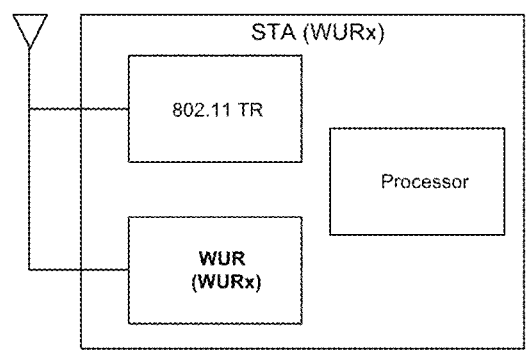

FIGS. 6 and 7 are diagrams illustrating a network including wireless communication terminals supporting the WUR-based power save according to an embodiment of the present disclosure. Referring to FIG. 6, the network may include an AP and a station supporting the WUR-based power save. The AP may transmit a wake-up frame to the WUR terminals to wake-up. Meanwhile, the AP and the station of FIG. 6 may include a PCR transmission/reception function of 802.11a/b/g/n/ac/ax, which is a general wireless LAN standard. In addition, the AP and the station in FIG. 6 may coexist in one network and a general station that supports only PCR transmission/reception without supporting WUR transmission/reception. For example, the network of FIG. 6 may include the general station that does not support a WUR function.

According to an embodiment, an AP may include a first wireless transceiver (TR) supporting a communication method using PCR. The first wireless transceiver may transmit and receive frames through PCR. The AP may include a second wireless transmitter that transmits frames through WUR. The second wireless transmitter may be referred to as a wake-up transmitter (WUTx). Here, a part of the WUR signal may be a signal transmitted in a second modulation method different from the first modulation method used in the PCR signal. Specifically, a part of the WUR signal may be transmitted by using OOK. For example, the second wireless transmitter may transmit a wake-up frame to the station through the WUR. Also, if the AP additionally includes the WURx, the AP may receive a wake-up frame from the outside through the WURx.

Meanwhile, according to another embodiment, the first wireless transceiver and the second wireless transmitter may be implemented as one transceiver. For example, an AP may perform transmission and reception of a PCR signal and transmission of a WUR signal through one transceiver.

As shown in FIG. 6, the AP may transmit a wake-up frame that triggers a wake-up of the PCR transceiver of a station to the station that supports the WUR-based power save. According to an embodiment, the AP may wake-up only a station entering a WUR-based power save mode among a plurality of stations belonging to the BSS of the AP. For example, the wake-up frame may include identification information identifying each of a plurality of stations. If the first station receives a wake-up frame including identification information indicating the first station, the first station may wake-up. Also, among the plurality of stations belonging to the AP's BSS or other BSSs, stations other than the first station may not wake-up.

According to an embodiment, a station supporting the WUR-based power save may include a WURx for receiving a wake-up frame. The station may include a first wireless transceiver that supports PCR transmission and reception and a WURx, that is, a second wireless receiver that exists separately. Here, the first wireless transceiver may be referred to as a PCR transceiver. The wireless communication terminal may transmit and receive PCR signals using a PCR transceiver. Also, the second wireless receiver may receive a signal transmitted in a second modulation method different from the first modulation method of the signal transmitted/received through the first wireless transceiver. The WURx may receive a wake-up frame from the AP and wake-up the PCR transceiver. If the WURx receives a wake-up frame while the PCR transceiver of the station operates in the PCR doze state, the WURx may wake-up the PCR transceiver by using an internal wake-up signal.

For example, the station may have an interface between the PCR transceiver and the WURx. At this point, the WURx may wake-up the PCR transceiver of the station by using the internal interface. Specifically, the WURx may wake-up a PCR transceiver by transmitting an internal signal to the PCR transceiver, but it is not limited thereto. For example, the station may have a processor that controls the overall operation of the station. At this point, the WURx may wake-up the PCR transceiver over the processor. Specifically, the station may cut off the power supply of the PCR and the processor in the PCR doze state. In this case, the WURx may operate in a manner that stops cutting off the power supply of the processor and wakes-up the PCR transceiver over the processor by receiving a wake-up frame.

According to an embodiment, the WURx may deliver information received through the wake-up frame to the PCR transceiver. The WURx may transmit information on subsequent operations following the wake-up to the PCR transceiver by using the internal interface. Specifically, the information on the subsequent operations may be a Sequence ID (SID) that identifies each of the subsequent operations. In addition, PCR may set WURx parameters required for the WUR based power save operation by using the internal interface.

For example, the WURx may include a wake-up preamble detector (WU Preamble Detector), a wireless communication terminal identifier detector (STA ID Detector), and a message parser. The WU preamble detector detects a wake-up frame by identifying a sequence of signal patterns included in the wake-up frame. In addition, the WU preamble detector may perform automatic gain control (AGC) and synchronization on WUR based on the detected signal pattern sequence.

The STA ID Detector detects a recipient of the wake-up frame. At this point, the STA ID Detector may obtain information identifying the recipient of the wake-up frame based on the wake-up signaling field of the wake-up frame. In addition, the STA ID Detector may obtain information identifying the receiver of the wake-up frame based on the WU preamble and the WU signaling field of the wake-up frame. The WU preamble and the WU signaling field of the wake-up frame will be described later with reference to FIG. 8. The message parser parses a message that the wake-up frame contains. Specifically, the message parser may parse the message included in the wake-up frame to obtain a message indicated by the wake-up frame.

According to an embodiment, the wireless communication terminal may determine conditions for maintaining the wireless communication terminal in a state in which reception is capable through the WURx of the communication terminal. In a specific embodiment, the wireless communication terminal may maintain WURx to be available for reception until a certain condition is satisfied. For example, until the wireless communication terminal recognizes that the PCR transceiver of the wireless communication terminal wakes-up successfully, the wireless communication terminal may maintain the WURx in a state in which transmission and reception are capable.

Figure 8:
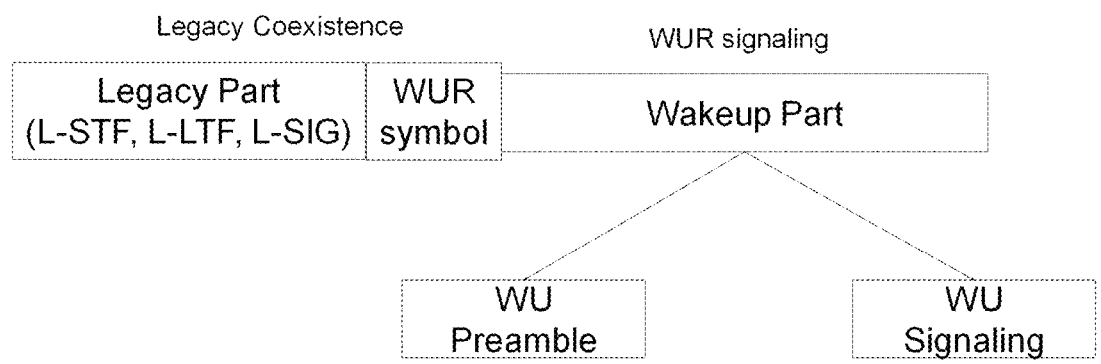
FIG. 8 is a diagram illustrating a format of a wake-up frame according to an embodiment of the present disclosure.

FIG. 8 is a diagram illustrating a format of a wake-up frame according to an embodiment of the present disclosure.

A wake-up frame may include a legacy part that can be demodulated by a PCR transceiver. Specifically, the wake-up frame may be divided into the legacy part and a wake-up part that cannot be demodulated by the PCR transceiver. As described above, the BSS may simultaneously include wireless communication terminals that supports the WUR-based power save and legacy wireless communication terminals that does not support the WUR-based power save. At this point, it is necessary that the operation of the wireless communication terminals supporting the WUR-based power save does not hinder the operation of the legacy wireless communication terminals belonging to the BSS.

Specifically, the legacy part may include a legacy preamble (L-Preamble) used in the existing 802.11 standard. Specifically, the legacy preamble may include an L-STF including a short training signal, an L-LTF including a long training signal, and an L-SIG including signaling information for the legacy wireless communication terminals. The legacy wireless communication terminals may determine the length of a wake-up frame using the legacy preamble. Accordingly, the legacy wireless communication terminals may not access the frequency band in which the wake-up frame is transmitted while the wake-up frame is transmitted. Though the legacy wireless communication terminals may prevent interference with signals including the wake-up part following the legacy part.

In addition, the wake-up frame may include a WUR symbol. For example, the WUR symbol may be one OFDM symbol following L-SIG The WUR symbol may be an OFDM symbol modulated by a Binary Phase Shift Keying (BPSK) scheme. The WUR symbol may include information indicating a BSSID. In addition, the WUR symbol may include information indicating the transmission type of the wake-up part. For example, the transmission type of the wake-up part may be unicast, multicast, or broadcast. When the transmission type is unicast, a wake-up part to be described later may include identification information indicating a wireless communication terminal to be waked up. At this point, the identification information may be an association identifier (AID) used in the PCR. Alternatively, the identification information may be a WUR specific identifier (WUR ID) used in the WUR.

A station that supports the WUR-based power save may demodulate the wake-up part by using WURx. At this point, the wake-up part may include a wake-up preamble (WU preamble) and a wake-up signaling part (WU signaling part). The WU preamble may include a sequence of signal patterns indicating a wake-up frame. Specifically, an AP may insert a pseudo noise sequence based on WURx modulation into the wake-up preamble. The AP may insert a pseudo-noise sequence by using OOK into the wake-up preamble. The signal pattern sequence may be the pattern applied to the WU preamble identically regardless of which station receives the wake-up frame.

The station that supports the WUR-based power save may determine the recipient of a received wake-up frame by parsing the WU signaling part of the wake-up frame. For example, the WU signaling part may include an address field representing a recipient of the wake-up frame. Specifically, the WU signaling part may include a WUR identifier (WUR ID) that identifies the station receiving the wake-up frame. The station may wake-up the PCR transceiver when it receives the wake-up frame containing the WUR ID representing the station. The AP may allocate a different WUR ID for each of a plurality of stations in order to wake-up the PCR transceiver of some specific station among the plurality of stations belonging to the BSS through the wake-up frame.

According to an embodiment, when a wake-up frame triggers a wake-up of a PCR transceiver of a plurality of stations, the wake-up signaling field of the wake-up frame includes a Group Identifier (Group ID). Here, the Group ID may include a group address (GA). In addition, an AP may insert subsequent operation information indicating the subsequent operation of the station to be waked-up into the wake-up signaling field. For example, the wake-up signaling field may additionally include a subsequent operation identifier (ex. SID) that identifies subsequent operations after wake-up.

For convenience of explanation, unless specifically stated otherwise, stations and APs are assumed to be stations and APs that support the WUR-based power save.

Figure 9:
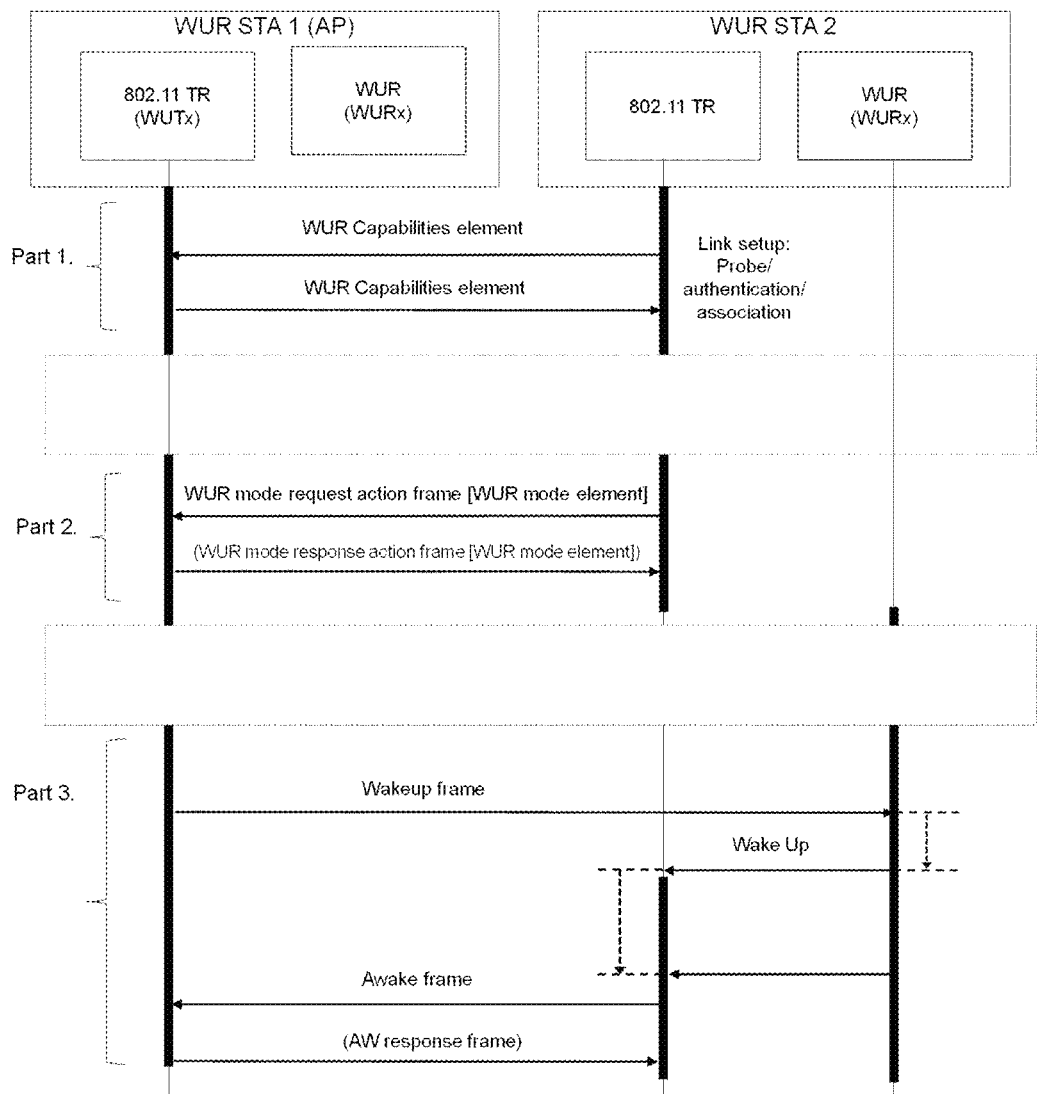
FIG. 9 is a diagram illustrating a method of operating a wireless communication terminal supporting WUR-based power save according to an embodiment of the present disclosure.

FIG. 9 is a diagram illustrating a method of operating a wireless communication terminal supporting the WUR-based power save according to an embodiment of the present disclosure.

According to an embodiment, a wireless communication terminal may perform WUR negotiation prior to the WUR-based operation. This is because it is necessary to exchange information for performing WUR-based operation between wireless communication terminals. Therefore, the wireless communication terminal may perform the WUR negotiation procedure using the PCR transceiver. In the WUR negotiation procedure, the wireless communication terminal may signal a WUR capability element. Alternatively, the wireless communication terminal may signal the WUR capability element through at least one of the WUR negotiation procedure and the separate WUR combining procedure. Here, the WUR capability element may include capabilities related to wake-up. Here, the capability related to the wake-up may include functions related to WUR, supported by the wireless communication terminal. The wireless communication terminal may be classified according to the functions related to WUR, supported by the wireless communication terminal. At this point, the wireless communication terminal may signal the classification of the wireless communication terminal according to the functions related to WUR, supported by the wireless communication terminal. For example, if a wireless communication terminal includes a WURx, the wireless communication terminal may signal that it is a wake-up enabled user equipment (WUR Rx) based on WUR. Alternatively, if a wireless communication terminal includes the function of transmitting a wake-up frame, the wireless communication terminal may signal that it is user equipment (WUR Tx) capable of transmitting a wake-up frame based on the WUR.

Further, according to an embodiment, the WUR capability element may include parameters related to the WUR capability. For example, the parameters related to the WUR capability may include a wake-up delay (WUD) indicating the time takes for the PCR transceiver of the wireless communication terminal to wake-up after the wireless communication terminal receives a wake-up frame. For example, when the wireless communication terminal includes a WURx, the wireless communication terminal may signal a wake-up delay required for wake-up of the PCR transceiver of the wireless communication terminal. The wake-up delay may be referred to as a PCR transition delay. The PCR transition delay may indicate the time that it takes for the PCR transceiver to transition to a state in which transmitting and receiving through PCR are capable after the wireless communication terminal receives a wake-up frame. Specifically, the PCR transition delay may include the time it takes for WURx to instruct the PCR transceiver to wake-up and to wake-up the PCR transceiver. For example, the PCR transition delay may include the time from receiving a wake-up frame through the WURx to transitioning the PCR transceiver from the doze state to the active state. In addition, the WUR capability element may include information indicating whether or not the group wake-up operation is supported on the wireless communication terminal.

According to an embodiment, when a wireless communication terminal supports the WUR-based power save, the wireless communication terminal may signal the WUR mode element of the wireless communication terminal. Here, the WUR mode element may include information required for a wireless communication terminal to perform WUR-based operations. The wireless communication terminal may signal the WUR mode element with the WUR capability element in the WUR negotiation procedure. Alternatively, the wireless communication terminal may signal the WUR mode element in a WUR association procedure separate from WUR negotiation procedure. If the wireless communication terminal signals the WUR mode element through the WUR association procedure, the wireless communication terminal may receive a WUR association request from a wireless communication terminal including a WURx. The wireless communication terminal may signal information required for the WUR-based operation in a WUR association response for the WUR association request. At this point, the wireless communication terminal may transmit the WUR association request in the form of an action frame. The station may transmit the WUR association request through a WUR mode request frame transmitted in the process of entering a WUR mode, which will be described later. At this point, the AP may transmit the WUR association response through the WUR mode response frame for the WUR mode request frame.

For example, the WUR mode element may include at least one of a WUR ID and a group ID to be used in a wake-up frame. In addition, the WUR mode element may include information indicating a sequence of signal patterns to be used in a wake-up frame. The wireless communication terminal may signal the signal pattern sequence included in the wake-up preamble of the wake-up frame. When the signal pattern sequence is different for each BSS or different for each wireless communication terminal, the wireless communication terminal may signal a plurality of signal pattern sequences. In addition, the signal pattern sequence may be the signal pattern sequence described with reference to FIG. 8. In addition, the WUR mode element may include a group identifier list associated with the group wake-up operation of the wireless communication terminal. Specifically, the wireless communication terminal may obtain a group identifier indicating a group including the wireless communication terminal based on the group identifier list included in the WUR mode element.

In FIG. 9, a WUR STA 1 represents a WUR station, which is an AP. Also, a WUR STA 2 represents a WUR station, which is not an AP. Referring to Part 1 of FIG. 9, a station WUR STA 2 including a WURx may perform a WUR association procedure and a WUR negotiation procedure with an AP WUR STA 1 for the WUR-based power save operation. According to an embodiment, the AP and the station may signal a WUR mode element and a WUR capability element through the PCR signal. In FIG. 9, a station WUR STA 2 may transmit a request frame requesting a negotiation or association related to WUR with an AP WUR STA 1. The request frame may include the WUR capability element. The request frame may include a WUR mode element. At this point, the request frame may include at least one of information indicating a classification (WUR Rx) of the station WUR STA 2 according to the functions relate to WUR and a time (WUD(d)) required for the station to wake-up the PCR transceiver. The AP WUR STA 1 may receive a request frame from the station WUR STA 2 using a PCR transceiver. The AP WUR STA 1 transmits a response frame for the request frame to the station WUR WUR STA 2. At this point, the response frame may include a classification (WUR Tx) of AP WUR STA 1 according to the functions related to WUR, a signal pattern sequence (Preamble Seq) included in a WU preamble of a wake-up frame, SA for the wake-up frame, and DA for the wake-up frame. The station WUR STA 2 may obtain at least one the classification (WUTx) of the AP WUR STA 1, the signal pattern sequence (Preamble Seq) to be used for a wake-up frame, SA to be used for the wake-up frame, and DA to be used for the wake-up frame, through the PCR transceiver.

At least one of the above-described WUR negotiation procedure and association procedure may be performed together with the link establishment procedure between a station and a AP described with reference to FIG. 5. For example, in establishing the initial link between the AP and the station, a WUR capability element of the station may be signaled. Specifically, the station may signal the WUR capability element in a probe request frame in the process of performing the active scanning described above. Alternatively, the station may signal the WUR capability element in the association request frame in the association process described above. The AP may transmit a WUR capability element and a WUR mode element of the AP to the station in a probe response or association response frame, which is a response to the request frame transmitted from the station.

After completing the WUR negotiation procedure, the AP and the station may perform WUR-based operations. Hereinafter, a process of entering a WUR mode after the station WUR STA 2 including the WURx performs the WUR negotiation with the AP WUR STA 1, according to an embodiment of the present disclosure will be described with reference to Part 2 of FIG. 9. In the WUR mode, the wireless communication terminal may transition from the WURx doze state to the WURx awake state and receive the WUR frame (Wake-Up Radio frame) through the WURx. Here, the WUR frame may be a frame that is modulated in such a manner that at least a part of the frame may be received through a WURx. The WUR frame may include a WUR beacon frame and a wake-up frame, which will be described later. The wireless communication terminal operating in the WUR mode may enter the WURx awake state to receive the WUR frame from the external device. In present disclosure, the WURx awake state may indicate a state in which the wireless communication terminal is capable of receiving through the WURx. For example, the wireless communication terminal may turn on the power of WURx and enter the WURx awake state. Also, the wireless communication terminal operating in the WUR mode may enter the WURx doze state in a period in which the WUR frame reception is not expected. In present disclosure, the WURx doze state may indicate a state in which the wireless communication terminal is not receivable through WURx. For example, the wireless communication terminal may turn off the power of WURx and enter the WURx doze state. According to an embodiment, a PCR transceiver may not perform a communication function over WURx while operating in the awake state. Specifically, the wireless communication terminal may not maintain the power of WURx in a turned-on state. Through this, the wireless communication terminal may reduce unnecessary power consumption and increase power efficiency.

Referring to Part 2 of FIG. 9, if the station WUR STA 2 attempts to enter the WUR mode, the station WUR STA 2 may transmit a WUR mode request frame requesting the WUR mode to the AP WUR STA 1. At this point, the station WUR STA 2 may transmit a WUR mode request frame to the AP WUR STA 1 using a PCR transceiver. At this point, the WUR mode request frame may include the WUR mode element described above. In addition, the WUR mode request frame may be an action frame. Here, the action frame may be one of a management frame. The WUR mode request frame may be a frame requiring an immediate response. Here, the immediate response may be a response transmitted within a predetermined time from when a frame is received. Also, the predetermined time may be a Short Inter-Frame Space (SIFS) defined in the IEEE 802.11 standard. In this case, the AP WUR STA 1 may transmit a WUR mode response frame for the WUR mode request to the station WUR STA 2. The station WUR STA 2 may receive the WUR mode response frame from the AP WUR STA 1. Also, if the AP WUR STA 1 needs a change or additional information on the received WUR mode element, the AP WUR STA 1 may transmit a WUR mode response frame that includes the corresponding request. In addition, the WUR mode response frame may be an action frame that requires an immediate response.

According to an embodiment, the AP WUR STA 1 may transmit a WUR mode response that includes a status of whether the station WUR STA 2 is allowed to enter the WUR mode to the station WUR STA 2. For example, the AP WUR STA 1 may transmit a WUR mode response that allows the station WUR STA 2 to enter the WUR mode of the station. Conversely, the AP WUR STA 1 may transmit a WUR mode response to the station WUR STA 2 that does not allow the station to enter the WUR mode. The station WUR STA 2 may operate in the WUR mode based on the received WUR mode response. The station WUR STA 2 may set a timer for retransmitting the WUR mode request at the time that the station WUR STA 2 transmits a WUR mode request frame to the AP WUR STA 1. If the station WUR STA 2 fails to receive the WUR mode response from the AP WUR STA 1 until the timer expires, the station WUR STA 2 may retransmit the WUR mode request. If the station WUR STA 2 successfully receives a WUR mode response that allows to enter the WUR mode from the AP WUR STA 1, the station WUR STA 2 may maintain the WURx awake state in which receiving through a WURx is available. If the station WUR STA 2 enters the WUR mode, the station WUR STA2 may receive a wake-up frame that triggers a wake-up of a PCR transceiver from the AP STA1 through a WURx.

Hereinafter, an operation that a station wakes-up by receiving a wake-up frame according to an embodiment of the present disclosure will be described. According to an embodiment, the station may receive a wake-up frame from an AP and wake-up a PCR transceiver of the station. As described above, the station may receive a wake-up frame through a WURx that receives a signal transmitted in a different modulation method from the PCR signal. In addition, the station may wake-up the PCR transceiver of the station based on the wake-up frame. According to an embodiment, the wake-up frame includes at least one of a WUR ID of the station that receives the wake-up frame, a time (timestamp) at which the wake-up frame is transmitted, and a subsequent operation identifier SID indicating a subsequent operation after the station wakes-up.

The station may parse the wake-up signaling field of the wake-up frame received through the WURx. The station may parse the wake-up signaling field to obtain address information. If the parsed address information indicates the WUR identifier (WUR ID) of the station or the group identifier (GROUP ID) of the group that includes the station, the station may wake-up the PCR transceiver of the station. Specifically, the station may enable the PCR transceiver to operate in an awake state. At this point, the awake state of the PCR transceiver may indicate a state in which the station can transmit and receive through the PCR transceiver.

According to an embodiment, a station that includes a WURx may obtain information on an operational sequence after wake-up from a wake-up frame. The information on the operational sequence after the wake-up may be a SID that identifies the subsequent operation. For example, the PCR transceiver of the station may operate based on a subsequent operation identifier SID indicating a wake-up subsequent operation. Specifically, after waking-up, the station may transmit the frame to the AP based on the subsequent operation identifier SID. Alternatively, after waking-up, the station may wait for receiving a frame from the AP based on the subsequent operation identifier SID.

According to an embodiment, a WURx may deliver the information obtained from a wake-up frame to a PCR transceiver in a process of waking-up the PCR transceiver. The WURx may store a part of the information obtained by parsing the wake-up frame. When the PCR transceiver is awake, the WURx may deliver the stored part of the information to the PCR transceiver. Specifically, the WURx may transmit at least one of a WUR ID or GROUP ID, a subsequent operation identifier SID after wake-up, and timestamp information on a time at which a wake-up frame is received, to the PCR transceiver. The WURx may transmit information obtained from the wake-up frame to the PCR transceiver through an internal interface.

Also, according to an embodiment, an AP and a station may perform an operation to confirm whether the station wakes-up successfully based on a wake-up frame. At this point, the AP and the station may use a PCR frame. In the case of the wake-up frame, since one bit is transmitted through one OFDM symbol, the time required for transmission may be longer than the time required for transmission of a AW request frame. For example, after the station receives the wake-up frame, if the exchange of PCR frames is successful for the first time between the station and the AP, the station and the AP may determine that the PCR transceiver wakes-up successfully. The station may transmit and receive a wake-up confirmation frame to confirm a successful wake-up using a PCR signal with a shorter transmission time than the WUR signal. In this case, the exchange of the wake-up confirmation frame may be performed through the PCR transceiver of each of the station and the AP. At this point, the frame format of the wake-up frame may not be limited.

Referring to Part 3 of FIG. 9, a station WUR STA 2 may transmit a frame indicating that the transmission and reception are capable through a PCR transceiver to an AP WUR STA 1 using a PCR signal. Hereinafter, a method of exchanging frames with an AP after a station wakes-up according to an embodiment of the present disclosure will be described in detail with reference to FIG. 10.

Figure 10:
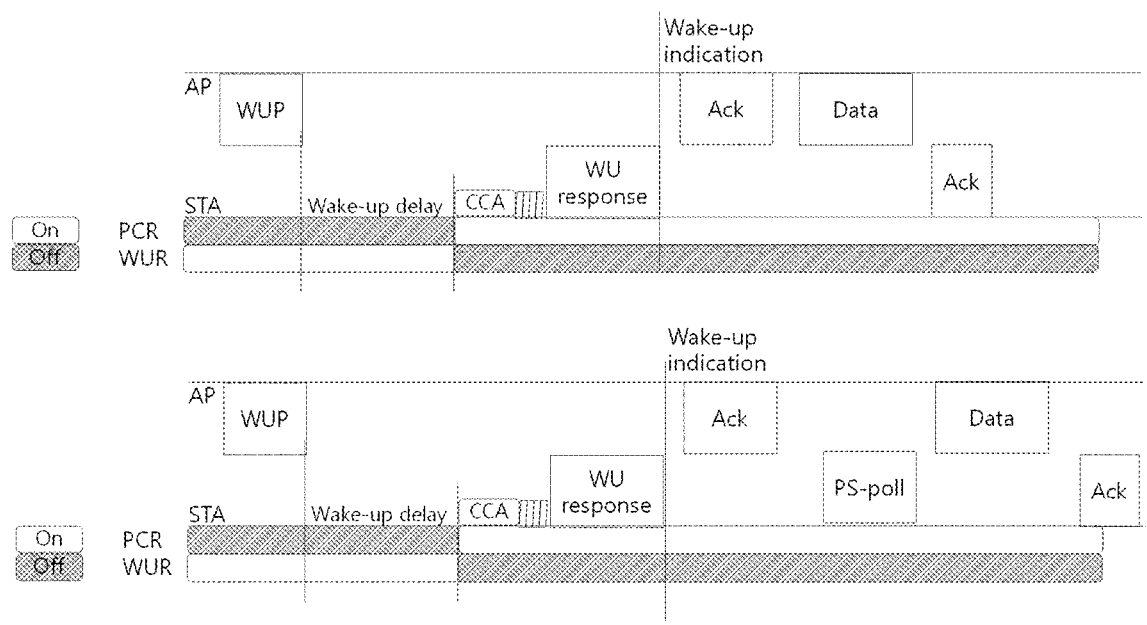
FIG. 10 is a diagram illustrating an operation after wake-up of a wireless communication terminal according to an embodiment of the present disclosure.

FIG. 10 is a diagram illustrating an operation after wake-up of a wireless communication terminal according to an embodiment of the present disclosure. According to an embodiment, the station may transmit an awake frame (WU response) to the AP. At this point, the awake frame may indicate the first transmission frame to the AP through the PCR transceiver after the PCR transceiver wakes-up. The awake frame may be a frame indicating that the PCR transceiver of the station transmitting the awake frame is in an awake state. For example, the station may access the PCR channel and transmit the awake frame. At this point, the awake frame may be a separate control frame defined for the WUR operation. Alternatively, the awake frame may be any frame used in the PCR transmission and reception. The awake frame may be a frame on the IEEE 802.11 standard, such as a PS-poll frame. The awake frame may be a wake-up response (WU response) indicating to the AP that the station is capable of transmitting and receiving through the PCR transceiver. For example, an awake frame may include a management frame. For example, an awake frame may include a control frame. Or an awake frame may include a data frame.

Specifically, the station may attempt to access the channel to transmit the awake frame. At this point, the station may start a channel contention procedure after a predetermined time elapses from the time of wake-up. Here, the predetermined time may be the time indicated by the AP. The station may obtain information indicating a time at which to start the channel contention procedure based on the wake-up subsequent operation information included in the wake-up frame. Alternatively, the station may obtain information from the AP indicating the time at which to start the channel contention procedure in the link establishment procedure or the WUR negotiation procedure described above. For example, when a plurality of stations wake-up, the AP may transmit information indicating the start time of channel access for the awake frame transmission to each of the plurality of stations. At this point, the start time of channel access assigned to each of the plurality of stations may be different from each other. The AP may distribute the channel contention operation of a plurality of stations through the operation described above. The station may determine a time to start channel contention based on at least one of information indicating a time to start the channel contention procedure, a timestamp at which the wake-up frame is received, and a wake-up delay. The station may perform the channel contention procedure based on the determined time, to transmit an awake frame.

In addition, the awake frame may be a frame requiring an immediate response of the AP. After transmitting the awake frame, the station may receive an awake response frame (hereinafter referred to as 'AW response frame') from the AP. The AP receiving the awake frame may transmit the AW response frame to the station. At this point, the AW response frame may be any frame used in the PCR transmission/reception. For example, the AW response frame may be an immediate response frame for the awake frame. Alternatively, the AW response frame may be a control frame that is separately defined for WUR operation. The AP may transmit an AW response frame to the station using the PCR signal. If the station receives an AW response frame from the AP, the station may determine that the PCR transceiver of the station wakes-up successfully. In this case, the station may transmit a request frame requesting downlink data reception from the AP. As shown in FIG. 10, the station may transmit a PS-poll frame. This will be described later with reference to FIGS. 28 to 33. In addition, the station may maintain a WURx in a receivable state at least until the reception of the AW response frame from the AP.

Meanwhile, according to an embodiment, If the AP WUR STA 1 fails to receive an awake frame from the station WUR STA 2 until the time-out that set to receive the awake frame expires from a first wake-up frame is transmitted, the AP WUR STA 1 may transmit a second wake-up frame. In this case, the AP WUR STA 1 may determine that the station WUR STA 2 does not receive the first wake-up frame. At this point, the first wake-up frame may be the last wake-up frame transmitted by the AP WUR STA 1. Here, the time-out may be set based on the above PCR transition delay and NAVSync delay. This is because the station WUR STA 2 may not transmit the awake frame during the time required for wake-up and the time required for access to the channel for transmitting the awake frame. For example, the time-out may be set to a value greater than the sum of the PCR transition delay and the NAVSync delay of the station WUR STA 2. The NAVSync delay may represent the maximum period of time in which the uplink transmission of the station WUR STA 2 is restricted. Also, the NAVSync delay may be a predetermined value through a link establishment process between the AP WUR STA 1 and the station WUR STA 2.

Here, the transmitted second wake-up frame may be a wake-up frame that includes information different from that of the first wake-up frame transmitted at the first. Alternatively, the second wake-up frame may be the same wake-up frame as the first wake-up frame. For example, the second wake-up frame may include an indicator for waking-up a plurality of stations including the station set as the recipient of the first wake-up frame. Alternatively, the second wake-up frame may include wake-up frame failure information indicating that the transmission of the first wake-up frame has failed. According to an embodiment, the station may receive both the first wake-up frame and the second wake-up frame. In this case, the station may determine the information required for performing the wake-up operation according to the time when the wake-up frame is received. For example, if the station receives the second wake-up frame after the first wake-up frame is received, it may perform a wake-up operation based on the wake-up related information included in the second wake-up frame.

Meanwhile, according to another embodiment of the present disclosure, when the wireless communication terminal operates in the WUR mode, the negotiated service period between the wireless communication terminal and the base wireless communication terminal may be suspended. For example, the negotiated service period may be a target wake time (TWT) service period set based on the TWT negotiation procedure. Specifically, the wireless communication terminal may transmit and receive PCR frames using the TWT service period set based on the TWT negotiation procedure. At this point, the TWT negotiation procedure may be performed through an exchange of PCR frames between the wireless communication terminal and the base station. The TWT service period may be scheduled in the TWT negotiation procedure between the wireless communication terminals. The operation according to the TWT service period may be one of the power save operations other than the WUR-based power save provided by the wireless LAN.

According to an embodiment, if a wireless communication terminal using the TWT service period enters the WUR mode, the wireless communication terminal may maintain the PCR doze state until it wakes-up based on the wake-up frame. If the downlink data to be transmitted to the wireless communication terminal is buffered in a base wireless communication terminal, the base wireless communication terminal may wake-up the wireless communication terminal using a wake-up frame to transmit the downlink data. Accordingly, when the wireless communication terminal enters the WUR mode, the wireless communication terminal may suspend a schedule of PCR including at least one TWT service period.

However, if the wireless communication terminal operating in the WUR mode receives the wake-up frame, the wireless communication terminal may use the suspended TWT service period. For example, the wireless communication terminal may receive downlink data from the base wireless communication terminal based on the suspended TWT service period. In addition, the wireless communication terminal and the base wireless communication terminal may exchange the above-described wake-up confirmation frame based on the suspended TWT service period. Also, the wireless communication terminal may receive the downlink data from the base wireless communication terminal during the nearest TWT service period based on the time when the wake-up frame is received. The wireless communication terminal may maintain the PCR awake state at least during the nearest TWT service period after the time of receiving the wake-up frame. Also, the wireless communication terminal may determine the closest TWT service period based on the PCR transition delay of the wireless communication terminal. For example, the wireless communication terminal may maintain the PCR awake state during the nearest TWT service period among the TWT service periods that comes after the PCR transition delay after receiving the wake-up frame.

Hereinafter, a method for a wireless communication terminal according to an embodiment of the present disclosure to enter a PCR doze state without further signaling after wake-up will be described. This is because, after the wake-up, the wireless communication terminal transmits a WUR mode request frame to enter the PCR doze state may be inefficient in terms of power consumption.

Figure 11:
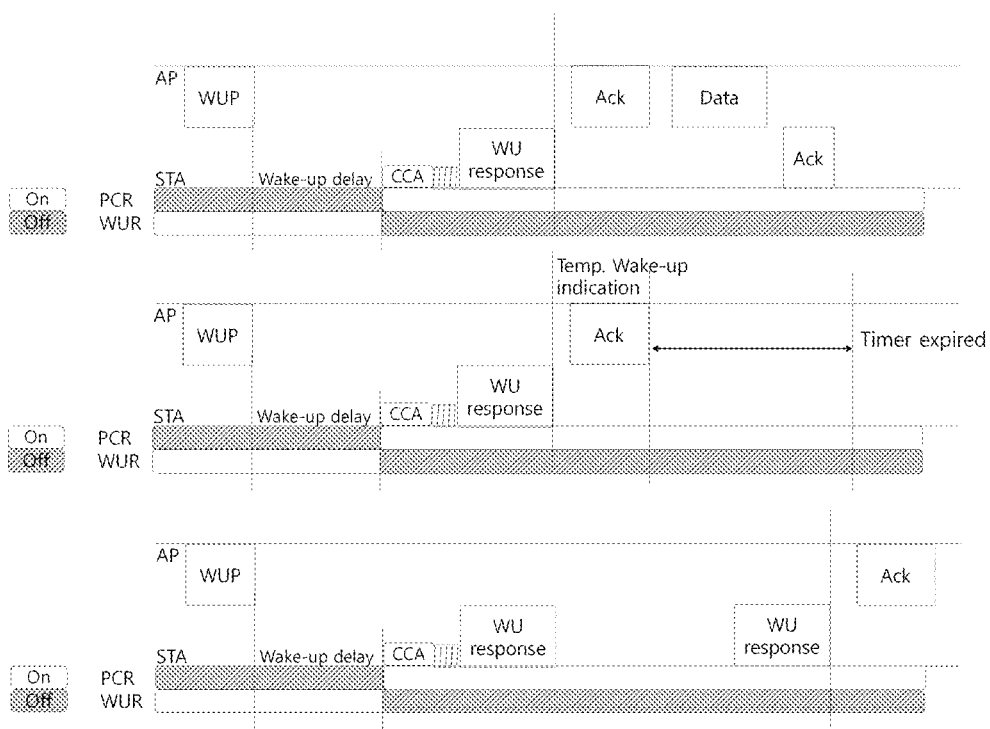
FIG. 11 is a diagram illustrating an operation method after reception of a wake-up frame of a wireless communication terminal according to an embodiment of the present disclosure.

FIG. 11 is a diagram illustrating an operation method after reception of a wake-up frame of a wireless communication terminal according to an embodiment of the present disclosure.

According to an embodiment, a station may receive a data frame from an AP after wake-up. At this point, the station may enter a PCR doze state after receiving the first data frame from the AP. For example, the station may transmit a response frame for the first data frame to the AP. In addition, the station may enter the PCR doze state at the time of transmitting the response frame. If the AP receives a response frame from the station, the AP may determine that the station enters the PCR doze state. Accordingly, the AP may transmit a new wake-up frame to the station when the AP needs additional data transmission. Meanwhile, if the station wants to maintain the PCR in an awake state even after transmitting the response frame of the first data frame, the station may transmit a frame including information for deactivating the WUR mode. In this case, the station may signal information to deactivate the WUR mode using a WUR mode request frame transmitted through the PCR transceiver. In addition, the station may not operate in the WUR mode from the time of receiving the response frame of the frame including the information for deactivating the WUR mode from the AP.

Also, according to an embodiment, a station may receive an AW response frame in response to an awake frame. The station may enter a PCR doze state if the station fails to receive a subsequent frame from an AP within a predetermined time after receiving the AW response frame. Here, the predetermined time may be the time from when the AW response frame is received until when the predetermined timer for maintaining a PCR awake state expires. The predetermined timer may be a time value set by the AP or the station. In addition, the predetermined time value may be signaled in the WUR negotiation procedure or the link establishment procedure. After the AP transmits the AW response frame, the AP tries to transmit the subsequent frame to the station, but the transmission may fail. In this case, the AP may not receive a response frame of the subsequent frame from the station. At this time, the AP may determine that the station is in the PCR-awake state after the time when the predetermined timer of the station is expected to expire. The AP may calculate the time at which the predetermined timer of the station is expected to expire based on the time of transmitting the AW response frame and the transmission delay. Accordingly, the AP may transmit a new wake-up frame to the station after the predetermined time of the station is expected to expire.

In addition, if the station fails to receive the AW response frame from the AP within a predetermined time from the transmission of the awake frame, the station may retransmit a awake frame. Here, the predetermined time may be the time from when the awake frame is transmitted until when a predetermined timer for retransmitting the awake frame expires. The predetermined timer may be a time value set by the AP or the station. In addition, the predetermined time value may be transmitted and received in the WUR negotiation procedure or the link establishment procedure.

Figure 12:
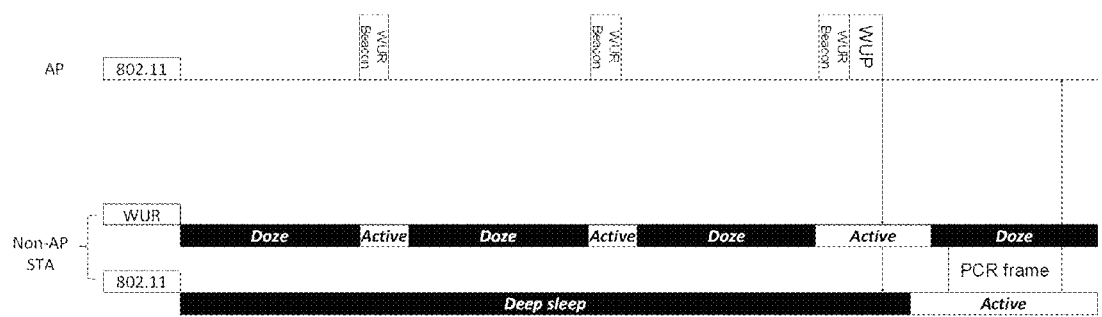
FIG. 12 is a diagram illustrating a method for transmitting a WUR beacon frame according to an embodiment of the present disclosure.

FIG. 12 is a diagram illustrating a method for transmitting a WUR beacon frame according to an embodiment of the present disclosure.

According to an embodiment, when a station operating in a state, in which transmitting and receiving a radio signal through PCR are capable, is out of the radio range of the AP, the station may not receive a PCR beacon frame transmitted by the AP. Here, a PCR beacon frame may be a frame periodically transmitted from the AP through PCR. In addition, the PCR beacon frame may include information on the BSS for the station to manage the BSS of the station. In this case, the station may determine that the connection with the AP is lost. The station may attempt to scan to establish a link with a new AP.

On the other hand, in the PCR doze state, the station may not receive the frame transmitted by the AP through PCR as well as the beacon frame. Also, the station may not transmit any frame through the PCR transceiver until it receives a wake-up frame or wakes-up the PCR transceiver. Thus, in the PCR doze state, even if the station out of range to receive the beacon frame of the AP as the station or the AP moves, the station may not recognize that the station is unable to transmit/receive to/from the AP. This is because the station may not confirm whether the PCR beacon frame is receivable. Until the station wakes-up the PCR transceiver and tries to transmit and receive through the PCR signal, the station may maintain in a standby state waiting for a wake-up frame transmitted from the AP even though access to the AP is lost.

To prevent such inefficient operation described above, an AP may transmit a WUR beacon frame to a station operating in a WUR mode. Here, the WUR beacon frame may be a frame transmitted periodically from the AP through WUR. At this point, the WUR beacon frame may include information on the BSS described above. For example, the WUR beacon frame may signal the same information as the signaling information of the PCR beacon frame transmitted through PCR. The WUR beacon frame, like the wake-up frame, may include a legacy part and a WUR part. The legacy part of the WUR beacon frame may have the same role and structure as the legacy part of the wake-up frame. The WUR part of the WUR beacon frame may include the identifier information of the AP.

In addition, the WUR part of the WUR beacon frame may include time synchronization function (TSF) information for maintaining the time synchronization of the station operating in the WUR mode. The AP may periodically transmit a WUR beacon frame to the station through the WUR primary channel. At this point, the period in which the AP transmits the WUR beacon frame may be longer than the period in which the PCR beacon frame is transmitted. The WUR beacon frame may not contain identification information of the recipient, unlike the wake-up frame. A station receiving a proper WUR beacon frame may not wake-up a PCR transceiver to perform active scanning. If the identifier of the AP in the received WUR beacon frame is different from the associated AP, the station may wake-up the PCR transceiver.

According to an embodiment, the period in which the WUR beacon frame is transmitted may be signaled through a WUR mode element. The station may transmit a WUR mode request frame or a WUR mode response frame containing the WUR mode element through a PCR signal. According to an embodiment, as the WUR beacon frame is periodically transmitted, the station operating in a WUR mode may turn off the power of a WURx to obtain an additional power save effect if there is no data for uplink (UL) transmission. The station may maintain a WURx awake state for at least a period during which a WUR beacon frame transmission is expected based on the period of transmission of the WUR beacon frame.

If the AP needs to perform a downlink transmission to the station using PCR, the AP may transmit the wake-up frame immediately after transmitting the WUR beacon frame to the station. Alternatively, the AP may insert a Traffic Indication Map (TIM) information indicating that there is downlink data to be transmitted through PCR in the WUR beacon frame. Alternatively, the AP may transmit to the station a wake-up frame that includes TIM information indicating that there is downlink data to be transmitted.

If a station operating in a WUR mode fails to receive a WUR beacon frame for a predetermined time, the station may wake-up a PCR transceiver to check the network status. At this point, the predetermined time may be determined based on the network channel environment. If the station does not receive a PCR beacon frame from an AP associated with the station, the station may perform active scanning using the PCR transceiver. Specifically, the station may transmit a probe request frame through PCR. This is because the station may determine that the connection with the AP is lost.

Figure 13:
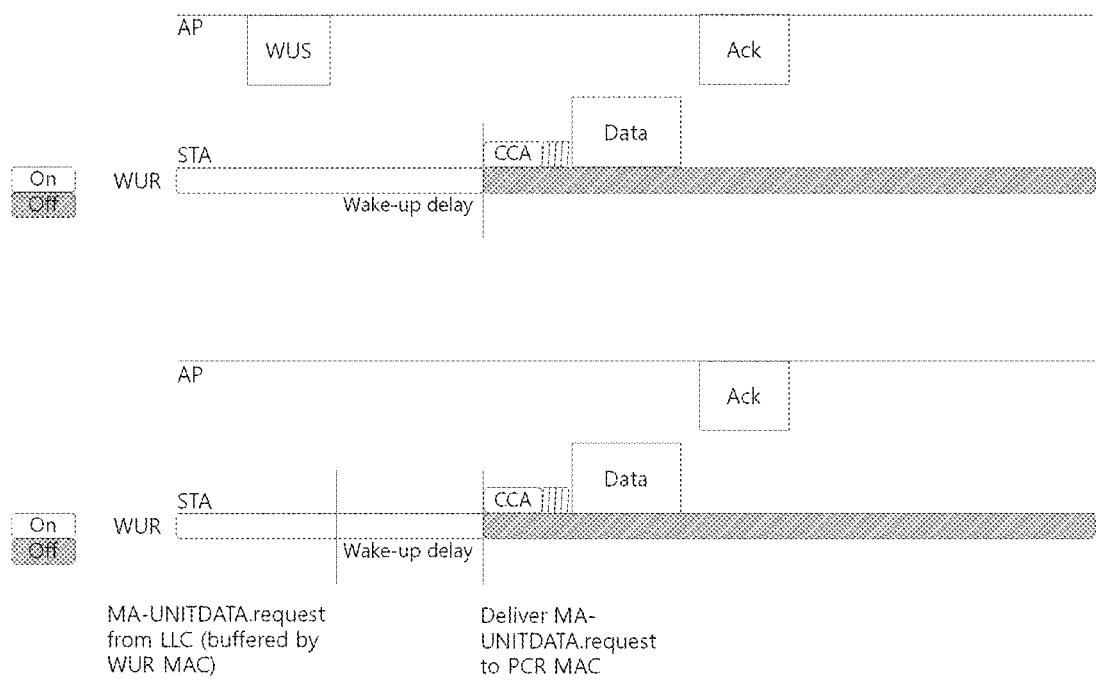
FIG. 13 is a diagram illustrating a wake-up operation of a wireless communication terminal according to an embodiment of the present disclosure.

FIG. 13 is a diagram illustrating a wake-up operation of a wireless communication terminal according to an embodiment of the present disclosure.

If a PCR transceiver of a station is in a PCR doze state, the station may not receive a PCR frame transmitted from an AP through PCR. Accordingly, the station may not perform an operation related to a Network Allocation Vector (hereinafter referred to as NAV). For example, when a first station receives the wake-up frame from the AP and switches the PCR from a PCR doze state to a PCR awake state, it may be difficult for the first station to know whether another second station within the same BSS as the BSS to which the first station belongs is performing transmission. At this point, if a second station belonging to the same BSS as the first station but located in an area where no signal is detected by the first station is transmitting a frame to the AP, the frame transmission of the first station may cause a collision.

Accordingly, the station may wait until the frame for setting the NAV is detected. In this case, the NAV may be a timer indicating the time when a wireless medium (WM) is expected to be busy in use for transmission between other wireless communication terminals. If the NAV is set by another station, the station may not be able to access the channel regardless of a Clear Channel Assessment (CCA) result. In addition, the station may attempt to transmit a frame at a time point after the set NAV. At this point, if the channel is maintained to be idle continuously, the station may further perform a CCA operation until a predetermined time. In addition, if a frame for setting the NAV is not detected until the corresponding time after the CCA operation, the station may attempt to transmit the frame. Specifically, if the station does not detect a radio signal with a signal strength equal to or higher than a CCA threshold, the station may determine that the channel is idle. In this case, the station may attempt to access the channel.

According to an embodiment, when a PCR medium access control (MAC) layer of a station receives data from an upper layer, the station may perform a contention procedure according to a backoff window (hereinafter referred to as "contention procedure"). At this point, the contention procedure may follow an Enhanced Distributed Channel Access (EDCA) rule for each access category of data to be uplink-transmitted. If a legacy station transmits a new data frame to the AP, a PCR MAC layer of the legacy station may receive the MA-UNITDATA.request from the upper layer. On the other hand, in the case of a station using a WUR MAC layer which operates independently of the PCR MAC layer according to an embodiment of the present disclosure, the MA-UNITDATA.request may be received from the upper layer through the WUR MAC layer. Accordingly, the WUR MAC layer of the station may store the MA-UNIT-DATA.request until the PCR transceiver completes the wake-up. In addition, after the station completes the PCR wake-up, the station may deliver the MA-UNITDATA.request stored in the WUR MAC layer to the PCR MAC layer. This is because if the PCR MAC layer of the station does not properly receive the MA-UNITDATA.request, it may be difficult for the station to start the contention procedure. In the case of a station using a MAC Service Access Point (SAP) that operates by integrating PCR and WUR according to another embodiment, the MAC SAP of the station may receive MA-UNITDATA.request from the upper layer after the MAC SAP wakes-up. Accordingly, the station may perform the backoff procedure properly after the wake-up.

Meanwhile, as described above, a station may activate a power management (PM) function to reduce power consumption. Here, the PM function may represent a PCR-based power save operation provided by an existing wireless LAN. Hereinafter, the PCR-based power save operation provided in the existing wireless LAN will be described. A station that has activated the PM function may be in the active mode or the PS mode described above. In active mode, a station may always be expected to be in PCR awake state. On the other hand, in the PS mode, the station may be in PCR awake or PCR doze state. In PS mode, the station may transition to the awake state to transmit/receive data. If the station is in the PCR doze state, the AP may not transmit data to the station. The AP may check the probability that the station is in the PCR doze state. The AP may confirm whether each of stations belonging to the BSS of the AP operates in the PS mode or in the active mode. Also, the AP may store the operation mode of the each of stations belonging to the BSS of the AP. The station may transmit data to the AP and information indicating whether the mode is switched or not. At this point, the station may insert information which indicates the operation mode of the station into the control field of the frame.

Specifically, the power management subfield (PM subfield) of the control field may include information indicating a mode of the station related to the PM function. Further, when the station transitions from an active mode or a PS mode to the PS mode or the active mode, the station may inform the AP through the PM subfield that the mode is transitioned. For example, if the station wants to transition from active mode to PS mode, the station may set the PM subfield to '1'. Further, after the frame exchange including the information indicating the mode of the station related to the PM function is completed between the station and the AP, the station may transition the mode related to the PM function. At this point, the station may use a sequence requesting an immediate response. For example, the station may request an immediate response, such as an Ack/BA (Block Ack) frame, to the AP in response to a frame transmission that includes the PM subfield. If the station transmits a frame with the PM subfield set to '1' to the AP and successfully receives an immediate response from the AP, the station may operate based on the PS mode. In contrast, if the station transmits a frame with the PM subfield set to '0' to the AP and successfully receives an immediate response from the AP, the station may operate based on the active mode.

In the PM function described above, since the PCR doze state does not turn off the power of an entire wireless communication terminal, the wireless communication terminal may transition to the PCR awake state in a relatively short period of time. Also, even in the case of operating in the PS mode, the wireless communication terminal may maintain the PCR awake state at a period of time determined according to at least a predetermined period. Accordingly, the wireless communication terminal may receive the BSS-related information of the wireless communication terminal. However, in a WUR mode, the wireless communication terminal may wake-up through a low power WURx. In this case, the wireless communication terminal may not maintain the PCR awake state in a period of receiving a PCR beacon frame. In addition, the PCR transition delay that the wireless communication terminal receives the wake-up frame to transition the PCR transceiver of the wireless communication terminal to the PCR awake state may be relatively long. Accordingly, the AP may reject the WUR mode request of the station. This is because if the AP is to transmit data or BSS-related information of the station to the station, it is required for the station to maintain the PCR-awake state.

Figure 14:
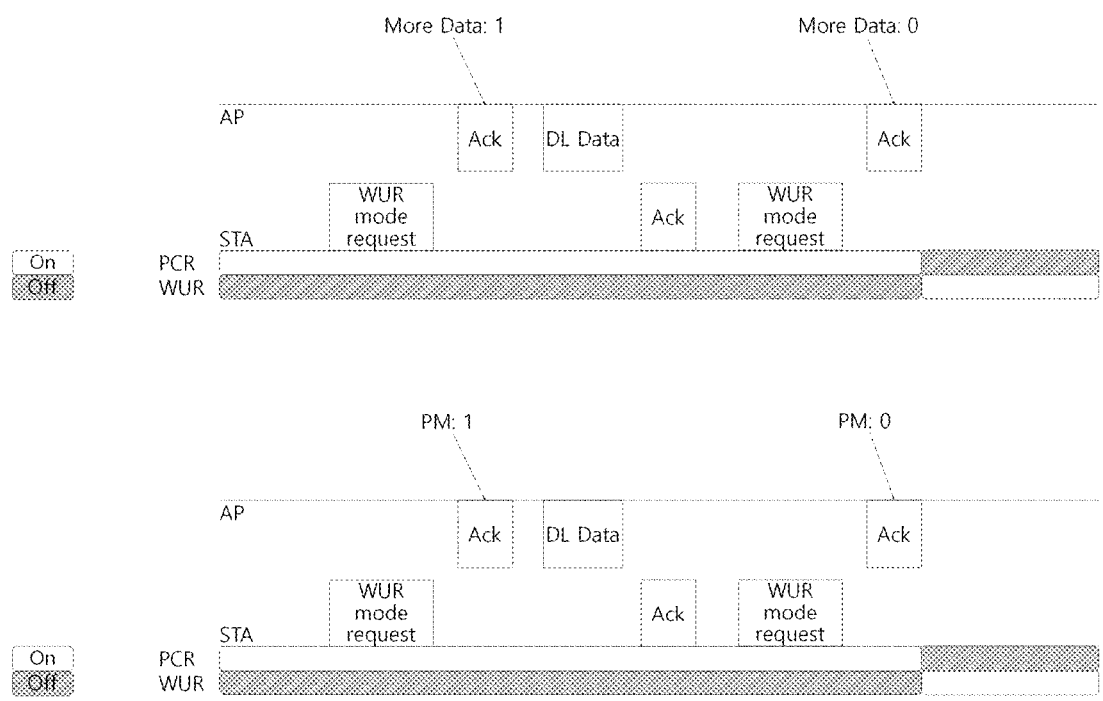
FIG. 14 is a diagram illustrating a method in which an AP according to an embodiment of the present disclosure rejects to enter a WUR mode of a station.

FIG. 14 is a diagram illustrating a method in which an AP according to an embodiment of the present disclosure rejects to enter a WUR mode of a station. Referring to FIG. 14, an AP may receive a first WUR mode request frame from a station. The AP receiving the first WUR mode request frame may transmit an immediate response to the first WUR mode request frame. For example, the immediate response may be the WUR mode response frame described above. At this point, the AP may insert a signaling that rejects the station to enter the WUR mode into the WUR mode response frame. For example, information that indicates the station to enter the WUR mode may be signaled through the MAC header of the response frame. In addition, the MAC header may include a More data field indicating whether there is data to be transmitted additionally after the corresponding frame. At this point, the More data field may be a sub-field included in a Frame Control field. If the AP is to reject the WUR mode entry of the station, the AP may activate the More data field. At this point, the activation of the More data field may indicate a state in which downlink data to be transmitted exists. For example, the AP may set the More data field to '1'. Alternatively, in this case, the AP may set the above-described PM subfield to '1'.

According to another embodiment, the AP may transmit an action frame rejecting that the station enters the WUR mode in response to the first WUR mode request frame. In this case, the AP may transmit an action frame rejecting the WUR mode entry in the form of an immediate response to the first WUR mode request frame. That is, the AP may transmit an action frame rejecting the WUR mode entry immediately after SIFS. The action frame rejecting the WUR mode entry should be transmitted before the station enters a WUR mode. At this point, the action frame rejecting the WUR mode entry may be a frame of the same format as the WUR mode request frame. In addition, an action frame rejecting the WUR mode entry may include code information indicating whether the station is allowed to enter the WUR mode.

In the embodiment of FIG. 14, if there is data to be downlink-transmitted to the station, an AP may transmit a WUR mode response frame containing information rejecting a WUR mode entry of the station. The station that receives information rejecting the WUR mode entry may not enter a WUR mode until the station receives at least one downlink transmission data. Then, the station receiving the downlink transmission data may transmit the second WUR mode request to the AP. For example, a station receiving information rejecting a WUR mode entry may transmit a second WUR mode request frame after receiving one or more downlink transmission data. Alternatively, if the station receives downlink transmission data which includes the deactivated More data field from the AP, the station may transmit the second WUR mode request frame.

Meanwhile, a wireless communication terminal may operate in a WUR mode and simultaneously operate in a PCR-based active mode or a PS mode supported by an existing wireless LAN. As described above, the WUR mode may be a mode for performing a WUR-based operation. According to an embodiment of the present disclosure, the wireless communication terminal operating in the WUR mode may operate differently from the PCR operation of the wireless communication terminal defined in the existing wireless LAN. This is because the wireless communication terminal operating in the WUR mode may receive required information from the base wireless communication terminal through a WURx. Hereinafter, a method of driving the PCR transceiver of the wireless communication terminal operating in the WUR mode will be described in detail with reference to FIG. 15 and FIG. 16.

Figure 15:
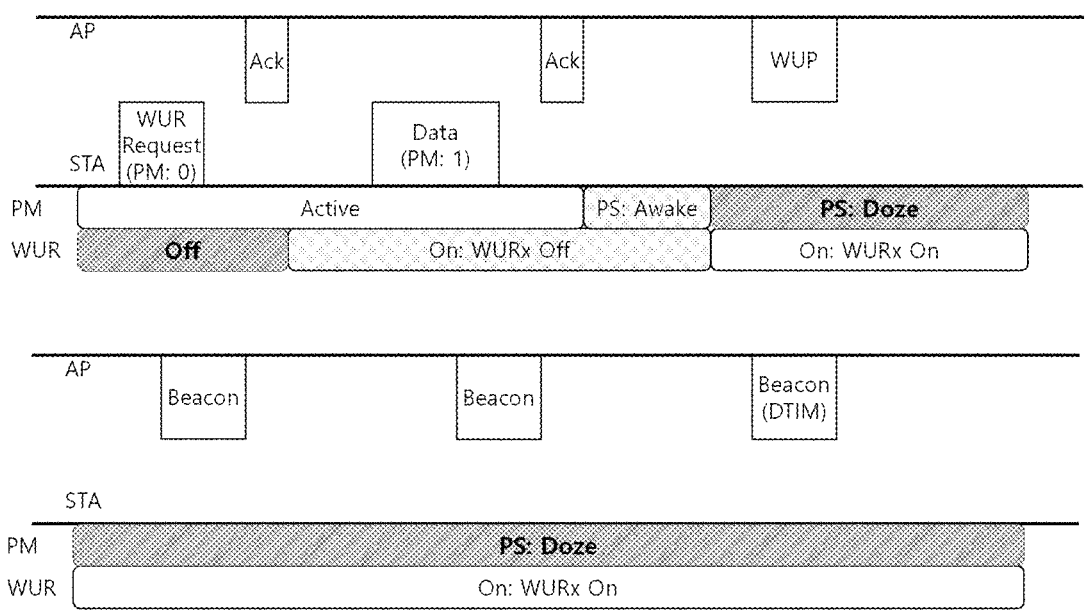
FIG. 15 is a diagram illustrating a method of operating a wireless communication terminal operating in a PS mode and a WUR mode according to an embodiment of the present disclosure.

FIG. 15 is a diagram illustrating an operation method of a wireless communication terminal according to an embodiment of the present disclosure.

Referring to FIG. 15, the state of a WURx in the WUR mode may be transitioned in conjunction with the mode of a PCR transceiver. For example, a wireless communication terminal may enter a WUR mode through the WUR association procedure described above. When the wireless communication terminal is in an active mode, the wireless communication terminal may maintain a WURx of the wireless communication terminal in a WURx doze state even when the wireless communication terminal enters the WUR mode. Specifically, the wireless communication terminal may turn off the power of the WURx and may not maintain the power of the WURx. This is because the wireless communication terminal must maintain the PCR awake state when the wireless communication terminal is in the active mode. On the other hand, when the wireless communication terminal is in the PS mode, the wireless communication terminal may transition the PCR from the PCR awake state to the PCR doze state. In this case, the wireless communication terminal may be in a state intended for low power operation. Accordingly, when the PCR transceiver of the wireless communication terminal is in the PCR doze state, the wireless communication terminal that enters the WUR mode may wait for receiving the WUR frame received through the WURx.

According to the PS mode defined in IEEE 802.11, when the wireless communication terminal operates in the PS mode, the wireless communication terminal shall maintain a PCR awake state at least in a period of time determined based on a delivery traffic indication map (DTIM). Here, the DTIM period may be a period set based on a beacon reception period indicating a period during which the wireless communication terminal receives the beacon frame. The DTIM period may be equal to or longer than the beacon reception period. For example, the DTIM period may be the n-th beacon reception period. Also, the DTIM period may be signaled in the link establishment process described above. The wireless communication terminal may receive a DTIM beacon frame to be described later through a PCR transceiver based on the DTIM period. In addition, the wireless communication terminal operating in the PS mode may receive the group downlink data based on the DTIM period. The DTIM beacon frame and the group downlink data will be described in detail with reference to FIG. 16. Hereinafter, a 'beacon frame' is used as a term to designate a PCR beacon frame received through a PCR transceiver unless otherwise specified. For example, the beacon frame may be a PCR beacon frame periodically transmitted through PCR. In addition, the beacon frame may include a DTIM beacon frame.

Unlike this, according to an embodiment of the present disclosure, a wireless communication terminal operating in a WUR mode may not perform an operation to listen to a beacon frame. This is because the wireless communication terminal operating in the WUR mode may receive the BSS-related information through a WUR beacon frame or a wake-up frame. Also, the wireless communication terminal operating in the WUR mode may not receive the DTIM beacon frame as well as the beacon frame other than the DTIM beacon frame. The wireless communication terminal operating in the WUR mode and the PS mode may maintain the PCR doze state based on the DTIM period. For example, the wireless communication terminal may maintain the PCR doze state for a predetermined time from an expected reception time at which reception of a DTIM beacon frame is expected based on at least a DTIM period. This is because the wireless communication terminal operating in the WUR mode may receive information on the downlink data from an AP using the WUR beacon frame or the wake-up frame instead of the PCR beacon frame.

For example, a wireless communication terminal operating in the WUR mode and the PS mode may not receive a beacon frame. Specifically, the wireless communication terminal may not receive a beacon frame until it obtains information on reception of a beacon frame from the time when the wireless communication terminal enters the WUR mode. In this case, the wireless communication terminal may not perform the wake-up operation for receiving the PCR beacon frame. Before obtaining the information on the beacon frame reception from when the wireless communication terminal enters the WUR mode, it may maintain the PCR doze state at least for a predetermined time from the expected reception time at which reception of the beacon frame is expected. Information on beacon frame reception will be described later with reference to FIG. 16.

In the present disclosure, the expected reception time at which reception of the beacon frame is expected may be determined according to a predetermined reception period. The predetermined reception period may indicate a beacon transmission period during which a beacon frame is transmitted. Alternatively, the predetermined reception period may be a DTIM period in which a DTIM beacon frame is transmitted. At this point, the predetermined reception period may be signaled in the link establishment process between the wireless communication terminals. Alternatively, the predetermined reception period may be signaled through the WUR frame. Referring to FIG. 15, the wireless communication terminal may maintain the PCR transceiver of the wireless communication terminal in the PCR doze state even during a period in which the reception of the DTIM beacon frame is expected. Through this, the station may obtain additional power save effects.

Meanwhile, like the wireless network management (WNM) sleep mode, a wireless communication terminal may perform a power save operation using a negotiated service period. In this case, the wireless communication terminal may maintain a PCR transceiver in a PCR-awake state based on the negotiated service period according to a PCR schedule. Accordingly, when the wireless communication terminal uses the negotiated service period, the wireless communication terminal entering a WUR mode may maintain the PCR awake state for the negotiated service period. However, the wireless communication terminal may not maintain the PCR awake state for the negotiated service period. The wireless communication terminal may not receive the beacon frame as in the above-described embodiment.

According to an embodiment of the present disclosure, even when a wireless communication terminal is operating in a PS mode and a WUR mode at the same time, the wireless communication terminal may have to listen to a beacon frame in a specific requirement. For example, the wireless communication terminal may update the BSS information of the wireless communication terminal through a PCR beacon frame. Also, a base wireless communication terminal may transmit group downlink data to wireless communication terminals belonging to the BSS in the DTIM period. Specifically, the wireless communication terminal using the WUR mode simultaneously with the PS mode may receive the beacon frame based on the WUR frame. Hereinafter, a method of receiving a PCR beacon frame by a wireless communication terminal operating in the WUR mode will be described according to an embodiment of the present disclosure.

Figure 16:
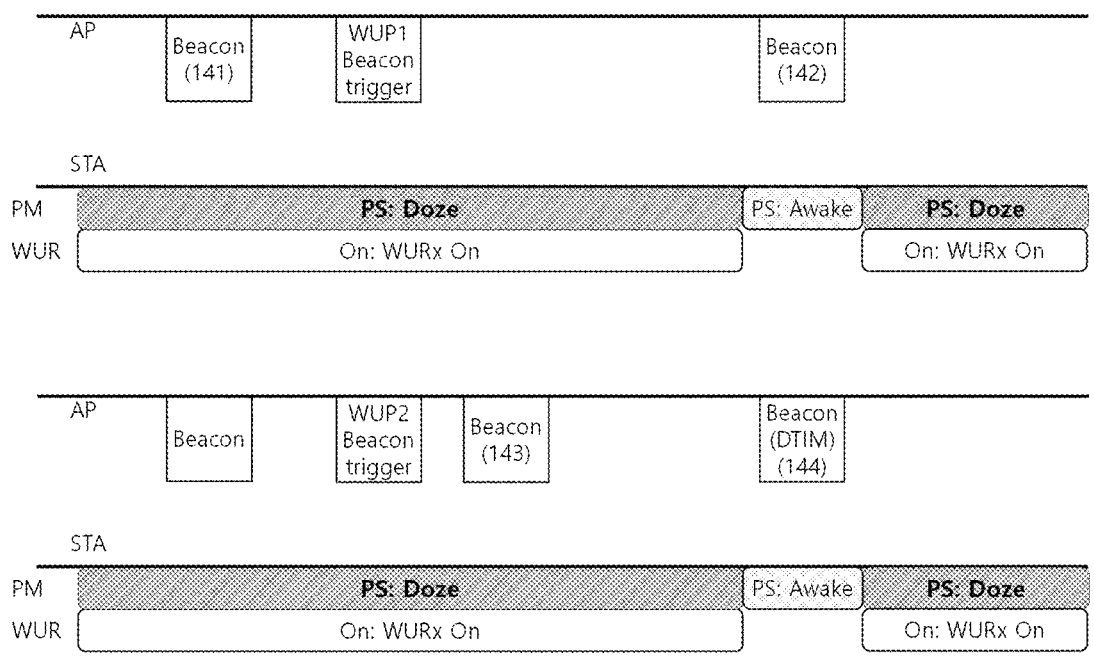
FIG. 16 is a diagram illustrating a method of receiving a PCR beacon frame by a wireless communication terminal operating in a PS mode and a WUR mode according to an embodiment of the present disclosure.

FIG. 16 is a diagram illustrating a method of receiving a PCR beacon frame by a wireless communication terminal operating in a PS mode and a WUR mode according to an embodiment of the present disclosure.

According to an embodiment, a station may receive a beacon frame based on a WUR frame received from an AP. Here, the WUR frame may include at least one of a WUR beacon frame or a wake-up frame. The station may determine whether to receive the beacon frame transmitted from the AP through the PCR transceiver based on the WUR frame. For example, when a station does not receive a WUR frame, the station may not receive a beacon frame through the PCR transceiver as described above. On the other hand, when the station receives the WUR frame, the station may receive the beacon frame according to the above-mentioned predetermined reception period based on the WUR frame.

According to an embodiment, the WUR frame may include information on the beacon frame reception of the station. Specifically, the information on the reception of beacon frame may include an indicator that triggers the station to receive the beacon frame. The AP may insert an indicator in the WUR frame that triggers the station to receive the beacon frame. The station may receive a WUR frame containing an indicator from the AP. In this case, the station may receive the beacon frame through the PCR transceiver of the station based on the indicator included in the WUR frame. The station may receive a beacon frame even if it is operating in a WUR mode based on the indicator. Specifically, the AP may insert the indicator into a wake-up frame. At this point, the AP may use the type dependent (TD) control field of the wake-up frame. Here, the TD control field may be a field containing different control information according to a frame type of the WUR frame. The AP may insert the indicator into the TD control field of the wake-up frame. The station may receive a wake-up frame containing the indicator through a WURx. This allows the AP to transmit the indicator to the station that triggers the reception of the beacon frame using the wake-up frame.

Also, the station may receive a beacon frame according to a predetermined reception period by waking-up the PCR transceiver of the station based on the WUR frame. For example, the station may maintain the PCR transceiver of the station in the PCR-awake state at least for a predetermined time from an expected reception time at which reception of a beacon frame is expected according to the predetermined reception period. Here, the predetermined time may be a period during which the beacon frame may be received. The predetermined time may be determined based on a time that is expected to be consumed in receiving the beacon frame. The predetermined time may be signaled in the link establishment process between the AP and the station.

According to an embodiment, the expected reception time may be determined based on the predetermined period and the WUR reception time at which the station received the WUR frame. The expected reception time may indicate the nearest reception period that comes after the WUR reception time. In FIG. 16, the time between the first beacon frame 141 and the second beacon frame 142 may indicate a predetermined period. In this case, the station may receive the second beacon frame 142, which is a beacon frame transmitted at the nearest reception period that comes after the WUR reception time of receiving a first wake-up frame WUP1.

Also, according to an embodiment, an expected reception time may be determined based on a PCR transition delay of a station. For example, the expected reception time may represent the nearest reception period that comes after a PCR transition delay elapses based on the WUR reception time. In FIG. 16, the beacon frame corresponding to the nearest reception period, which comes based on the WUR reception time at which the station receives a second wake-up frame WUR2, may be a third beacon frame 143. If the time elapsed by the PCR transition delay of the station from the time when the station receives the second wake-up frame is after the reception period corresponding to the third beacon frame 143, the station may receive a fourth beacon frame 144 corresponding to the next reception period. Even if the station wakes-up immediately after receiving a WUR frame, it may be difficult to receive a beacon frame due to a PCR transition delay. Meanwhile, the information on a reception of a beacon frame may include beacon reception time information indicating a transmission time of a beacon frame to be received by the station. In this case, the station may obtain the above-described expected reception time based on the WUR frame.

Specifically, the station prior to receiving the WUR frame may be in the PCR doze state. In this case, the station may transition the PCR transceiver from the PCR doze state to the PCR awake state before the expected reception time comes. For example, the station may wake-up at the time when the WUR frame is received, and then maintain the PCR awake state. Alternatively, the station may transition the state of the PCR transceiver based on a PCR transition delay of the station. The station may determine the wake-up time at which the PCR transceiver wakes-up based on the expected reception time and the PCR transition delay. For example, if the time that the PCR transition delay elapses from the reception of the WUR frame is ahead of the expected reception time, the station may not wake-up at the time that the WUR frame is received. In this case, the station may delay the wake-up time point from the time at which the WUR frame is received. For example, the station may wake-up at the calculated time by calculating inversely the PCR transition delay from the expected reception time. Meanwhile, if the PCR transceiver of the station receiving the wake-up frame is in the PCR-awake state, the station may maintain the PCR-awake state until the expected reception time.

According to an embodiment, the indicator described above may include an indicator that triggers a reception of a group DTIM beacon frame indicating a delivery traffic indication map (DTIM) beacon frame when group downlink data is present. Here, the group downlink data may represent downlink data transmitted to whole of the plurality of stations included in a station group. Also, the group downlink data may indicate group addressed downlink data in which a receiver address for downlink data is a group address. Also, the DTIM beacon frame may be a beacon frame transmitted in the DTIM period. As described above, the DTIM period may be a period set based on a beacon reception period at which a beacon frame, including a DTIM beacon frame, is received. The DTIM period may be equal to or longer than the beacon reception period. The DTIM period may be a multiple of the beacon reception period (e.g., integer multiple). For example, the DTIM period may be a n-th beacon reception period. In addition, the group DTIM beacon frame may include information indicating that there is group downlink data to be transmitted to a station group including a plurality of stations. For example, the AP may insert bitmap information indicating that there is downlink data to be transmitted to a station group into the group DTIM beacon frame.

Specifically, information indicating that group downlink data exists may be represented using bitmap information. The bitmap information may include an identification bit indicating whether there is downlink data to be transmitted to a station group including a plurality of stations. In addition, the bitmap information may include an identification bit indicating whether there is downlink data to be transmitted to each station. At this point, each of the identification bits may include at least one bit. Specifically, the bitmap information may be TIM bitmap information. For example, the TIM bitmap information may indicate, using at least one bit, information indicating whether there is downlink data in the transmission standby state from the AP to the station for each station. The TIM bitmap information may be composed of a plurality of identification bits ('0' or '1') indicating whether there is downlink data to be transmitted to each group or station. The AP may insert TIM bitmap information indicating that there is downlink data to be transmitted through PCR to the station in the beacon frame. Specifically, if at least one bit allocated to indicate information on the group downlink data in the TIM bitmap is active, it may mean that there is group downlink data in the AP.

According to an embodiment, a station may receive a WUR frame including an indicator that triggers a reception of a group DTIM beacon frame. Specifically, referring to FIG. 16, an AP may transmit an indicator to the station to trigger a reception of the beacon frame through a wake-up frame. At this time, the wake-up frame may be a group wake-up frame that triggers a wake-up of the PCR transceiver of a plurality of stations. In this case, the AP may transmit the group wake-up frame in a broadcast manner. In addition, the station may receive a group DTIM beacon frame based on an indicator that triggers the reception of the group DTIM beacon frame. The station may maintain the PCR awake state for a predetermined time from the expected reception time determined according to the DTIM period. For example, the station may maintain the PCR-awake state at least until the DTIM beacon frame is received after waking-up.

According to an embodiment, the station may obtain DTIM period information in which a DTIM beacon frame is received. For example, the station may obtain DTIM period information through a previously received beacon frame. Specifically, the station may obtain the DTIM period information based on TIM information included in the beacon frame. The station may obtain the DTIM period information based on TIM information and a beacon reception period obtained through the link establishment procedure between the AP and the station. The station may determine reception period of a beacon frame to be received based on the indicator. If the beacon frame to be received is a group DTIM beacon frame, the station may maintain the PCR awake state for a predetermined time from a time at which transmission of the DTIM beacon frame is expected. In this case, the station may not maintain the PCR awake state at a time at which transmission of a beacon frame other than the DTIM beacon frame is expected. For example, the nearest beacon reception period coming after the station receives a WUR frame may not correspond to the DTIM period. In this case, the station may not maintain the PCR awake state for the predetermined time from the time at which the nearest beacon reception period begins.

Also, according to an embodiment, the station may receive group downlink data based on an indicator that triggers group DTIM beacon frame reception. In this case, the station may maintain the PCR awake state until the time at which it receives at least a part of the group downlink data after waking-up. For example, the AP may transmit group downlink data to a plurality of stations based on a group DTIM beacon frame. If group downlink data is buffered in the AP, the AP may transmit an indicator that triggers reception of a group DTIM beacon frame of the plurality of stations through a WUR frame. Further, after the AP transmits the WUR frame, the AP may transmit the group downlink data together with the group DTIM beacon frame through the PCR transceiver. The station may confirm whether there is the group downlink data based on a bitmap information included in the group DTIM beacon frame.

In addition, the station may receive group downlink data transmitted with the group DTIM beacon frame from the AP. The station may receive group downlink data that is subsequently transmitted to the group DTIM beacon frame. The station may maintain the PCR awake state at least from an expected reception time determined according to the DTIM period, to a time receiving at least a part of the group downlink data. For example, the station may maintain the PCR awake state until a time at which it receives a predetermined number of data frames including at least a part of the group downlink data. Alternatively, the station may maintain the PCR awake state to a time at which it receives the entire of group downlink data buffered in the AP.

In addition, the indicators described above may additionally include information specifying a beacon frame to be received by the station. For example, the beacon frame may be specified according to a reception period. As described above, the DTIM beacon frame may be specified as a frame transmitted in the DTIM period. If there is group downlink data, the AP may transmit an indicator that triggers a reception of a DTIM beacon frame through a second field different from a first field. Here, each of the first field and the second field may be a field included in the WUR frame. Also, the second field may be a separate field different from the first field. And the first field indicates an indicator that triggers a reception of a beacon frame other than the group DTIM beacon frame. Alternatively, the indicator between the AP and the station may always be set to trigger the reception for the DTIM beacon frame.

Hereinafter, a method in which a wireless communication terminal according to an embodiment of the present disclosure operates in a WUR duty-cycle mode will be described with reference to FIG. 17 through FIG. 19.

Figure 17:
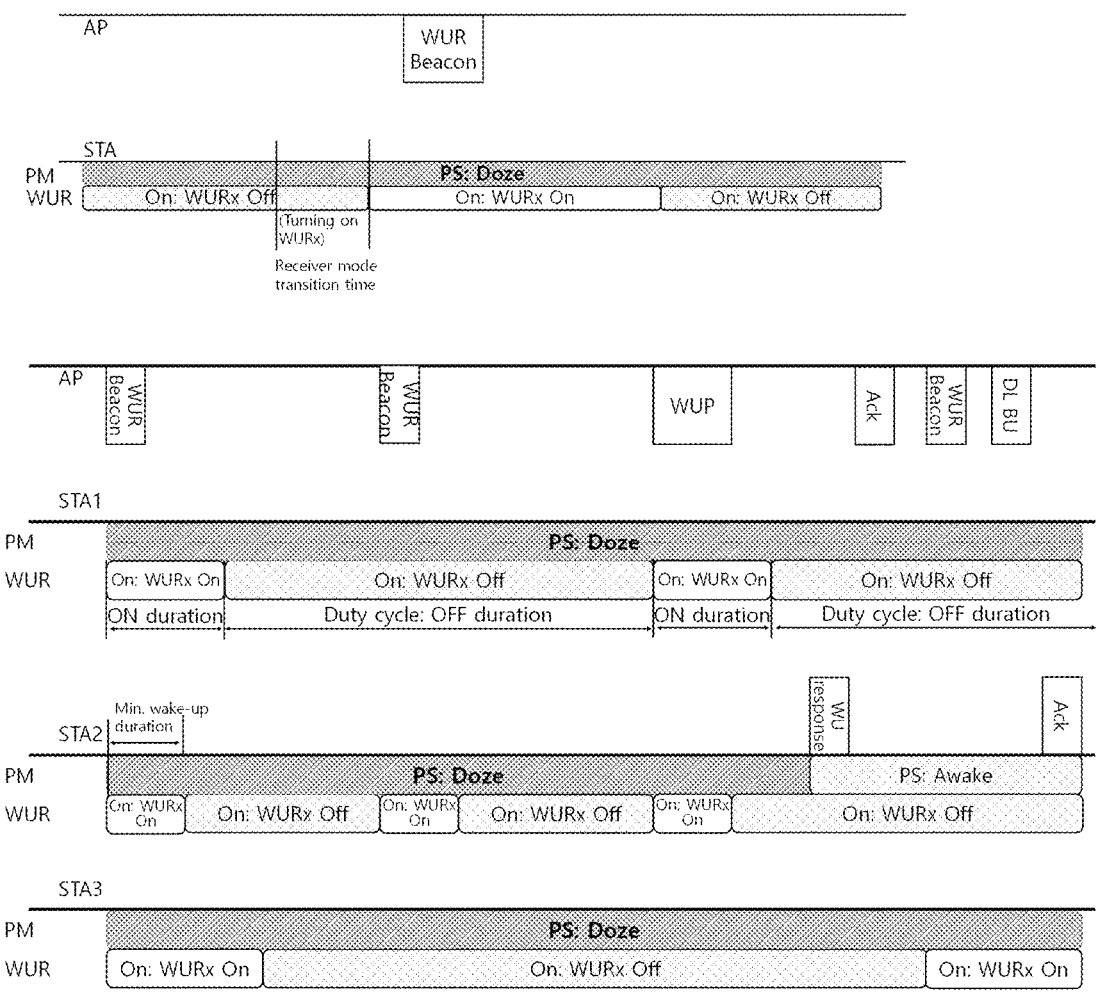
FIG. 17 is a diagram illustrating a WUR duty-cycle mode operation of a wireless communication terminal according to an embodiment of the present disclosure.

FIG. 17 is a diagram illustrating a WUR duty-cycle mode operation of a wireless communication terminal according to an embodiment of the present disclosure. According to an embodiment, intermittent data transmission/reception may be performed when a wireless communication terminal supporting WUR-based power save is incorporated into an IoT device, such as a sensor. In this case, the low power operation of the wireless communication terminal may be relatively important compared to the transmission/reception latency. Accordingly, the wireless communication terminal supporting the WUR-based operation may operate in a duty-cycle mode in order to minimize power consumption. Here, the duty-cycle mode may mean a mode in which a WURx is operated in a doze state for a certain time in a predetermined duty-cycle period. The duty-cycle period may indicate a period in which the wireless communication terminal turns on WURx. When the wireless communication terminal operates in the duty-cycle mode, the wireless communication terminal may maintain the WURx to be receivable for on-duration. The on-duration may indicate a duration in which the wireless communication terminal maintains the WURx that is turned on according to the duty-cycle period to be in a receivable state. In addition, the wireless communication terminal may maintain both PCR and WURx in a doze state during off-duration. The off-duration may indicate a duration in which the wireless communication terminal maintains the WURx to be in a turned-off state according to the duty-cycle period. The wireless communication terminal may increase the power efficiency by operating a WURx in a doze state as well as PCR through the duty-cycle mode.

According to an embodiment, a AP and a station may transmit and receive information related to a duty-cycle before operating in a duty-cycle mode. This is because the AP may transmit the wake-up frame only in the on-duration of the station operating in the duty-cycle mode. Here, the information related to the duty-cycle may include at least one of a duty-cycle period, a length of an on-duration, a start time of a duty-cycle operation, and a WUR channel.

According to an embodiment, the on-duration length of the station may be determined to be greater than or equal to the minimum wake-up duration. Here, the minimum wake-up duration may be the value received from the AP. The station may transmit to the AP the on-duration length set based on the minimum wake-up duration.

According to an embodiment, the duty-cycle period may be determined as a multiple of the base unit. Further, the base unit may be a value obtained from the AP. Alternatively, the base unit may be a predetermined value. The base unit may be a value set based on a WUR beacon frame transmission period of the AP. The AP periodically transmits a beacon frame, but the station may receive the WUR beacon frame according to the station's duty-cycle period. That is, the station may not receive all beacon frames transmitted from the AP. For example, the duty-cycles of a plurality of stations connected to the AP may be different from each other. In this case, different sets of stations may receive a WUR beacon frame each of every period in which the AP transmits a beacon frame. Different sets of stations may maintain a WURx awake state for each of every period the AP transmits a beacon frame.

When operating in the duty-cycle mode, the station may maintain the WURx awake state before the on-duration begins. The station may transition the WURx to the WURx awake state at a predetermined beacon frame reception time to receive the WUR beacon frame. However, the present disclosure is not limited thereto. In addition, the station may receive WUR beacon frames through the WURx in on-duration. When receiving a wake-up frame that is not a WUR beacon frame in an on-duration which is expected to receive a WUR beacon frame, the station may consider that it receives a WUR beacon frame. At this time, the wake-up frame may be a wake-up frame transmitted from the AP to the station or a station other than the station.

Figure 18:
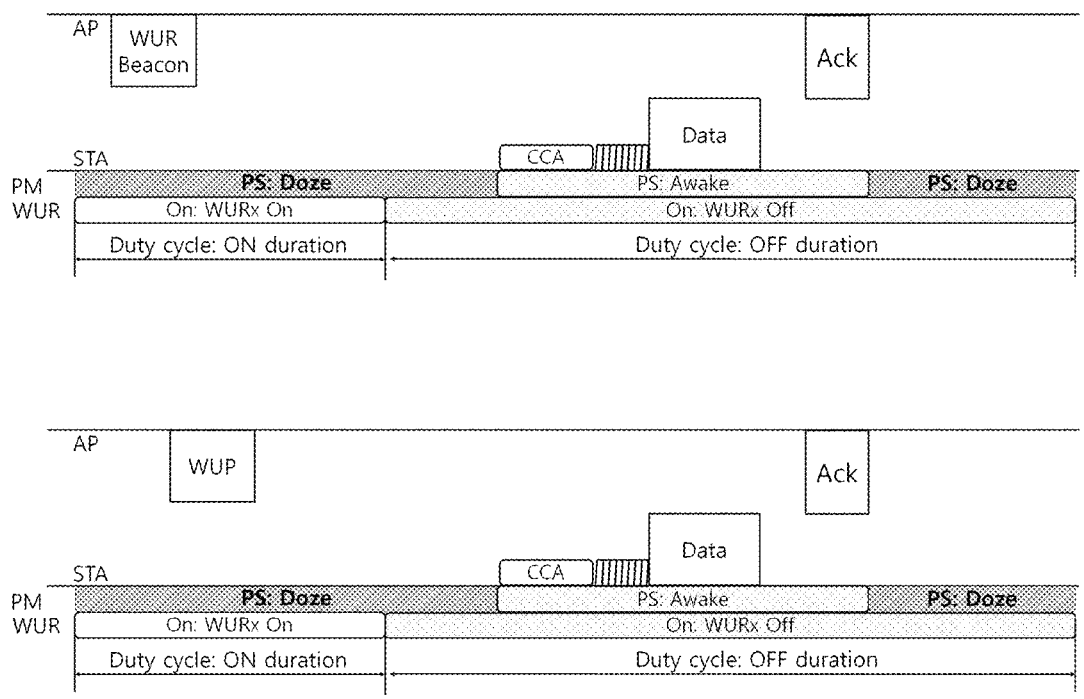
FIG. 18 is a diagram illustrating a method of operating a wireless communication terminal in a WUR duty-cycle mode according to an embodiment of the present disclosure.

FIG. 18 is a diagram illustrating a method of operating a wireless communication terminal in a WUR duty-cycle mode according to an embodiment of the present disclosure.

According to an embodiment, a station may perform a top priority operation to receive a WUR beacon frame from an AP during on-duration. This is because the station may maintain the BSS by using the WUR beacon frame received in on-duration in duty-cycle mode. For example, if the station transitions from a PCR doze state to a PCR awake state to transmit a frame to the AP during on-duration, the uplink transmission of the station may collide with the transmission of the WUR beacon frame of the AP. In addition, other stations sharing the duty-cycle may be prevented from receiving WUR beacon frames from the AP. Thus, the station may restrict uplink transmission during the on-duration of the duty-cycle.

According to an embodiment, when the station is operating in the duty-cycle mode, in on-duration, the station may not attempt uplink transmission until it receives a frame that is regarded as a WUR beacon frame or a WUR beacon frame. The station may transmit uplink data to the AP during off-duration. This is because the uplink transmission operation of the station is not restricted during the off-duration. In addition, the station may maintain a PCR doze state at least for an on-duration. The station may not transition the PCR transceiver from the PCR doze state to the PCR awake state during the on-duration. Also, the station may not transition from PS mode to active mode during on-duration.

According to another embodiment, an AP may transmit a wake-up frame to a station that is in on-duration. In this case, the station may regard the reception of the wake-up frame as receiving the WUR beacon frame. For example, the station may not attempt uplink transmission not requested from the AP until receiving a WUR beacon frame or a frame that is regarded as a WUR beacon frame in an on-duration that is expected to receive a WUR beacon frame. In addition, if the wake-up frame is received, it may not attempt uplink transmission not requested from the AP. In this case, the station may maintain the PCR doze state during the on-duration of the station. Also, the station may not transition the PCR to the active mode. An AP that transmits a wake-up frame may transmit an additional wake-up frame to the station or transmit a wake-up frame to another station. Specifically, the station receiving the wake-up frame may not transmit the above-described WU response frame for the AP. In a general situation, the station receiving the wake-up frame may attempt uplink transmission to transmit the WU response frame for the AP as described above. If the station's wake-up delay is shorter than the remaining on-duration length, the station may perform a wake-up operation.

In addition, the WUR frame may include additional information indicating whether there is an additional WUR frame transmission in on-duration. At this point, the additional information may be included in a wake-up preamble of a WUR frame or in a MAC header of a WUR frame. The station that receives an uplink transmission request from the AP may perform the uplink transmission based on the additional information. Specifically, if the additional information indicates that there is an additional WUR frame, the station may suspend the uplink transmission until the time at which it receives the additional WUR frame. Conversely, if the additional information indicates that there is no additional WUR frame, the station may perform the uplink transmission requested from the AP prior to the time at which it receives an additional WUR frame.

According to an embodiment, if a station attempts an uplink transmission in an off-duration, the station may attempt uplink transmission based on a neighboring on-duration that comes after the off-duration. For example, the station may determine whether to PCR wake-up based on a neighbor on-duration time and a wake-up delay. In the case of a wake-up for uplink transmission not requested by the AP, if the time after the wake-up delay overlaps with an adjacent on-duration, the station may not wake-up. At this point, the station may wake-up after the adjacent on-duration. Also, if the time expected to be required for the uplink transmission overlaps with the adjacent on-duration, the station may wake-up after the adjacent on-duration. This is because the uplink transmission of the station may collide with the wake-up frame transmission or WUR beacon frame transmission of the AP.

Figure 19:
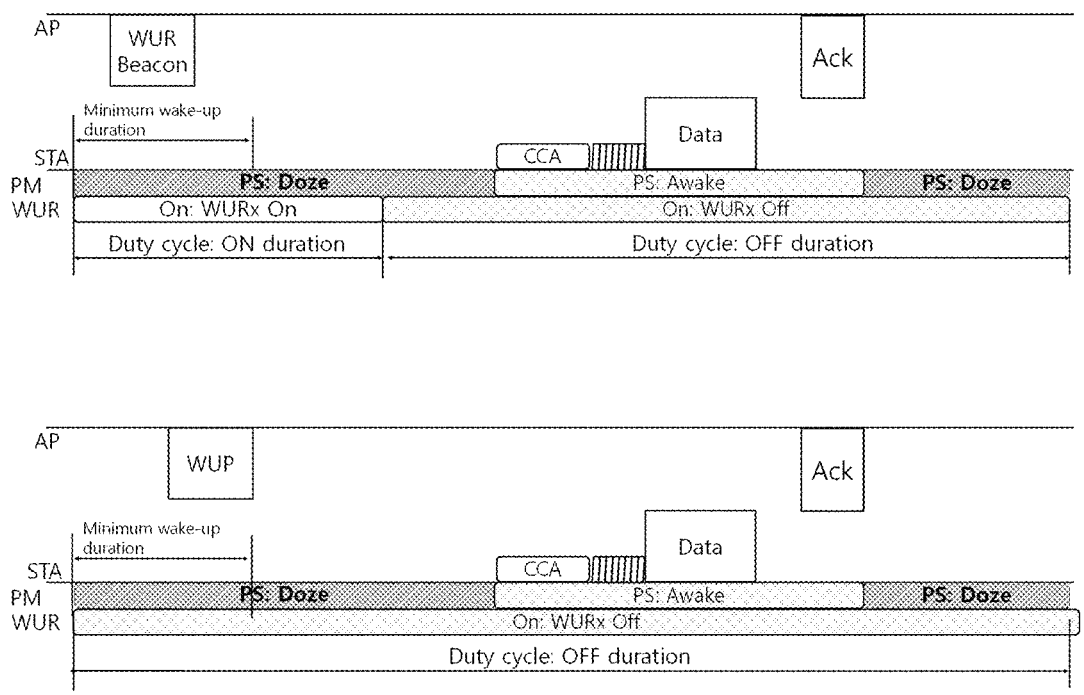
FIG. 19 is a diagram illustrating a method of operating a wireless communication terminal in a duty-cycle mode according to an embodiment of the present disclosure.

FIG. 19 is a diagram illustrating a method of operating a wireless communication terminal in a duty-cycle mode according to an embodiment of the present disclosure.

According to an embodiment, in a duty-cycle mode, a wireless communication terminal may not attempt uplink transmission during a minimum wake-up duration. Further, in the duty-cycle mode, the wireless communication terminal may not transition from a PCR doze state to a PCR awake state for at least a minimum wake-up duration. In the duty-cycle mode, the wireless communication terminal may not transition to the active mode for at least the minimum wake-up duration. This is because it is required to ensure fairness between a plurality of wireless communication terminals having different on-duration lengths. However, the wireless communication terminal may perform the wake-up before the minimum wake-up duration is consumed. For example, when the PCR transition delay of the wireless communication terminal is shorter than the remaining minimum wake-up duration, the wireless communication terminal may perform the wake-up. This is because the wireless communication terminal may take a certain time until the time at which data is transmitted through PCR after wake-up.

According to an embodiment, in an off-duration, a station may determine whether to suspend the uplink transmission based on the time at which the nearest on-duration begins at the uplink transmission time. According to an embodiment, the uplink transmission may be an uplink transmission not requested from the AP. This is because even if an uplink transmission is started in the off-duration of the station, the uplink transmission time and on-duration of the station may overlap, due to the PCR transition delay or the time required for transmission. At this point, the station may suspend the uplink transmission when the minimum wake-up duration and the uplink transmission time of the station overlap in on-duration. The station may determine whether to suspend the uplink transmission based on the PCR transition delay and minimum wake-up duration. Also, the station may decide whether to hold the uplink transmission based on the expected time to spend on uplink transmission. This is because even if the wake-up is completed before the nearest on-duration comes, the uplink transmission time of the station and the minimum wake-up duration of the on-duration may overlap, due to the time required for an uplink transmission. If the uplink transmission is suspended, the station may attempt an uplink transmission to the AP in another off-duration after the on-duration.

In addition, the station may calculate the period in which the WUR beacon frame is transmitted based on the duty-cycle period. The station may determine the period in which the WUR beacon frame is transmitted, even if it is not an on-duration. The station may perform the operations described above with reference to FIG. 19 during the minimum wake-up duration in the period in which the WUR beacon frame is transmitted. In addition, the station may recognize an on-durations of other stations. The station may perform the operations described above with reference to FIG. 19 during the minimum wake-up duration in the on-durations of the other stations.

Hereinafter, a configuration of a wake-up part of a WUR frame according to an embodiment of the present disclosure will be described with reference to FIG. 20 to FIG. 24.

Figure 20:
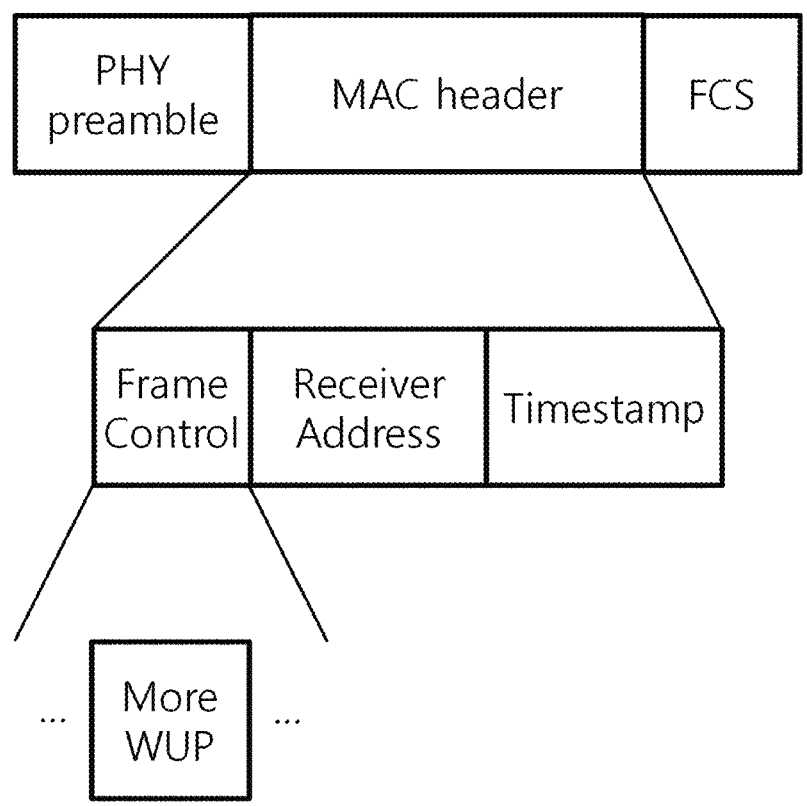
FIG. 20 is diagram showing a configuration of a wake-up part of a WUR frame according to an embodiment of the present disclosure.

FIG. 20 is a diagram showing a configuration of a wake-up part of a WUR frame according to an embodiment of the present disclosure. According to an embodiment, a wake-up part of a WUR frame may include a frame control part, a receiver address part, and an FCS. Specifically, the wake-up part may include a MAC layer header including at least one of a frame control part, a receiver address part, and a timestamp. In addition, the wake-up part may include an FCS.

Here, the frame control part may include at least one of type information or frame length information of the corresponding WUR frame. For example, the frame type information may be information indicating any one of a WUR beacon frame, a unicast wake-up frame, or a multicast wake-up frame. In addition, the frame type information may include information indicating whether each frame includes timestamp information. If the frame has a fixed length according to each frame type, the WUR frame may not include the frame length information. In addition, the frame control part may include information (More WUP) indicating that there is additional WUR frame transmission after the corresponding WUR frame.

The receiver address part may include an AID representing an intended recipient of the WUR frame. Alternatively, the receiver address part may include a portion extracted from the AID or MAC address representing the intended recipient of the WUR frame. According to an embodiment, the receiver address part may be a different value from the MAC address. The wireless communication terminal may determine the frame type of the corresponding WUR frame through the receiver address part. For example, when a frame including a first receiver address allocated to a receiver address indicating a WUR beacon frame is received, the wireless communication terminal may recognize that the WUR frame is a WUR beacon frame. In addition, the wireless communication terminal may receive a second receiver address designated according to a predetermined scheme indicating a multicast WUR frame. In this case, the wireless communication terminal may determine that the wake-up frame is a multicast wake-up frame based on the second receiver address. At this point, the frame control part may not include at least one of the frame type information and the frame length information. Further, when the wake-up frame includes the time stamp conditionally, the frame control part may include a bit indicating whether there is a time stamp. In this case, the frame control part may not include the frame length field.

Figure 21:
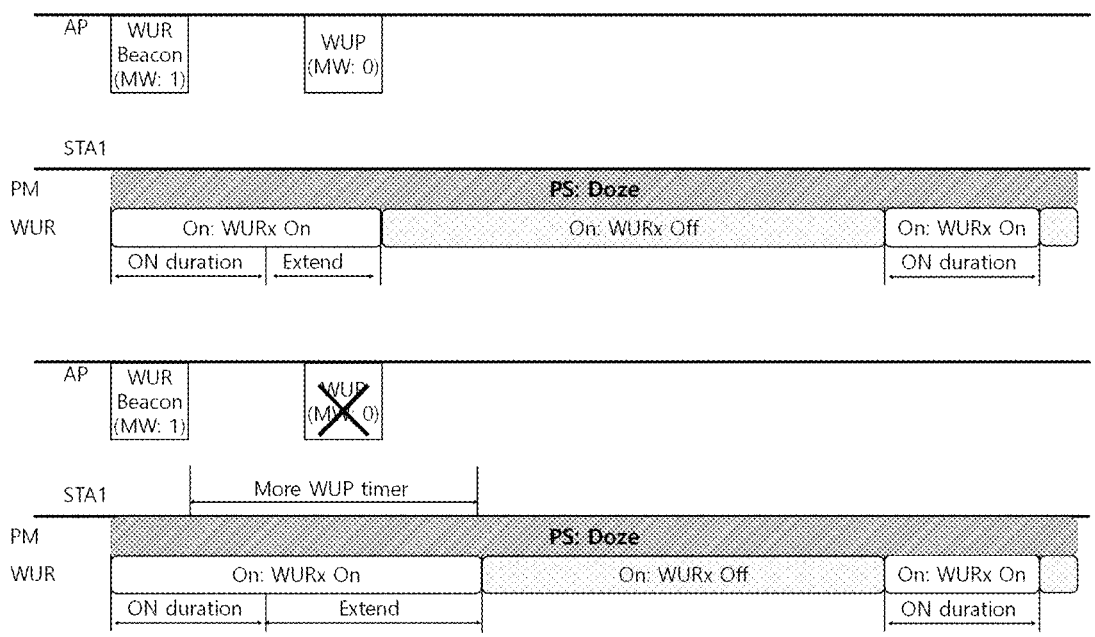
FIG. 21 is a diagram illustrating a method of using a More WUP field according to an embodiment of the present disclosure.

FIG. 21 is a diagram illustrating a method of using a More WUP field according to an embodiment of the present disclosure.

According to an embodiment, a station may continue receiving operation from the time at which an on-duration is started to the time at which the station receives at least one WUR frame. Further, when the More WUP field (MW) of a first WUR frame received by the station is activated, the station may continue to wait for receiving the WUR frame from the time when the first WUR frame is received until the time when the second WUR frame is received. Here, the More WUP field may be a field indicating whether additional WUR frames are transmitted after the received WUR frame. For example, if the More WUP field is activated, it may indicate that additional WUR frame transmissions are scheduled after the previously received WUR frame. On the other hand, if the More WUP field is not activated, it may indicate that additional WUR frame transmissions are not scheduled after the previously received WUR frame. Specifically, the More WUP field may be represented by one bit having a value of '0' (deactivated) or '1' (activated).

Also, the second WUR frame may be the first received WUR frame after the first WUR frame. For example, even if the receiver address part of the first WUR frame received by the station does not contain identification information identifying the station, the station may maintain WURx in the WURx awake state based on the More WUP field of the first WUR frame, regardless of the remaining on-duration length. This is because the receiver address part of the second WUR frame may contain identification information indicating the station. If the More WUP field of the first WUR frame indicates deactivation, the station may perform an off-duration operation regardless of the remaining on-duration length. In addition, if the receiver address part of the wake-up frame includes identification information identifying the station, the station may wake-up the PCR transceiver of the station. The AP may use the More WUP field to efficiently transmit WUR frames to each of a plurality of stations having different on-durations within the BSS.

According to an embodiment, the station may set a timer for off-duration operation at a time at which the first WUR frame with the More WUP field activated is received. If the station fails to receive the wake-up frame, it may not perform the off-duration operation until the next on-duration. At this point, unnecessary power consumption may occur. If the station does not receive an additional second WUR frame until the time at which the timer expires, the station may attempt an off-duration operation at the time at which the timer expires. In addition, if there is an on-duration remaining at the time at which the timer expires, the station may continue the WURx awake state for the remaining on-durations. This is because the AP may transmit the WUR frame to the station during the remaining on-duration. If the AP does not transmit additional WUR frames until the time at which the timer expires, the AP may determine that a station having no remaining on-duration wi perform an off-duration operation. Accordingly, the AP may reschedule a transmission of a WUR frame for the station.

Figure 22:
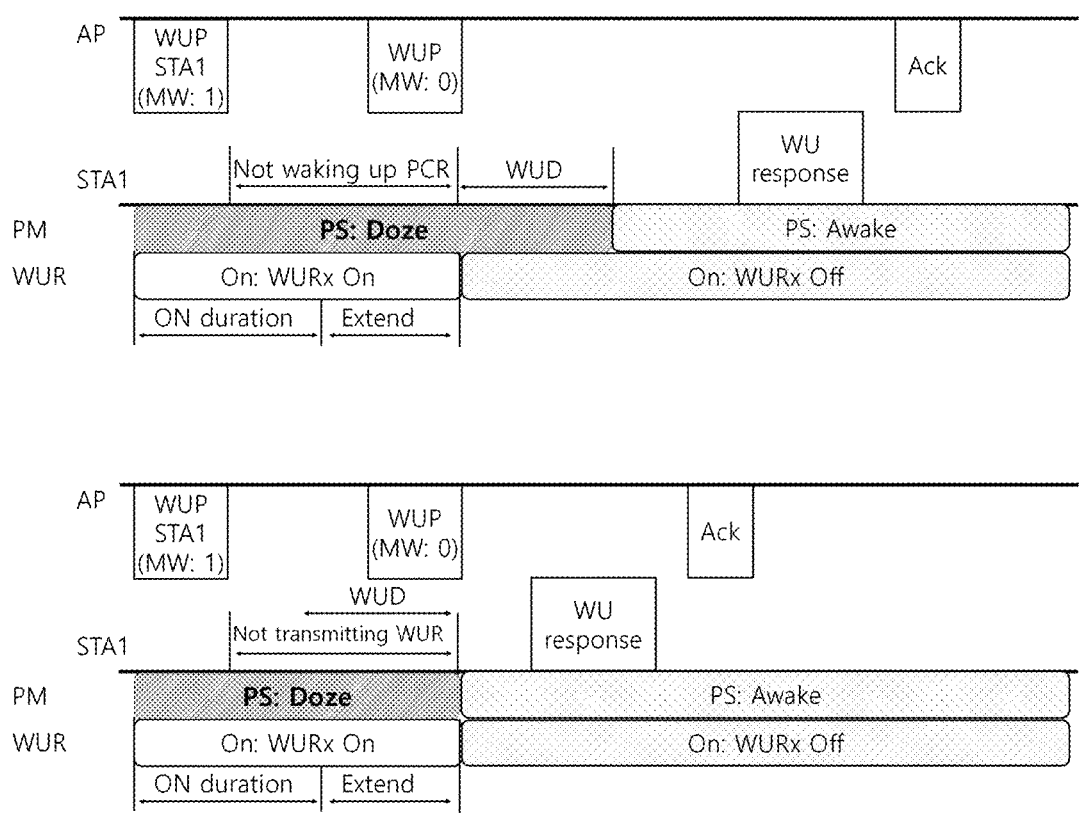
FIG. 22 is a diagram illustrating a method of using a More WUP field according to another embodiment of the present disclosure.

FIG. 22 is a diagram illustrating a method of using a More WUP field according to another embodiment of the present disclosure.

According to an embodiment, if a receiver address part of a first WUR frame received in an on-duration of a station includes identification information identifying the station and the More WUP field is active, the station may delay transmission of an awake frame. For example, if the More WUP field is activated, the station's awake frame transmission may prevent other stations from receiving WUR frames that the AP transmits additionally. In this case, the station may not perform a wake-up operation until the time at which the station receives an additional WUR frame that the More WUP field is deactivated. Alternatively, the station may not perform a wake-up operation until the time at which the timer expires. If the timer expires, the station may perform a wake-up operation regardless of the remaining on-duration. This is because if the receiver address part of the first WUR frame contains identification information identifying the station, the station may determine that no additional WUR frame will be transmitted.

According to another embodiment, a station may wake-up based on a first WUR frame. However, the station may not transmit an awake frame to the AP until the time point at which the More WUP field receives an additional WUR frame that is deactivated. At this point, the station may maintain the WURx awake state while being in the PCR awake state. This is because the station needs to receive through a WURx. Alternatively, the station may not transmit an awake frame to the AP until the time at which the above-described timer expires. If the timer expires, the station may transmit an awake frame regardless of the remaining on-duration.

According to an embodiment, if the More WUP field of the first WUR frame received in the on-duration of the station is active and there is data to be uplink-transmitted, the station may delay the uplink transmission. Also, the receiver address part of the first WUR frame received by the station may not include identification information identifying the station. In this case, the embodiments described with reference to FIGS. 21 and 22 may be applied in the same or corresponding manner. If the More WUP field is activated, an uplink transmission of the station may prevent other stations from receiving WUR frames that the AP transmits additionally.

Figure 23:
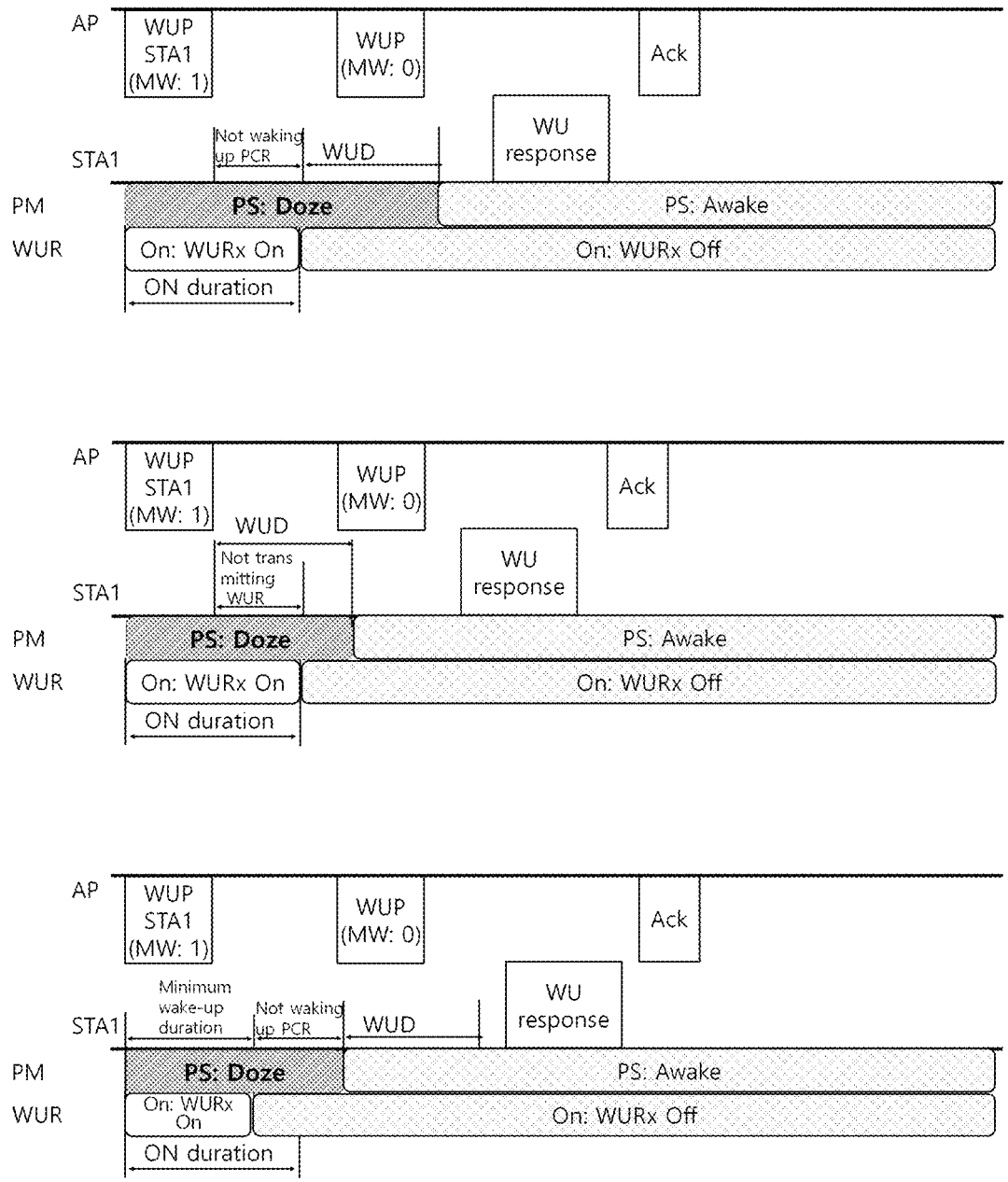
FIG. 23 is a diagram illustrating a method of using a More WUP field according to further another embodiment of the present disclosure.

FIG. 23 is a diagram illustrating a method of using a More WUP field according to further another embodiment of the present disclosure.

According to an embodiment, an AP may transmit a plurality of WUR frames to a plurality of stations. In this case, the AP may schedule the transmission of the plurality of WUR frames considering the life time and priority of the data. For example, if a receiver address of a WUR frame received by the station contains identification information identifying the station, and a More WUP field is activated, the station may wake-up regardless of the More WUP field. Or in this case, the station may wake-up until the time at which the on-duration of the station expires. Alternatively, the station may transmit an awake frame to the AP at the time at which the on-duration of the station expires. Alternatively, according to another embodiment, the station may wake-up based on a time at which the minimum wake-up duration described above elapses, or may transmit an awake frame to the AP. Through this, the awake frame transmission time may be changed between a plurality of stations receiving the WUR frame in which the More WUP field is activated. In addition, it is possible to reduce the possibility of collision in a channel transmitting an awake frame transmitted by each of a plurality of stations.

Figure 24:
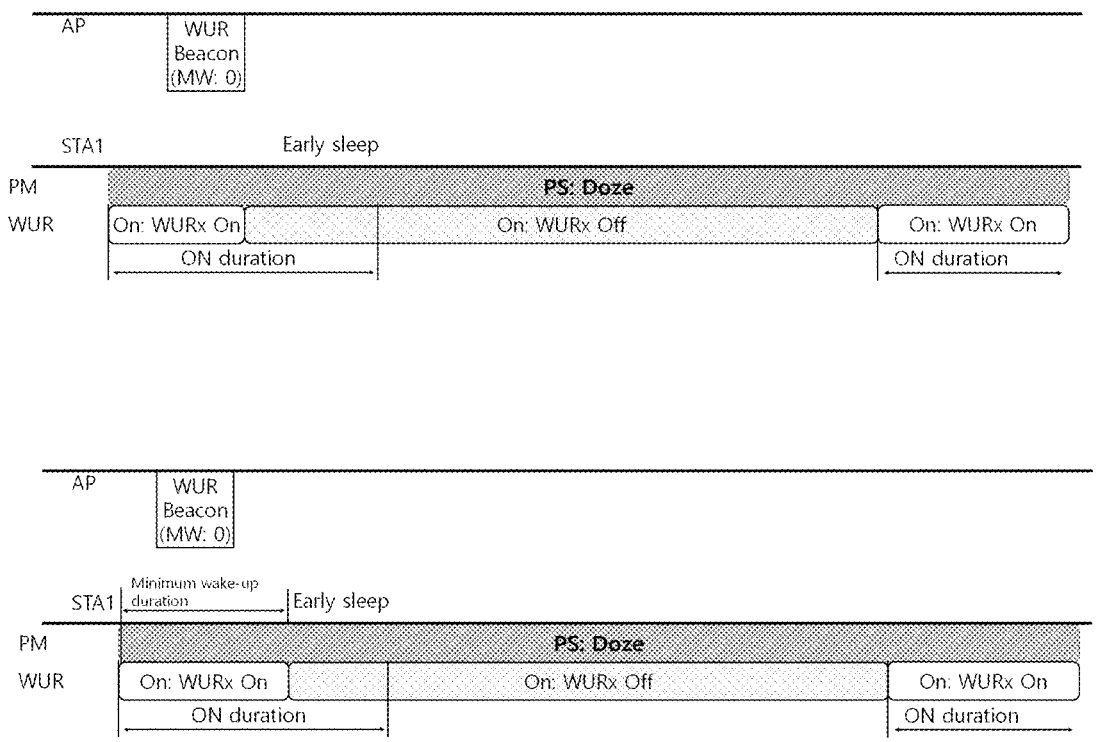
FIG. 24 is a diagram illustrating a method of using a More WUP field according to further another embodiment of the present disclosure.

FIG. 24 is a diagram illustrating a method of using a More WUP field according to further another embodiment of the present disclosure.

According to an embodiment, if a More WUP field receives a deactivated WUR frame before an on-duration of the station is expired, a station may early terminate the on-duration operation (early sleep). Through this, the station may additionally reduce power consumption. According to an embodiment, if a receiver address of the received WUR frame contains identification information identifying the station and the More WUP field is deactivated, the station may perform a wake-up operation at the time at which it received the WUR frame.

According to another embodiment, a station may maintain an on-duration operation based on a minimum wake-up duration described above. For example, the station may maintain the on-duration operation from the time when a WUR frame is received until the time when the minimum wake-up duration elapses. The station may wake-up at the time at which the minimum wake-up duration elapses. Alternatively, the station may transmit an awake frame to an AP at the time when the minimum wake-up duration elapses.

Figure 25:
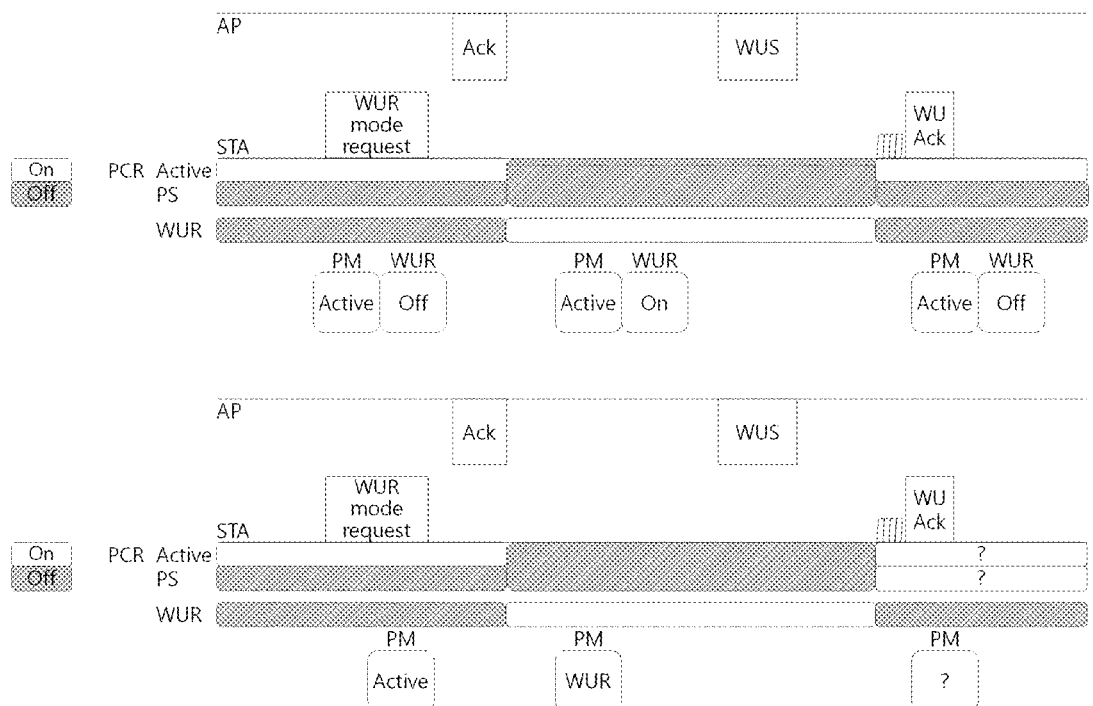
FIG. 25 is a diagram showing a relationship between a PS mode and a WUR mode of a wireless communication terminal according to an embodiment of the present disclosure.

FIG. 25 is a diagram illustrating the relationship between PS mode and WUR mode a wireless communication terminal according to an embodiment of the present disclosure. According to an embodiment of the present disclosure, a station may use a WUR MAC layer separate from a PCR MAC layer. In this case, a WUR operation of the station may be a power management operation to operate as a separate low-power WUR MAC/PHY excluding the MAC/PHY operation of the PCR.

For example, an AP may manage a state of a PCR transceiver and a WURx of the station included in the BSS as an independent layer. In this case, the station may enter a WUR mode from when the WUR mode request procedure is successfully performed, regardless of the PS mode and the active mode. At this point, the AP may separately manage the state of the PCR transceiver and the WURx of the station. Accordingly, when the station operates in the WUR mode, the AP may record the PCR mode in which the PCR transceiver of the station operates. Further, when the AP receives the awake frame from the station, the AP may determine that the station will operate according to the recorded PCR mode for the station. The AP may transmit and receive frames with the station based on the PCR mode recorded for the station. Hereinafter, a method of operating through a PCR transceiver after a wireless communication terminal wakes-up according to an embodiment of the present disclosure will be described.

Figure 26:
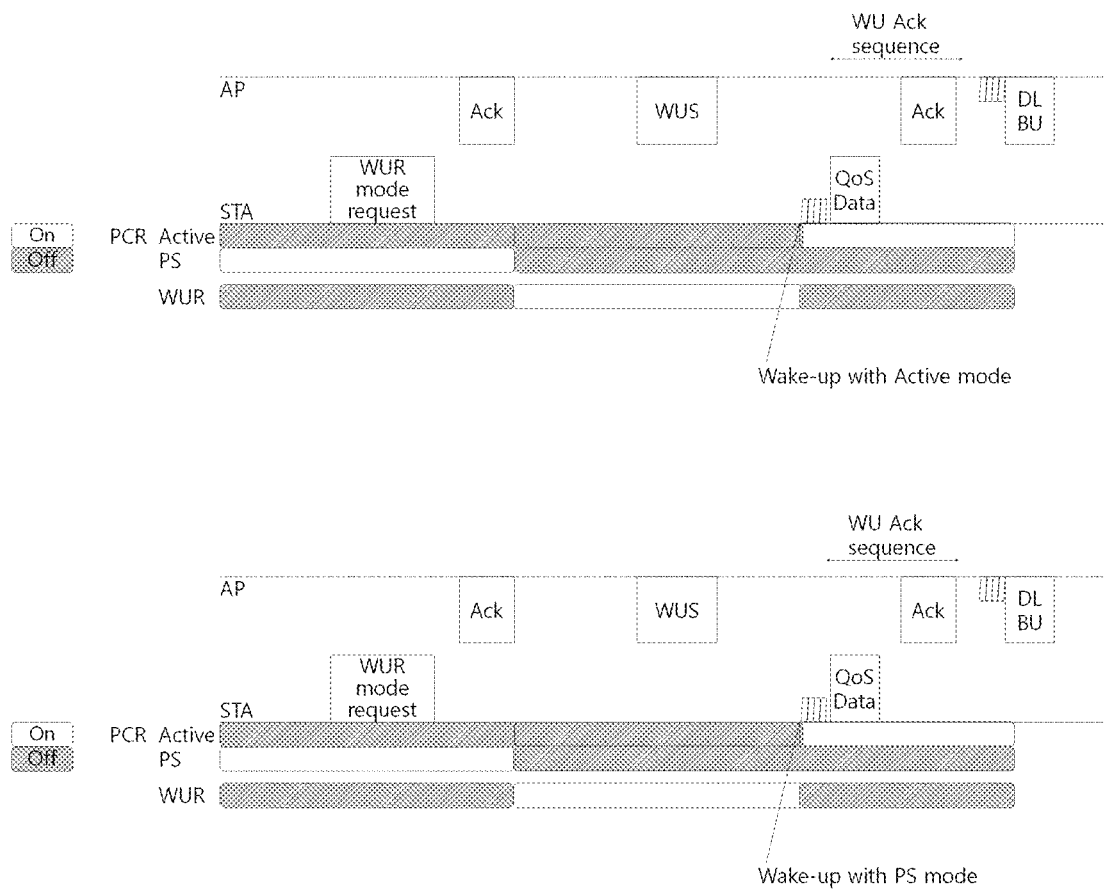
FIG. 26 is a diagram illustrating an operation method after a wireless communication terminal wakes-up according to an embodiment of the present disclosure.

FIG. 26 is a diagram illustrating a method of operation after a wireless communication terminal wakes-up according to an embodiment of the present disclosure.

According to an embodiment, when a station receives a wake-up frame to wakes-up, the station may operate in a predetermined PCR mode. At this point, the predetermined PCR mode may be either an active mode or a PS mode. For example, the station may receive a wake-up frame from an AP to wake-up. At this point, if the predetermined PCR mode is the active mode, the station may operate in the active mode after transmitting an awake frame to the AP. In this case, the station may transition from a PCR awake state to a PCR doze state through the sequence entering the PS mode. In the active mode, the station may always maintain the PCR awake state.

Conversely, if the predetermined PCR mode is the PS mode, the station may operate in the PS mode after transmitting the awake frame to the AP. In this case, the station may enter the PCR doze state without a separate sequence after wake-up. In addition, the station may wait to receive TIM information from the AP. If the station receives a frame containing TIM information, the station may transmit a request frame requesting downlink data to the AP. The AP may transmit downlink data to the station through an immediate response frame for the request frame. Alternatively, the station may transmit a QoS frame to the AP that sets an unscheduled service period. At this point, the station may transmit the QoS frame to the AP regardless of the TIM information. Here, the QoS frame may include at least one of a QoS data frame and a QoS Null frame. In addition, the station may receive downlink data from the AP based on the service period. In this case, the service period may be a period determined based on the number of predetermined downlink data frames. For example, if the number of predetermined downlink data frames is '3', the station may maintain the PCR awake state until the time when the station receives at least three downlink data frames from the AP. Also, the downlink data frame may be a frame including at least a part of downlink data transmitted from the AP.

Figure 27:
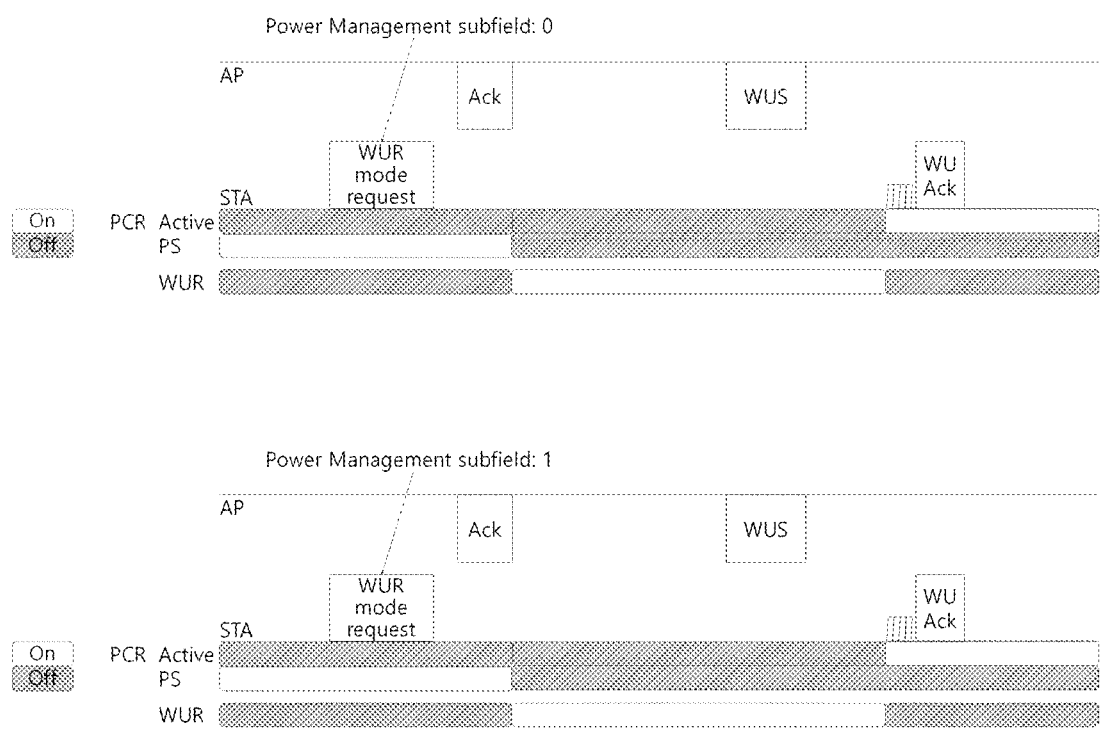
FIG. 27 is a diagram illustrating an operation method after a wireless communication terminal wakes-up according to another embodiment of the present disclosure.

FIG. 27 is a diagram illustrating a method of operation after a wireless communication terminal wakes-up according to another embodiment of the present disclosure.

According to an embodiment, the above-described WUR mode request information may include PCR mode information indicating a PCR mode in which a station will operate after wake-up. For example, in a process of entering a WUR mode described above with reference to FIG. 9, the station may transmit a WUR mode request frame including PCR mode information to an AP. The station may signal the PCR mode information using a PM subfield of the WUR mode request frame. Alternatively, the station may signal PCR mode information using a separate field. The AP may determine that the station will operate according to the PCR mode information after wake-up. In FIG. 27, when the PCR mode information indicates '0', the station may operate in an active mode after wake-up. If the PCR mode information indicates '1', the station may operate in PS mode after wake-up.

According to another embodiment, after a station wakes-up, a station may transmit an awake frame (WU Ack) containing PCR mode information to an AP. The station may signal PCR mode information using the fields of the awake frame. For example, the station may transmit an awake frame containing PCR mode information to the AP after waking up based on the wake-up frame. At this point, the AP may determine the PCR mode of the station based on the PCR mode information included in the awake frame. The AP may determine that the station will operate according to the PCR mode information. In addition, the AP may transmit an immediate response frame for the awake frame.

Meanwhile, according to an embodiment, a wireless communication terminal operating in a PS mode may perform uplink transmission in which data is transmitted from the wireless communication terminal to a base wireless communication terminal in an awake state. On the other hand, in the case of downlink transmission in which the wireless communication terminal receives data from the base wireless communication terminal, scheduling for downlink transmission is required. The base wireless communication terminal may determine that the wireless communication terminal operating in the PS mode is in the PCR doze state.

Figure 28:
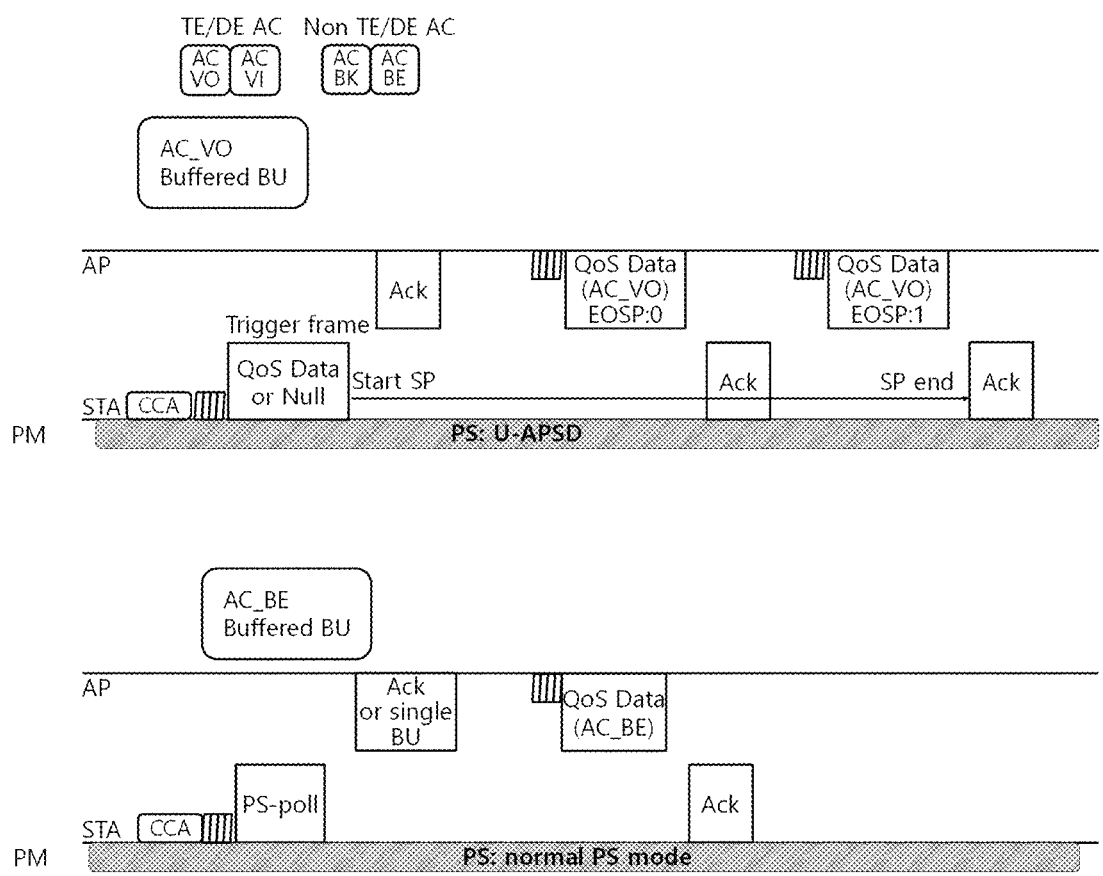
FIG. 28 is a diagram illustrating a method for a wireless communication terminal operating in a PS mode to receive downlink data according to an embodiment of the present disclosure.

FIG. 28 is a diagram illustrating a method for receiving downlink data by a wireless communication terminal operating in a PS mode according to an embodiment of present disclosure. According to an embodiment, when a wireless communication terminal operates in a PS mode, a base wireless communication terminal may store data to be transmitted to the wireless communication terminal in a buffer. Also, the base wireless communication terminal may signal that there is data to be transmitted to the wireless communication terminal through a beacon frame periodically transmitted through PCR.

For example, the base wireless communication terminal may insert TIM information in a beacon frame. The wireless communication terminal may receive the beacon frame transmitted from the base wireless communication terminal in the PCR awake state. Further, the wireless communication terminal may obtain information on the downlink transmission sequence from the beacon frame. Specifically, the beacon frame may include TIM information indicating that data to be downlink-transmitted to the wireless communication terminal is buffered. When the wireless communication terminal receives the beacon frame in the PCR awake state of the PS mode, the wireless communication terminal may obtain information on the downlink transmission sequence through the beacon frame. For example, when the wireless communication terminal receives the TIM information in which the AID indicating the wireless communication terminal is activated in the bitmap information, the wireless communication terminal may transmit the frame corresponding to the subsequent sequence. For example, the wireless communication terminal may transmit the PS-Poll frame to the base wireless communication terminal. Here, the PS-poll frame may be a request frame transmitted by the wireless communication terminal operating in the PS mode to the base wireless communication terminal to request transmission of downlink data.

According to an embodiment, data may be categorized based on an access category (hereinafter referred to as 'AC'). A wireless communication terminal may access a channel in a different manner depending on the access category of the data. For example, the access category of the data may be any one of AC_BE, AC_BK, AC_VI, and AC_VO. In addition, the station and an AP may set the channel access method applied to each AC differently through the link establishment procedure described above. For example, the AP may determine the AC-specific downlink data transmission sequence through the link establishment procedure with the station. Specifically, when the station is operating in the PS mode, the use of unselected-automatic power save delivery (U-APSD) may be set differently for each AC of data to be transmitted. Here, the U-APSD may mean a method of transmitting and receiving data using the unscheduled service period in the PS mode.

In the embodiment of FIG. 28, the wireless communication terminal operating in the PS mode may use a normal PS mode when transmitting data corresponding to AC_BE and AC_BK. A general PS mode in the present disclosure may indicate a PS mode that does not use U-APSD. In addition, the wireless communication terminal operating in the PS mode may use U-APSD when transmitting data corresponding to AC_VI and AC_VO.

In FIG. 28, a wireless communication terminal may obtain an opportunity of transmitting a PS-Poll frame through an AC_BE-based contention procedure. When a base wireless communication terminal receives the PS-Poll frame from the wireless communication terminal, the base wireless communication terminal may transmit a PS-poll response frame. At this point, the PS-poll response frame may be either an acknowledge (Ack) frame or a buffered data unit BU. Also, the buffered data unit BU may refer to a data unit including at least a part of the downlink data in a transmission standby state. For example, the base wireless communication terminal may transmit the data MPDU in response to the PS-poll. The wireless communication terminal may receive the data MPDU in response to the PS-poll frame from the base wireless communication terminal.

When receiving the Ack frame from the base wireless communication terminal, the wireless communication terminal may maintain the awake state until receiving the BU from the base wireless communication terminal through the new TXOP. In addition, when the More Data field of the downlink data frame received from the base wireless communication terminal is activated, the wireless communication terminal may transmit an additional PS-poll frame. The wireless communication terminal may not be required to listen to the beacon frame every beacon period.

According to an embodiment, a wireless communication terminal may transmit a QoS frame to receive downlink data corresponding to an AC using U-APSD. In this case, the QoS frame may be a frame transmitted regardless of information on the downlink data transmission sequence included in a beacon frame. For example, the QoS frame may include a QoS data frame including QoS data or a QoS Null frame not including data. In addition, the wireless communication terminal may set a service period by transmitting a QoS frame. Specifically, the wireless communication terminal may determine that the service period starts from the time when the wireless communication terminal receives an immediate response to the QoS frame. In FIG. 28, a station may obtain an opportunity of transmitting a QoS frame through an AC_VO-based contention procedure. When an AP receives a QoS frame from a station, the AP may transmit an Ack frame. Also, the AP may transmit a predetermined number of downlink data frames to the station according to the set service period.

The wireless communication terminal may maintain a PCR awake state at least until an early time point among a time point of receiving a frame that an End Of Service Period (EOSP) of the frame is activated as EOSP: 1 and a time point of receiving a predetermined number of downlink data frames. The presence of buffered downlink data corresponding to AC using U-APSD may not be indicated in the TIM information. This is because the wireless communication terminal may transmit the QoS frame regardless of the TIM information. An AC corresponding to traffic received using U-APSD may be classified as a trigger-enabled AC. Also, the AC corresponding to the traffic transmitted using U-APSD may be referred to as deliver-enabled AC. Here, the trigger-enabled AC may indicate the AC of the QoS wireless communication terminal.

Meanwhile, when a station operates in a WUR mode simultaneously with a PS mode, the station receiving a wake-up frame may perform a subsequent PCR operation after completing wake-up operation. For example, a wake-up station may complete a successful wake-up operation through an awake frame and then transmit a request frame requesting downlink data. At this point, an AP may wait for a time when the station transmits a request frame for additionally requesting downlink data, which may be inefficient in terms of power consumption and channel occupancy. An AP according to an embodiment of present disclosure may transmit downlink data based on an awake frame transmitted by a station. The AP may transmit a wake-up frame to the station if there is downlink data to be transmitted to the station. Through this, the station may increase the power save effect. Hereinafter, a method of transmitting downlink data to a station operating in the PS mode by an AP according to an embodiment of the present disclosure will be described in detail with reference to FIG. 29 to FIG. 34.

Figure 29:
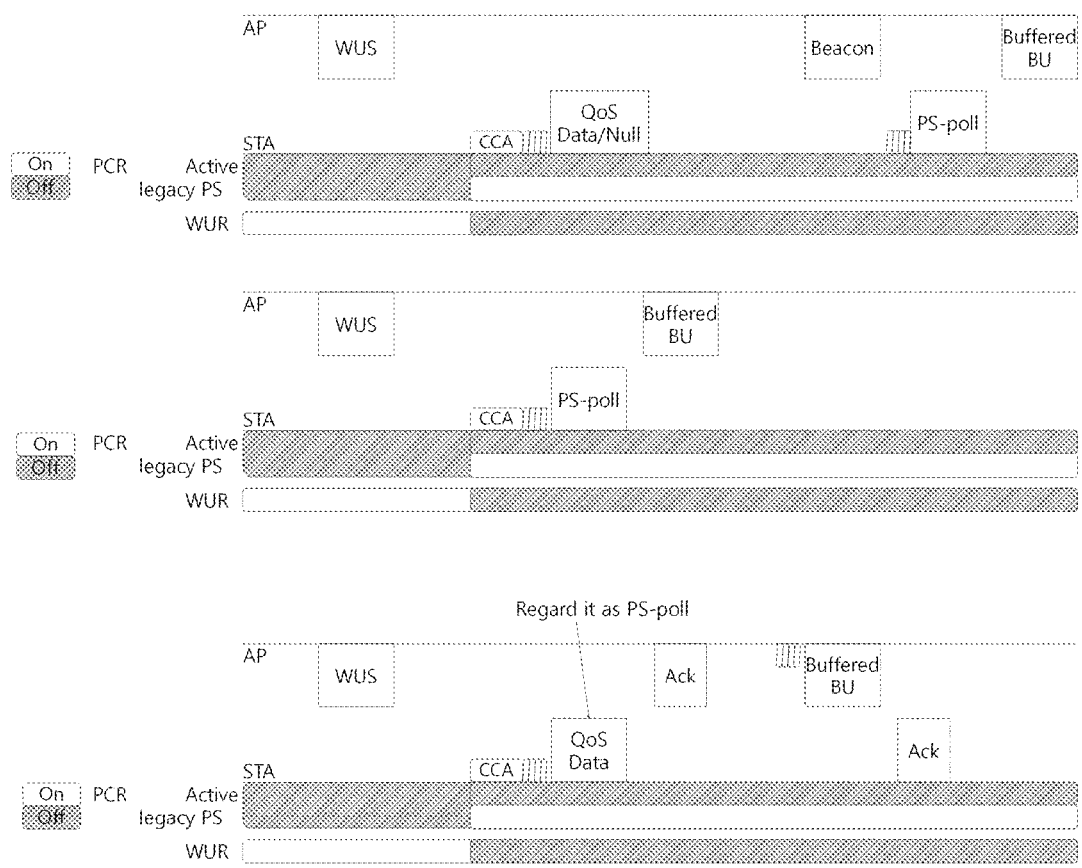
FIG. 29 is a diagram illustrating a method of transmitting downlink data to a station operating in the PS mode by an AP according to an embodiment of the present disclosure.

FIG. 29 is a diagram illustrating a method of transmitting downlink data to a station operating in the PS mode by an AP according to an embodiment of the present disclosure.

In FIG. 29, an AP may transmit a wake-up frame to the station to transmit downlink data buffered in the AP. The station may wake-up based on the wake-up frame. In addition, the station may transmit an awake frame. Specifically, the station may transmit a frame other than a PS-poll frame first after waking-up. For example, the station may transmit a QoS frame (QoS data/null frame). At this point, if the first downlink data corresponding to a AC that does not use an U-APSD is buffered in the AP, the AP may not transmit the first downlink data to the station until it receives the PS-poll frame from the station. In this case, until the time when the station receives a beacon frame containing TIM information and recognizes that there is downlink data to be transmitted to the station, the AP may not transmit downlink data to the station. That is, the AP may not be able to transmit downlink data to the station even though the AP recognizes that the station completes a successful wake-up through the QoS frame.

According to an embodiment of the present disclosure, after transmitting a wake-up frame to a station, an AP may transmit downlink data based on the first awake frame transmitted from the station. For example, the AP may transmit the wake-up frame to the station to transmit the buffered first downlink data. At this point, the AC of the first downlink data may be a first AC that does not use U-APSD. For example, the AP may determine the AC specific transmission sequence of downlink data through the link establishment procedure with the station. The AP may receive an awake frame that is transmitted first from the station after the AP transmits the wake-up frame to the station. In addition, the AP may transmit the first downlink data to the station based on the awake frame. At this point, the frame type of the awake frame may be different from a frame type of a frame requesting the first downlink data. The AP may transmit downlink data to the station regardless of the frame type of the received awake frame. Here, the frame type of the awake frame may indicate the use of the frame. For example, an awake frame may be a PS-poll frame requesting transmission of downlink data in a normal PS mode. Alternatively, an awake frame may be a QoS frame (QoS Data) requesting transmission of downlink data corresponding to AC using U-APSD.

The AP may transmit the first downlink data based on the awake frame even if the frame type of the received awake frame is not a first frame type requesting the downlink data corresponding to the first AC. The AP may regard the awake frame other than the first frame type as a frame corresponding to the first frame type. In this case, the AP may operate as in the case of receiving a PS-poll frame from the station. For example, the AP may transmit downlink data based on the AC of the downlink data buffered in the AP. The AP may transmit downlink data based on the transmission sequence corresponding to the first AC and the awake frame. Specifically, the AP may transmit an Ack frame as an immediate response to the awake frame other than the first frame type. Also, the AP may transmit at least a part of the first downlink data based on the awake frame rather than the first frame type. After transmitting the Ack frame, the AP may transmit a first BU to the station through the contention procedure, which is at least a part of the first downlink data corresponding to the first AC.

In addition, the station may maintain a PCR awake state until it receives at least one BU from the AP. At this point, the station may set a timer indicating the minimum time for maintaining the PCR awake state from the time when the Ack frame is received from the AP. If the minimum time to maintain the PCR awake state expires, the station may not maintain the PCR awake state. This is because if the station operating in the PS mode maintains the PCR awake state for an excessively long time due to the BU transmission failure of the AP, energy savings achieved through power save operations may be reduced.

According to an embodiment, the station may transmit an awake frame of a frame type other than the request frame requesting the downlink transmission frame corresponding to the AC buffered in the AP. Specifically, the station may transmit a request frame requesting downlink data corresponding to the first AC. If there is no downlink data corresponding to the first AC in the AP and there is downlink data corresponding to a second AC, the AP may transmit data corresponding to the second AC.

According to an embodiment, the AP may transmit downlink data based on a priority of an AC. For example, downlink data corresponding to each of two or more ACs transmitted in different ways may be buffered in the AP. In this case, the AP may first transmit the downlink data, corresponding to the AC having a relatively high priority according to the priority of the AC, based on the awake frame. Specifically, if the AP receives an awake frame with a frame type other than the request frame requesting the downlink data, the AP may transmit data corresponding to the first or second AC according to the priority of the AC. Also, if there are a plurality of ACs corresponding to the downlink transmission request frame transmitted by the station, the AP may transmit downlink data according to the priority between the ACs.

Meanwhile, according to another embodiment, an U-APSD may not be used for all of ACs by the setting between an AP and a station. In this case, the AP may regard all of awake frames transmitted by the station as PS-poll frames. The AP may start downlink data transmission when it receives an awake frame regardless of the frame type of the first received awake frame from the station. Alternatively, after the station wakes-up, the first frame transmitted may be set to be a PS-poll frame. In this case, the AP may transmit the downlink data based on the first frame received from the station after transmitting the wake-up frame.

Figure 30:
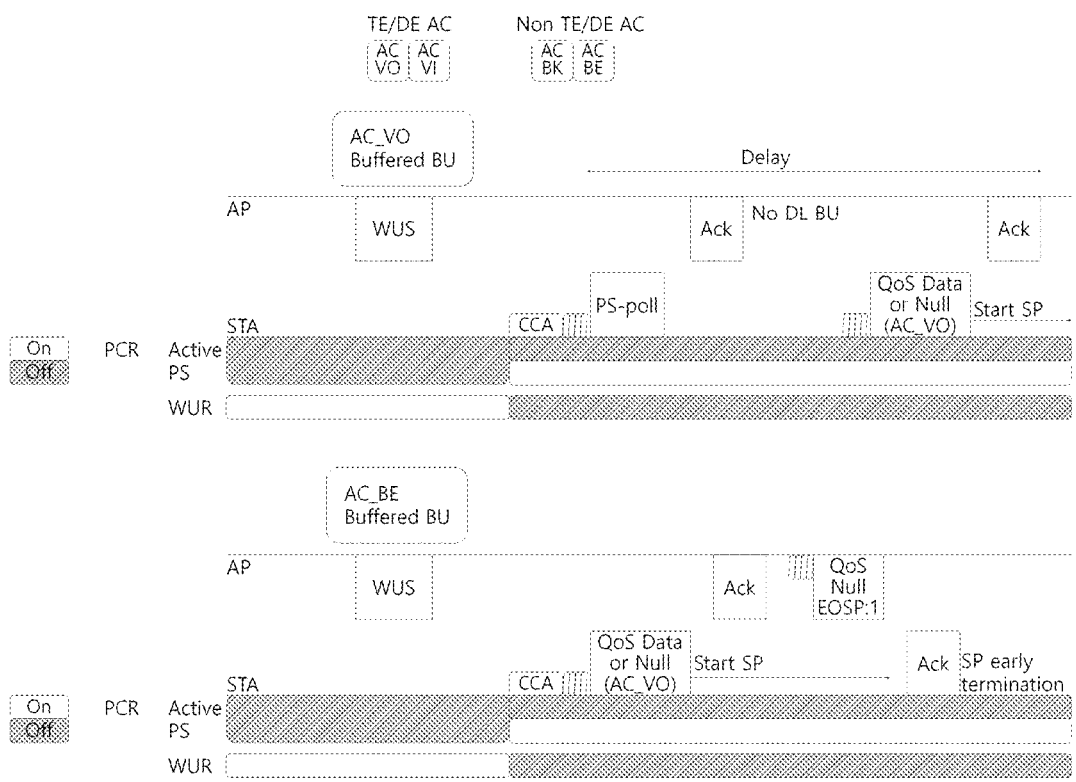
FIG. 30 is a diagram illustrating a case in which U-APSD is applied differently to each AC according to an embodiment of the present disclosure.

FIG. 30 is a diagram illustrating a case in which U-APSD is applied differently to each AC according to an embodiment of the present disclosure.

As described above, whether to use U-APSD may be set for each AC. In the embodiment of FIG. 30, a wireless communication terminal operating in a PS mode may use a normal PS mode when transmitting data corresponding to AC_BE and AC_BK. In addition, the wireless communication terminal operating in the PS mode may use the PS mode using the U-APSD when transmitting data corresponding to AC_VI and AC_VO. If the AC of the downlink data waiting for transmission in the AP and a frame type of an awake frame transmitted by the station are not matched, the downlink data transmission of the AP may be unnecessarily delayed.

For example, according to a first embodiment, if the AP is buffered with a first downlink data corresponding to a first AC, the AP may transmit a first wake-up frame to the station to transmit the first downlink data. At this point, the first AC may be a trigger-enabled AC. The station may wake-up based on the first wake-up frame. Also, the wake-uped station may transmit a first frame through a PCR transceiver. At this point, the first frame may be a frame other than the QoS frame used for the downlink data request corresponding to the trigger-enabled AC. For example, the first frame may be a PS-poll frame. This is because the station may not recognize the AC of the downlink data to be transmitted that is waiting in the AP, when the awake frame is transmitted after waking-up. The AP may transmit a first response frame Ack for the first frame. At this point, the first response frame may be an Ack frame. Also, the AP may not be able to transmit the buffered first downlink data in response to the first frame. The AP may set the service period only when it receives a request for downlink data corresponding to the first AC using U-APSD. Accordingly, after transmitting the first response frame Ack, the AP may not transmit the first downlink data until it receives a request for the downlink data corresponding to the first AC from the station.

According to a second embodiment, if the AP is buffered with a second downlink data corresponding to a second AC, the AP may transmit a second wake-up frame to the station to transmit the second downlink data. At this point, the second AC may be an AC using normal PS mode. The station receiving the second wake-up frame may transmit a second frame through the PCR transceiver. At this point, the second frame may be a frame other than the PS-poll frame used in the downlink data request in the PS mode not using the U-APSD. For example, the second frame may be a QoS Data or QoS Null frame. At this point, the AP may not transmit the buffered second downlink data in response to the second frame. This is because the AP may transmit the buffered second downlink data only when it receives the PS-poll frame. The AP may transmit a second response frame Ack to the station in response to the second frame.

Further, downlink data corresponding to the first AC described above may not be buffered, and the QoS frame may be a frame requesting downlink data corresponding to the first AC. At this point, when the AP receives the QoS frame as the second frame, the AP may identify that the station requests the downlink data corresponding to the first AC. In this case, the AP may transmit to the station a QoS Null frame (EOSP: 1) indicating that there is no downlink data corresponding to the first AC among the downlink data buffered in the AP. The station may transmit a QoS Null frame (EOSP: 1) to the AP. In addition, the station may transmit a third response frame for the QoS Null frame (EOSP: 1) received from the AP. At this point, the station may early terminate the service period at the time when the third response frame is transmitted. For example, the station may maintain the PCR awake state from the time when the QoS data or QoS null frame is transmitted to the AP to the time when the third response frame is transmitted. Accordingly, the AP may not transmit the second downlink data until the station terminates the service period and the station transmits the PS-poll frame.

As described above, even if the station is operating in a PCR awake state, it may be inefficient for the AP not to transmit the buffered downlink data immediately. The wireless communication terminal according to an embodiment of the present disclosure may efficiently transmit downlink data through an adaptive operation.

Figure 31:
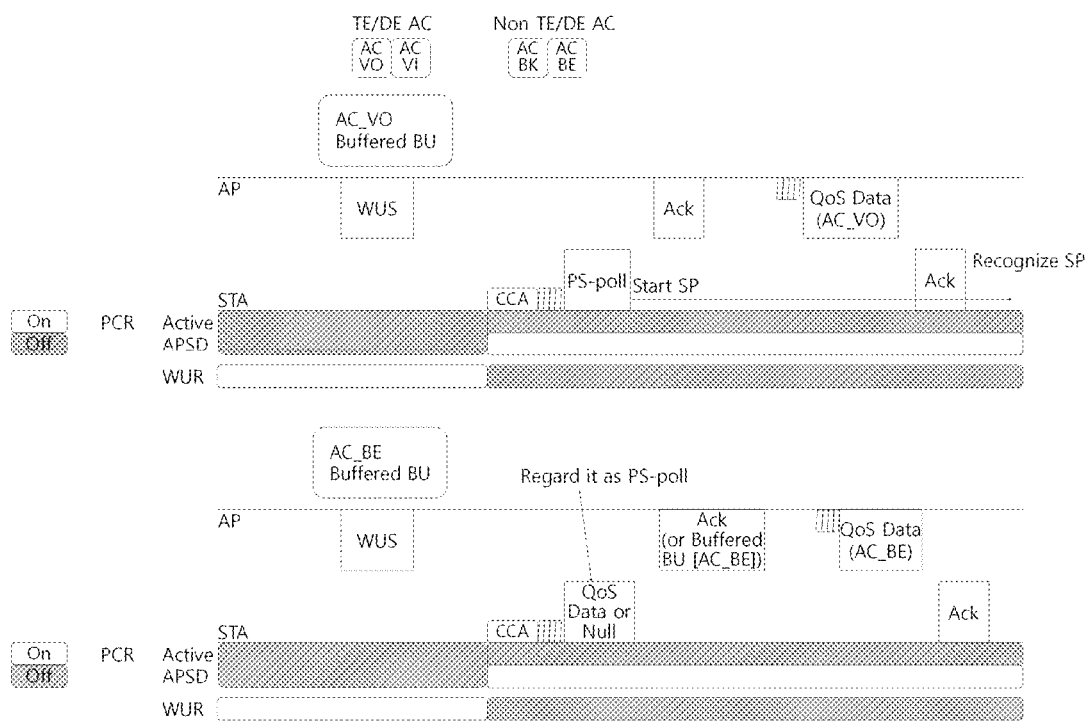
FIG. 31 is a diagram illustrating a method for a wireless communication terminal to transmit downlink data according to an embodiment of the present disclosure.

FIG. 31 is a diagram illustrating a method for transmitting downlink data by a wireless communication terminal according to an embodiment of the present disclosure. According to an embodiment, an AP may transmit downlink data according to an AC of the downlink data buffered in the AP, regardless of a frame type of an awake frame transmitted by a station.

For example, in the first embodiment described above with reference to FIG. 30, the AP may transmit the first downlink data based on the first frame regardless of the frame type of the first frame transmitted by the station. Specifically, the AP may set the service period based on the first frame. For example, if the first frame is the PS-poll frame and the AP receives the first frame, the AP may consider that it receives a QoS frame. Also, the AP may set the service period based on the PS-poll frame. The AP may transmit a first response frame for the station in response to the first frame. At this point, the first response frame may be a frame indicating the setting of the service period. The station may maintain the PCR awake state until the time when it receives at least one BU based on the received first response frame. This is because if an Ack frame is received in response to the PS-poll frame, the station operating in the normal PS mode may maintain the PCR awake state until at least one BU is received.

In addition, the AP may determine that the station will maintain the PCR awake state until the AP transmits at least one BU. Next, the AP may transmit at least a part of the first downlink data. The station may receive a first BU that is at least a part of the first downlink data. The station may recognize that the service period is set based on the first BU. The station may determine that the service period for the downlink data corresponding to the first AC is set based on the AC of the first BU. As described above, the service period may represent a time from a time when a service period starts to a time when a predetermined number of downlink data frames are transmitted and received. At this point, the station may calculate a predetermined number of downlink data frames maintaining the service period, including the previously received first BU. Also, the station may determine that the service period for downlink data corresponding to the first AC is set from the time when the first frame is transmitted. At this point, the station may maintain a PCR awake state at least until an early time point among at least a time point of receiving a frame including information indicating the end of a service period and a time point of receiving a predetermined number of BU. In addition, the information indicating the end of the service period may mean the above-mentioned activated EOSP (EOSP: 1).

In addition, in the second embodiment described above with reference to FIG. 30, the AP may transmit the second downlink data based on the second frame regardless of the frame type of the second frame transmitted by the station. Specifically, the AP may transmit at least a part of the second downlink data or the second response frame Ack in response to the second frame. The station may receive a second BU that is at least a part of the second downlink data. At this point, the station may confirm that the downlink data corresponding to the second AC is transmitted based on the second BU. Also, the station may operate in the normal PS mode based on the second BU. Accordingly, the station may receive the frame which has an activated More Data field from the AP. In this case, the station may transmit a third frame to the AP. At this point, the third frame may indicate an additional PS-poll frame. Or the station may receive a second response frame Ack from the AP. In this case, the station may determine that the service period for the first AC using the U-APSD is set. However, the station may receive a subsequent second BU from the AP. At this point, the station may confirm that the downlink data corresponding to the second AC and not the first AC is transmitted based on the second BU. Accordingly, the station may operate in a normal PS mode that does not use U-APSD based on the second BU.

Figure 32:
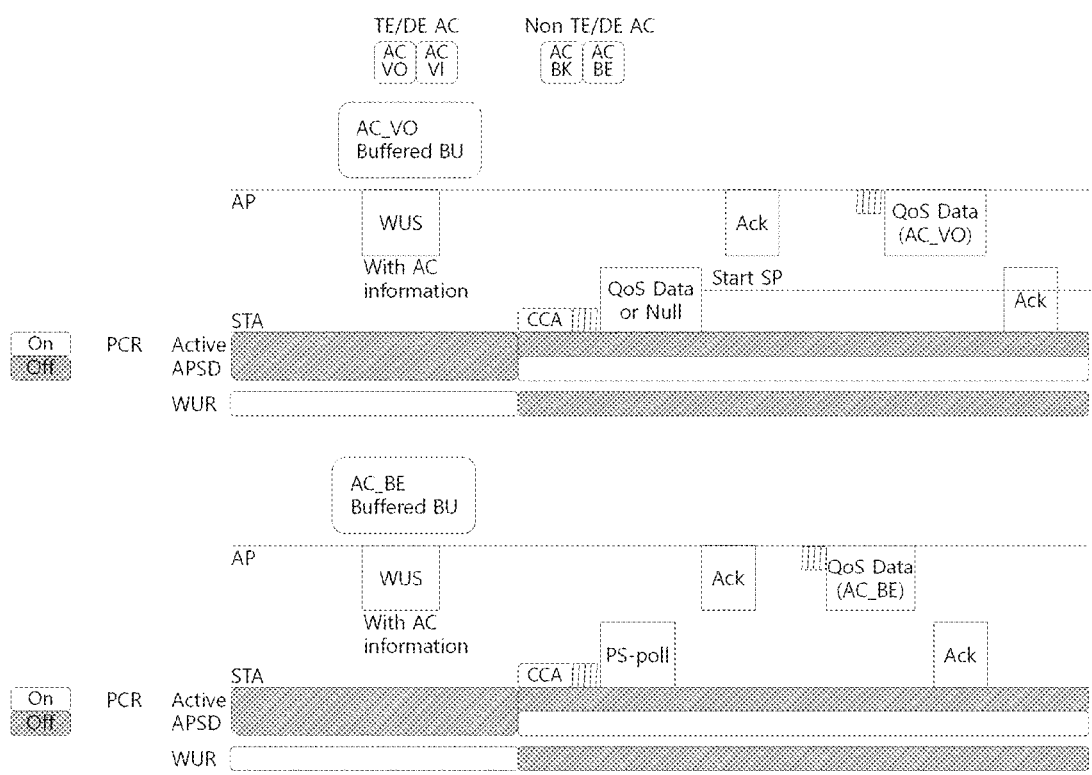
FIG. 32 is a diagram illustrating a method for a wireless communication terminal to transmit downlink data according to another embodiment of the present disclosure.

As described with reference to FIG. 30, if the AP does not recognize the purpose of transmitting the wake-up frame to the station, a station may experience unnecessary frame exchange after wake-up. A wireless communication terminal according to another embodiment of the present disclosure may transmit downlink data using information indicating an AC of buffered downlink data. Through this, the wireless communication terminal may efficiently transmit the buffered downlink data to a station operating in the PS mode and the WUR mode. FIG. 32 is a diagram illustrating a method of transmitting downlink data by a wireless communication terminal according to another embodiment of the present disclosure.

According to an embodiment, an AP may transmit a wake-up frame containing AC information indicating an AC of downlink data buffered in the AP. At this point, the AP may transmit information indicating a frame type of an awake frame together. A station may transmit an awake frame based on the wake-up frame received from the AP. Specifically, the station may transmit an awake frame based on an AC information included in the wake-up frame. The station may determine the frame type of the awake frame based on the AC information. The station may transmit the awake frame to the AP based on the determined frame type.

According to an embodiment, an AC information may include AC bitmap information. For example, the AC bitmap information may include one bit corresponding to each AC. The AC bitmap information may include four bits. At this point, each value of the bit may indicate whether there is downlink data corresponding to the AC indicated by each bit among the downlink data buffered in the AP. Also, a station may obtain the AC information of the downlink data based on a traffic identifier (TID) corresponding to downlink data. For example, each of the TID may be mapped to a specific AC. The AC information may include one bit indicating whether QoS data exists for each AC and one bit indicating whether data is not QoS data. In addition, the AC information may include two bits that respectively indicate whether the buffered downlink data corresponding to AC using U-APSD exists and whether there is buffered downlink data corresponding to AC that does not use U-APSD. For example, the AP may activate the bit corresponding to the AC corresponding to the downlink data buffered in the AP. Specifically, when downlink data corresponding to AC_VO is buffered, the AP may indicate a bit corresponding to AC_VO as '1'. The station may transmit the awake frame based on the AC bitmap information.

In FIG. 32, a station may receive AC information indicating that downlink data corresponding to AC_VO is buffered in an AP. At this time, AC_VO may be AC defined as using U-APSD. In this case, the station may transmit a QoS frame (QoS data frame or QoS null frame) to the AP. A service period may be set from the time when the station transmits the QoS frame. The AP may receive the QoS frame from the station. At this point, the AP may transmit the downlink data buffered in the AP to the station from the time when the QoS frame is received. Alternatively, the station may receive AC information indicating that downlink data corresponding to AC_BE is buffered in the AP. At this point, AC_VO may be AC defined as not using U-APSD. In this case, the station may transmit a PS-poll frame to the AP. The AP may transmit at least a part of the buffered downlink data or an Ack frame in response to the PS-poll frame.

According to an embodiment, the station may receive a wake-up frame including AC information in which a first AC using U-APSD and a second AC not using U-APSD are activated. In this case, the station may transmit an awake frame based on a priority between the ACs. The station may determine a frame type of the awake frame based on the priority between the ACs. For example, the station may transmit an awake frame requesting downlink data corresponding to a higher priority AC among a plurality of activated ACs.

Figure 33:
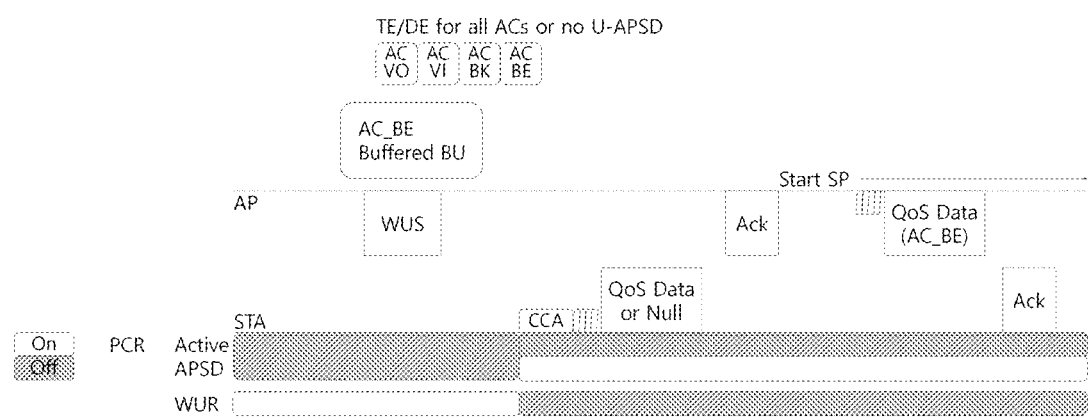
FIG. 33 is a diagram illustrating a method for a wireless communication terminal to transmit downlink data according to further another embodiment of the present disclosure.

FIG. 33 is a diagram illustrating a method for transmitting downlink data by a wireless communication terminal according to further another embodiment of the present disclosure.

According to an embodiment, an AP may transmit downlink data to a station that supports the WUR-based operations in the same manner regardless of AC. For example, the AP may determine whether to use U-APSD for each station. The AP may signal whether or not to use the U-APSD through the link establishment process described above with the station. For example, the AP may determine not to use the U-APSD in downlink data transmission for a first station. In this case, the AP may transmit downlink data to the first station according to the normal PS mode operation. Alternatively, the AP may determine to use the U-APSD in downlink data transmission to a second station. In this case, the AP may transmit downlink data to the second station according to the operation using the U-APSD. The AP may transmit downlink data according to the operation determined in the link establishment procedure regardless of the AC of the downlink data.

Meanwhile, a station operating in a PS mode in a wireless LAN may transmit a PS-poll frame based on a TIM information of a beacon frame. At this point, the station may transmit the PS-poll frame after performing a CCA operation for the time determined based on the DIFS time and aSlotTime. This is because when a plurality of stations receiving a beacon frame transmits PS-poll frames, the collision probability between the PS-poll frames may be increased. Unlike this, when a station waking up based on a wake-up frame transmits a PS-poll frame, the probability of collision between PS-poll frames may be relatively low. This is because a station other than a station that is the intended recipient of the wake-up frame may not attempt to access the channel for a transmission of a PS-poll frame. Hereinafter, according to an embodiment of the present disclosure, a method of accessing a channel by a wireless communication terminal to transmit an awake frame will be described.

Figure 34:
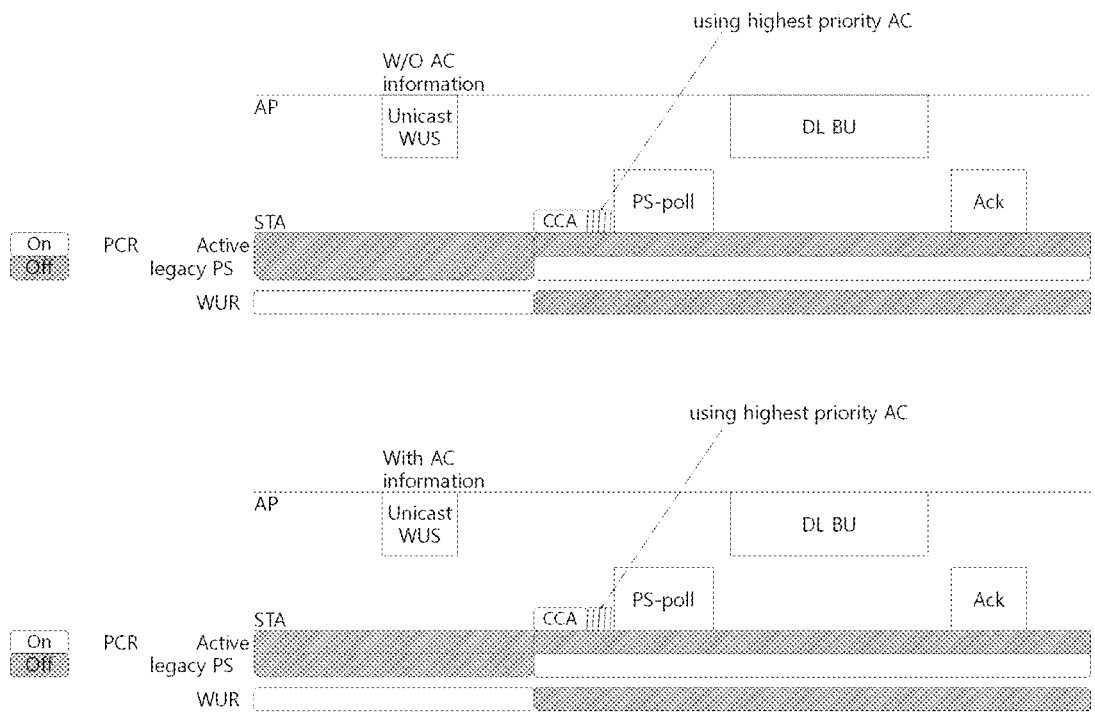
FIG. 34 is a diagram illustrating a channel accessing method of a wireless communication terminal according to an embodiment of the present disclosure.

FIG. 34 is a diagram illustrating a channel accessing method of a wireless communication terminal according to an embodiment of the present disclosure. According to an embodiment, a station may access a channel based on the above-described AC information and priorities between ACs. For example, the station may determine a plurality of ACs corresponding to downlink data buffered in an AP based on the AC information included in a wake-up frame. In addition, the station may determine the highest priority AC among a plurality of ACs. The station may transmit an awake frame by accessing the channel based on whether the highest priority AC uses the U-APSD or not. In addition, when a station transmits a PS-poll frame, the channel may be accessed based on the priority of the AC of the downlink data which may be transmitted through the PS-poll frame.

Figure 35:
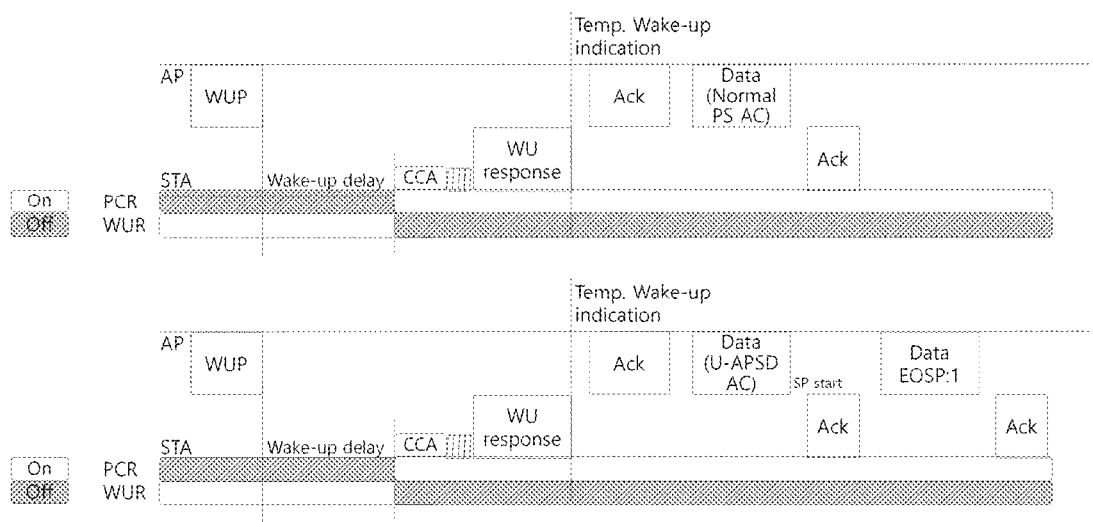
FIG. 35 is a diagram illustrating a method for receiving downlink data by a wireless communication terminal operating in a PS mode according to an embodiment of present disclosure.

FIG. 35 is a diagram illustrating a method for receiving downlink data by a wireless communication terminal operating in a PS mode according to an embodiment of present disclosure. According to the above-described embodiment, when the station is operating in PS mode, the station may maintain the awake state until the time point at which it receives at least one frame from the AP after transmitting the awake frame. For example, if the station succeeds in receiving one data frame corresponding to AC using the normal PS mode, the station may enter the PCR doze state. Alternatively, if the service period in which the station receives downlink data corresponding to AC using U-APSD is terminated, the station may enter the PCR doze state. In this case, the AP must transmit a new wake-up frame in order for the AP to transmit additional data to the station. Accordingly, an unnecessary delay may occur in transmitting the downlink data by the AP. In addition, repeatedly transmitting a wake-up frame by the AP may be inefficient in terms of channel utilization. Hereinafter, a method of delaying the transition of the station to the PCR doze state using additional frame information according to an embodiment of the present disclosure will be described.

Figure 36:
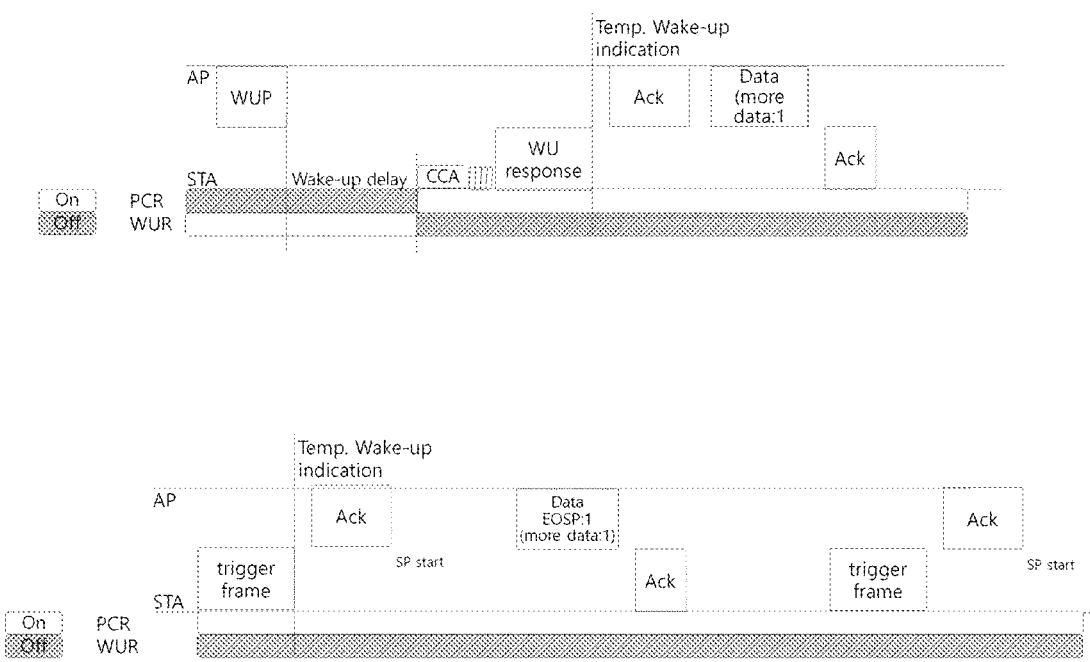
FIG. 36 is a diagram illustrating a method of delaying the entry of the PCR doze state of a wireless communication terminal according to an embodiment of the present disclosure.

FIG. 36 is a diagram illustrating a method of delaying an entry of the PCR doze state of a wireless communication terminal according to an embodiment of the present disclosure. According to an embodiment, an AP may signal additional frame information indicating whether there is downlink data to be additionally transmitted after the corresponding frame to a station. For example, the AP may transmit the additional frame information with downlink data. In particular, the additional frame information may be signaled through a MAC header of the data frame. In addition, the MAC header may include a More data field indicating additional frame information. At this point, the More data field may be a sub-field included in a Frame Control field. If additional transmission is required, the AP may set the More data field to '1'. Alternatively, if additional transmission is required, the AP may set the above-mentioned PM subfield to '1'.

Alternatively, if additional transmission is required, the additional frame information may be signaled through a separate action frame. In this case, the AP may transmit the additional frame information through the aggregated medium access control protocol data unit (A-MPDU) with the downlink data frame. In addition, the action frame may be the above-described WUR mode response frame. In this case, the WUR mode response frame may contain information in the form of an element indicating a rejection of transitioning to the PCR doze state of the station.

In addition, the station may receive additional frame information from the AP. In this case, the station may maintain the PCR awake state based on the additional frame information. For example, the station may maintain a PCR awake state until it receives at least one additional frame from the AP from when receiving the downlink data frame containing the additional frame information. In addition, if the station is operating in a normal PS mode, the station may transmit an additional PS-poll frame based on the additional frame information. For example, if additional frame information indicates that there is additional downlink data to transmit, the station may transmit an additional PS-poll frame. Specifically, the AP may transmit a first BU based on a first PS-poll frame received from the station. At this point, the first BU may further include first additional frame information indicating that there is additional downlink data to be transmitted. In this case, the station may transmit a second PS-poll frame based on the first additional frame information. After receiving the first BU, the station may transmit the second PS-poll frame to the AP through a backoff contention procedure.

Alternatively, if the station receives downlink data for an AC using U-APSD from the AP, the station may transmit a QoS frame for setting a second service period after a first service period terminates. Specifically, the AP may transmit a data frame containing second additional frame information indicating that there is downlink data to be transmitted additionally. In this case, the station may transmit a QoS frame based on the second additional frame information.

After receiving the data frame, the station may transmit a QoS frame to the AP through the backoff contention procedure.

According to an embodiment, an AP may consider an awake frame as a downlink data request frame. In this case, the AP may transmit at least one BU based on the awake frame. At this point, the AP may transmit additional frame information to a station with at least one BU. The station may receive a BU containing additional frame information. In this case, the station may maintain a PCR awake state until the time when it receives additional frames from the AP. Alternatively, the station may maintain the PCR awake state after a first service period set by an awake frame is terminated. For example, the station may transmit a QoS frame that sets a second service period to the AP. Also, the station may maintain the PCR awake state until the time when the second service period terminates.

Meanwhile, a station operating in the WUR mode may perform uplink transmission to an AP through a PCR transceiver without any signaling. On the other hand, even if downlink data is buffered, the AP may not transmit the downlink data without additional signaling following the uplink transmission of the station. The station may transition from the PCR awake state to the PCR doze state immediately after uplink transmission. The AP may not determine that the station will maintain the PCR awake state after uplink transmission. When the downlink data is buffered in the AP, it may be efficient that the station does not transition to the PCR doze state after the station performs the uplink transmission. This is because the AP may omit the wake-up frame transmission procedure before transmission of downlink data of the AP. Hereinafter, an operation of maintaining the PCR awake state after a wireless communication terminal performs uplink transmission according to an embodiment of the present disclosure will be described in detail.

Figure 37:
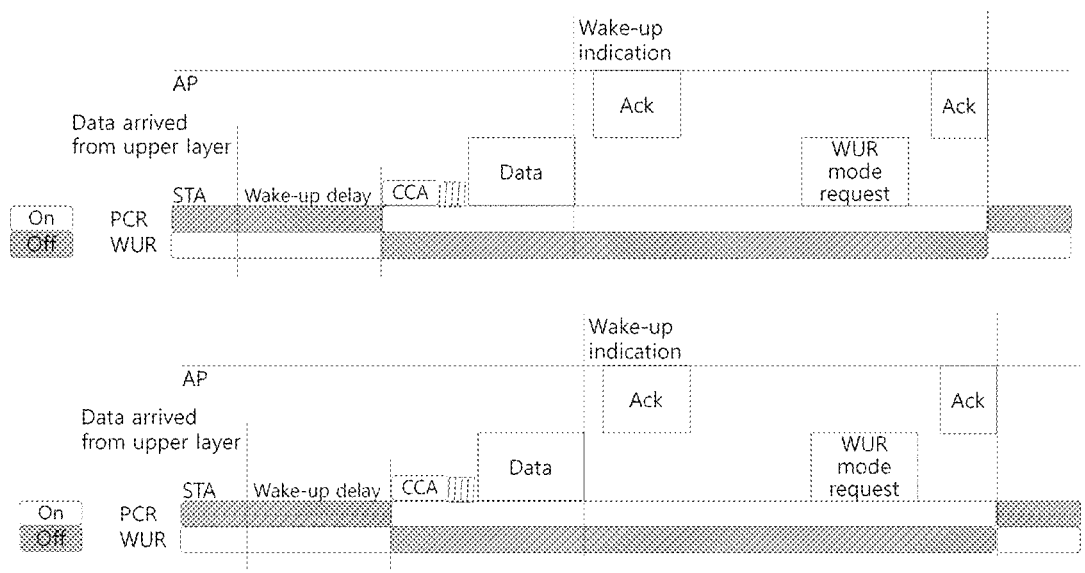
FIG. 37 is a diagram illustrating an operation method of maintaining a PCR awake state after a wireless communication terminal performs uplink transmission according to an embodiment of the present disclosure.

FIG. 37 is a diagram illustrating an operation method of maintaining a PCR awake state after a wireless communication terminal performs uplink transmission according to an embodiment of the present disclosure. According to an embodiment, after performing an uplink transmission, a station may transition a PCR awake state to a PCR doze state only when transmitting a WUR mode request frame. The station may maintain the PCR awake state from the time of transmitting the uplink transmission frame to an AP to the time of receiving the response frame Ack to the WUR mode request frame from the AP. In this case, the AP may determine that the station will maintain the PCR awake state until it receives the WUR mode request frame from the station. The AP may transmit downlink data to the station from the time of receiving the uplink transmission frame from the station to the time when the AP transmits a response frame Ack for the WUR mode request frame. The AP may transmit downlink data to the station based on the transmission sequence corresponding to the buffered downlink data.

Figure 38:
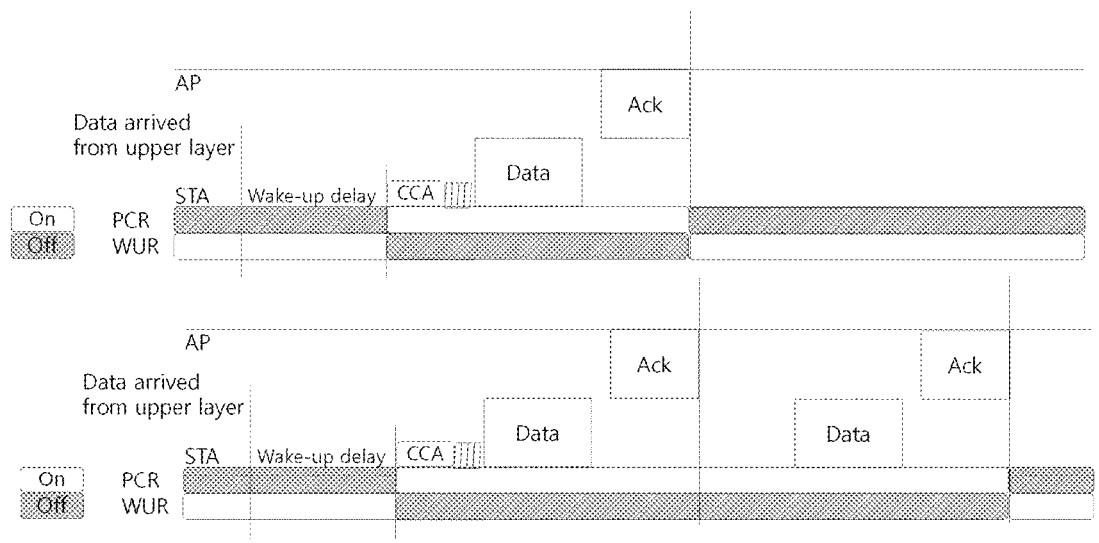
FIG. 38 is a diagram illustrating an operation method of maintaining a PCR awake state after a wireless communication terminal performs uplink transmission according to an embodiment of the present disclosure.

FIG. 38 is a diagram illustrating an operation method of maintaining a PCR awake state after a wireless communication terminal performs uplink transmission according to an embodiment of the present disclosure.

According to an embodiment, when a station performs a wake-up operation for uplink transmission, the station may transition a PCR awake state to a PCR doze state without transmitting a WUR mode request frame. This is because if the station does not wake-up according to receiving of the wake-up frame, it may be that downlink transmission from the AP is not required. In this case, the AP may determine that the station will operate in the PCR doze state from the time when the AP transmits the response frame for the uplink transmission frame. If the downlink data is buffered, the AP may transmit the downlink data by transmitting a wake-up frame to the station.

Figure 39:
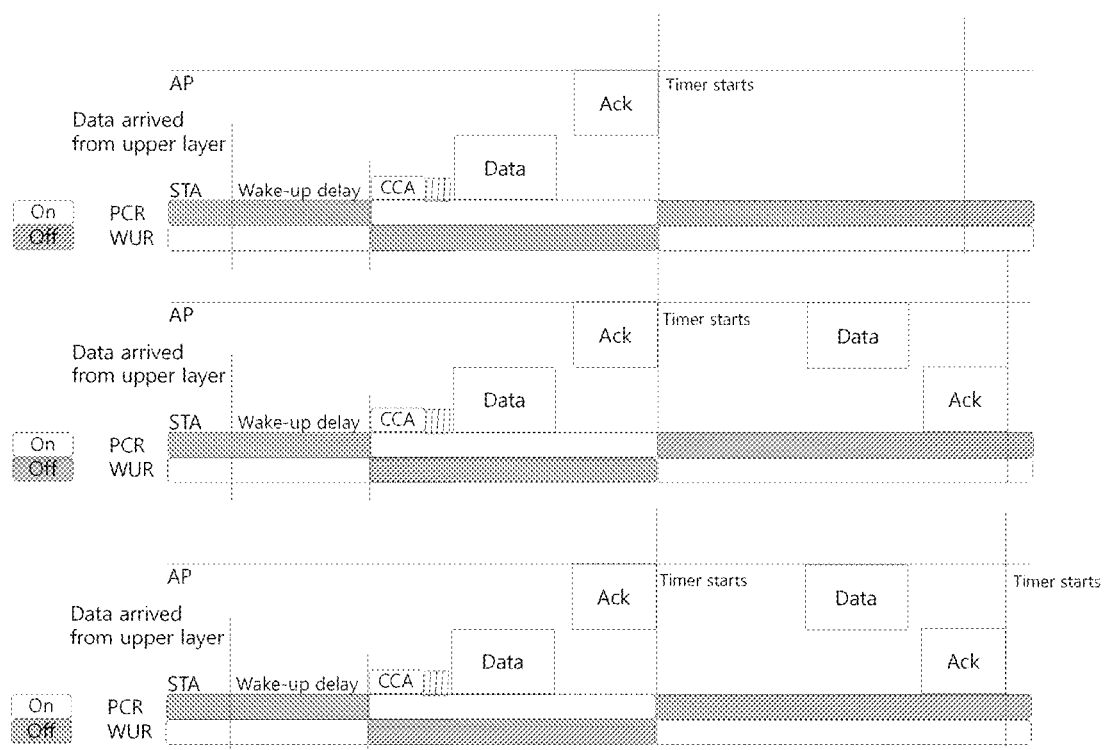
FIG. 39 is a diagram illustrating an operation method of maintaining a PCR awake state after a wireless communication terminal performs uplink transmission according to an embodiment of the present disclosure.

FIG. 39 is a diagram illustrating an operation method of maintaining a PCR awake state after a wireless communication terminal performs uplink transmission according to an embodiment of the present disclosure.

According to an embodiment, when a station performs a wake-up operation for uplink transmission, the station may maintain a PCR awake state for a predetermined time from a time when a response frame for an uplink transmission frame is received. This is because the wake-up frame transmitted through a WUR signal may have a longer transmission time than a PCR frame transmitted through a PCR signal. Here, the predetermined time may be a timer indicating a period during which the station maintains the PCR awake state. The predetermined time may be a time value set by the AP or the station. In addition, the predetermined time may be signaled in the WUR negotiation process or the link establishment process.

In this case, the AP may transmit the downlink data to the station from the time when the AP transmits the response frame for the uplink transmission frame until a first timer expires. Through this, the AP may omit the wake-up frame transmission procedure and transmit the downlink data to the station. Also, if the first timer expires, the station may transition from the PCR awake state to the PCR doze state.

Alternatively, if the station receives downlink data from the AP before the first timer expires, the station may set a second timer. In this case, the station may maintain the PCR awake state from the time when the first timer expires to the time when the second timer expires. Also, the AP may determine that the station will maintain the PCR awake state even after the first timer expires. The AP may transmit downlink data to the station until the second timer expires.

Figure 40:
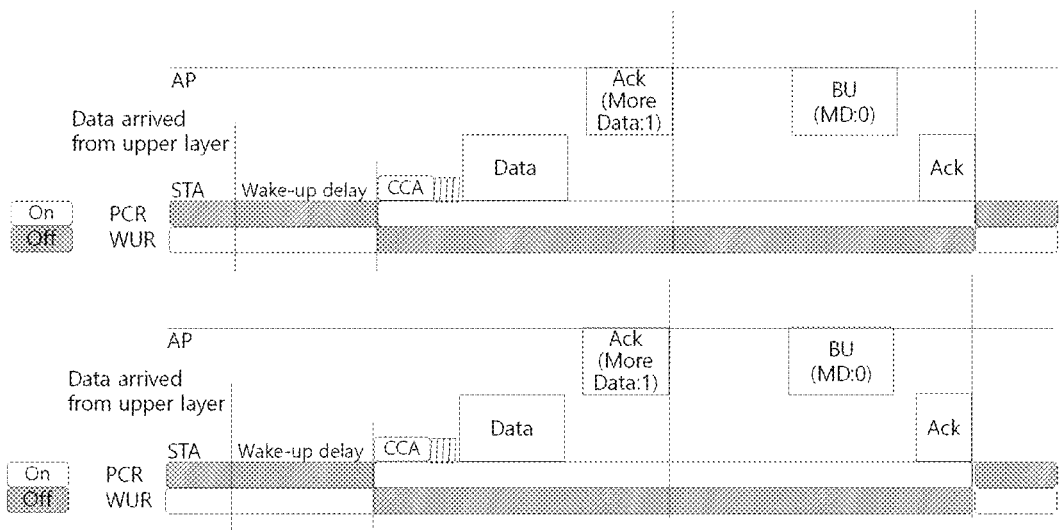
FIG. 40 is a diagram illustrating an operation method of maintaining a PCR awake state after a wireless communication terminal performs uplink transmission according to an embodiment of the present disclosure.

FIG. 40 is a diagram illustrating an operation method of maintaining a PCR awake state after a wireless communication terminal performs uplink transmission according to an embodiment of the present disclosure.

According to an embodiment, an AP may insert downlink data information indicating whether there is the downlink data buffered in the AP into a response frame for an uplink transmission frame of a station. For example, the downlink data information may be signaled through a MAC header of the response frame. In addition, the MAC header may include a More data field indicating whether there is downlink data buffered in the AP. At this point, the More data field may be a sub-field included in a Frame Control field. The AP may set the More data field to '1'. Alternatively, the AP may set the above-described PM subfield to '1'. Alternatively, the downlink data information may be signaled through a separate action frame. In this case, the AP may transmit additional frame information through the aggregated A-MPDU with the response frame. The station may maintain the PCR awake state until the time when it receives at least one BU from the AP based on the downlink data information included in the response frame.

According to an embodiment, when a station is operating in a normal PS mode, the station may transmit a PS-poll frame based on downlink data information included in a response frame. Alternatively, the station may receive the downlink data information indicating that there is downlink data buffered in an AP from the AP, before a first service period for transmitting and receiving data using the U-APSD terminates. In this case, the station may transmit a QoS frame to the AP, which sets a second service period based on the downlink data information. Accordingly, the station and the AP according to an embodiment of the present disclosure may efficiently perform the uplink and downlink transmission through the downlink data information. The station may maintain the PCR awake state only when downlink data reception is required.

Figure 41:
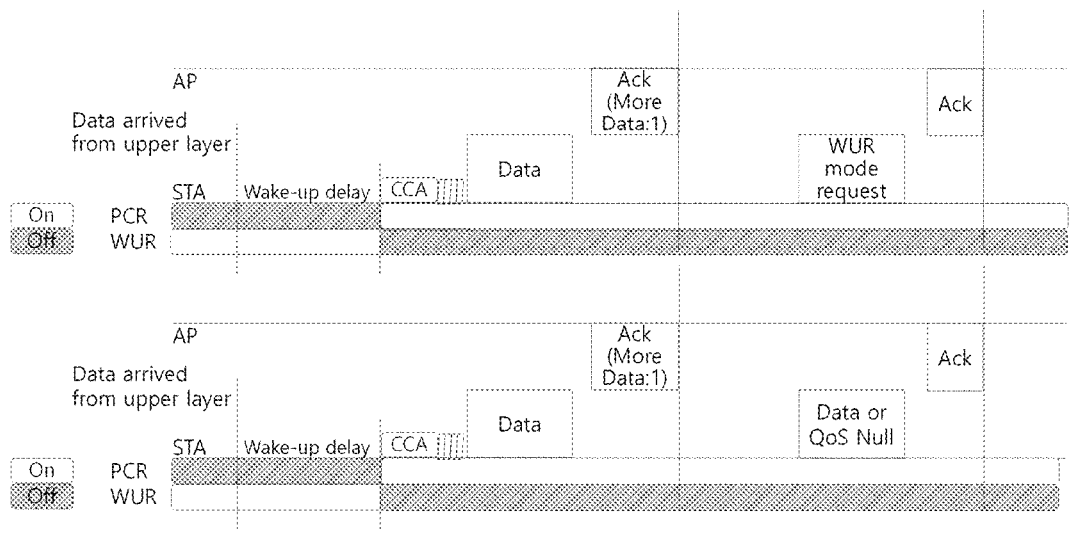
FIG. 41 is a diagram illustrating an operation method of maintaining a PCR awake state after a wireless communication terminal performs uplink transmission according to an embodiment of the present disclosure.

FIG. 41 is a diagram illustrating an operation method of maintaining a PCR awake state after a wireless communication terminal performs uplink transmission according to an embodiment of the present disclosure.

According to an embodiment, a station may signal information indicating that it will not operate in a WUR mode based on downlink data information described above with reference to FIG. 40. For example, the station may receive downlink data information indicating that there is downlink data buffered in an AP from the AP. In this case, the station may transmit to the AP information indicating that the station is not going to operate in WUR mode. At this point, the station may use a WUR mode request frame.

Alternatively, the station may regard a reception of a frame as tahe reception of a wake-up frame, based on the downlink data information included in the frame received from the AP. For example, if the station receives downlink data information indicating that there is downlink data buffered in the AP, the station may transmit a awake frame to the AP. At this point, the awake frame may be a request frame for requesting the downlink data buffered in the AP as described above. In addition, the station may maintain the PCR awake state according to the normal PS mode.

Figure 42:
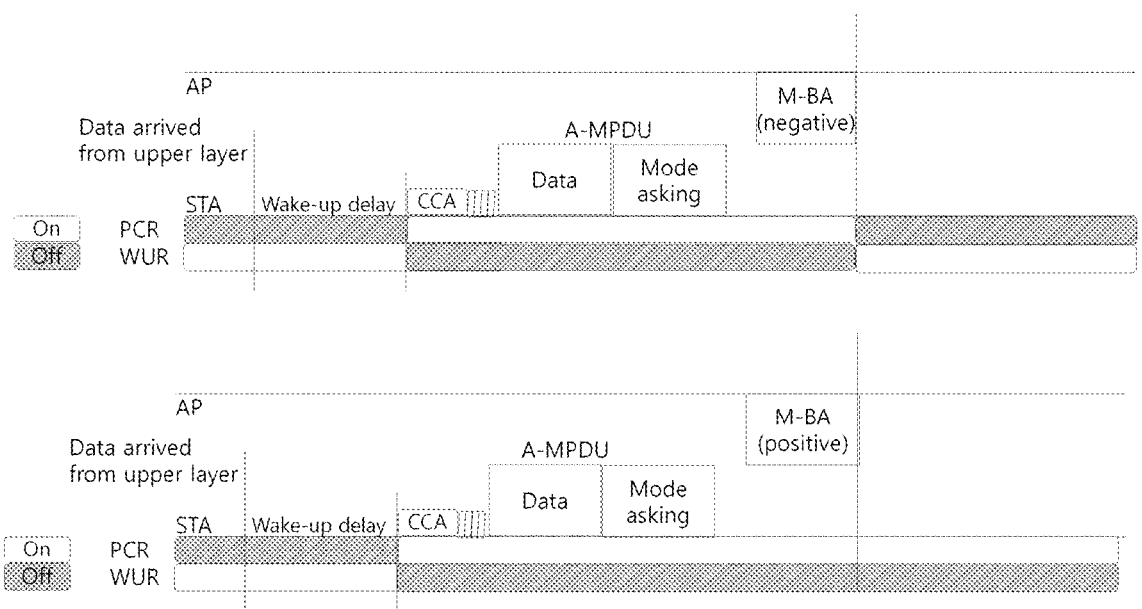
FIG. 42 is a diagram illustrating an operation method of maintaining a PCR awake state after a wireless communication terminal performs uplink transmission according to an embodiment of the present disclosure.

FIG. 42 is a diagram illustrating an operation method of maintaining a PCR awake state after a wireless communication terminal performs uplink transmission according to an embodiment of the present disclosure.

According to an embodiment, a station may transmit a Mode asking frame requesting downlink data information with an uplink transmission to an AP. For example, a station may transmit a Mode asking frame through an A-MPDU aggregated with an uplink transmitted data frame. At this point, the Mode asking frame may be an action frame. Specifically, the Mode asking frame may be a frame having the same format as the WUR mode request frame.

In addition, when the AP receives a Mode asking frame from the station, the AP may respond according to the presence of the buffered downlink data. For example, if the downlink data is not buffered, the AP may transmit a response frame containing information indicating 'negative'. At this point, the station may transition from the PCR awake state to the PCR doze state based on the response frame. Conversely, if the downlink data is buffered, the AP may transmit a response frame containing information indicating 'positive'. At this point, the station may maintain PCR awake state based on the response frame. For example, a station may maintain a PCR awake state until the time when it receives at least one BA. According to an embodiment, the AP may respond with a block response frame block-Ack for an aggregated A-MPDU which aggregate data frame and a Mode asking frame-.

Figure 43:
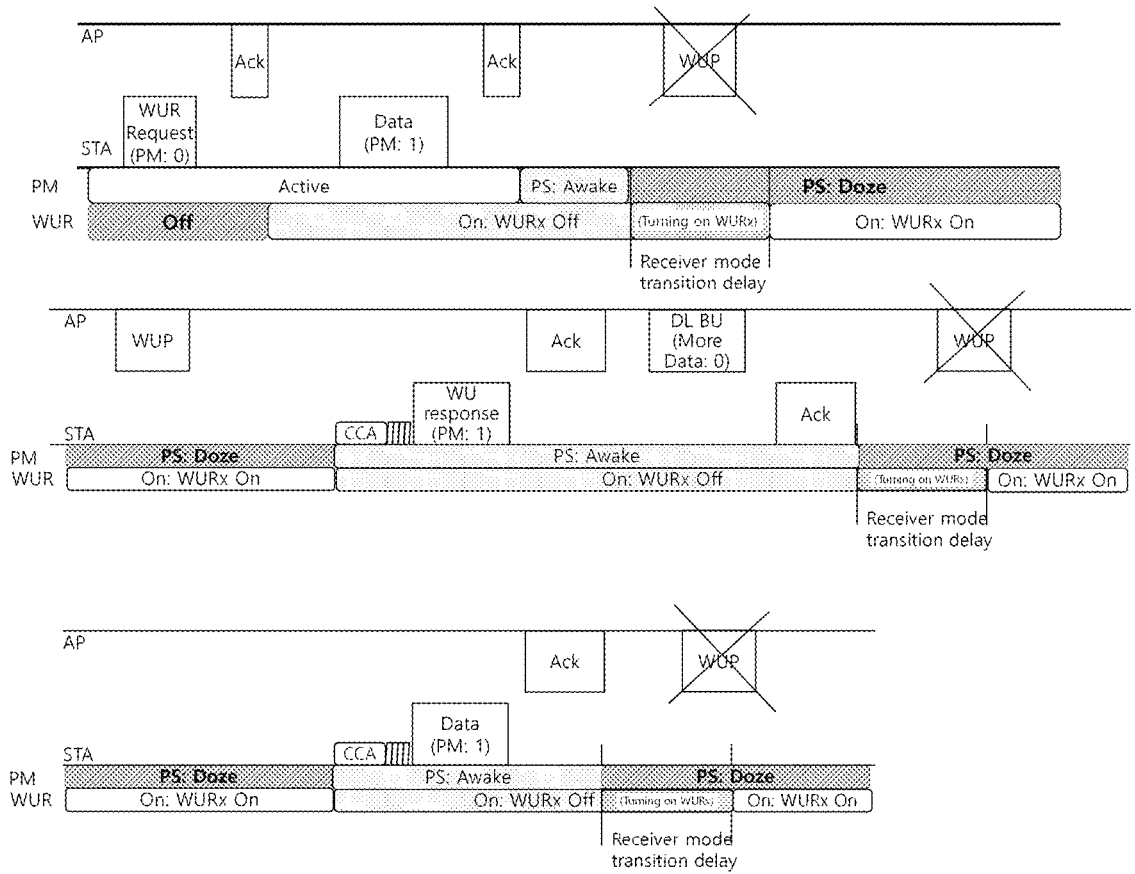
FIG. 43 is a diagram for explaining a PS mode operation method of a wireless communication terminal according to an embodiment of the present disclosure.

FIG. 43 is a diagram for explaining a PS mode operation method of a wireless communication terminal according to an embodiment of the present disclosure. According to an embodiment, an AP may attempt to transmit downlink data to a station operating in a PS mode only when the station requests a downlink transmission to the AP. However, if the station that activates a WUR mode simultaneously operates in the PS mode, the AP may transmit a wake-up frame to the station when there is data to attempt downlink transmission.

Accordingly, the AP may confirm whether the station operating in the PS mode is in a state in which reception of a wake-up frame is capable.

For example, if the station starts operating in PS mode after activating the WUR mode, it enters the PCR doze state, turns off the PCR transmission/reception function, and turns on the reception function through a WURx. At this point, the WURx transition delay, which is the delay time required for the station to transition the WURx from the WURx doze state to the WURx awake state, may be several hundreds of microseconds to several milliseconds. In addition, the station may perform the association procedure for entering into the WUR mode with the AP. However, the station may not receive a wake-up frame during the WURx transition delay.

Accordingly, if the wake-up frame transmitted by the AP arrives before the station enters the WURx awake state, the station may not be able to transmit a awake frame, which is a response frame for the wake-up frame. The AP may have to wait until the time-out of the wake-up frame, and then retransmit the wake-up frame. Such a retransmission operation may be inefficient.

In addition, when the station receives a wake-up frame in the WUR mode and the PS mode, the station may wake-up a PCR transceiver of the station and exchange frames with the AP in the PCR awake state. Thereafter, if the station does not signal to the AP that the PCR transceiver is in active mode, the station may return to the PCR doze state. At this point, the station may not receive a wake-up frame from the AP for the time required to transition the WURx from the WURx doze state to the WURx awake state.

Also, a station may transition to PCR awake state for uplink data transmission in WUR mode and PS mode. Thereafter, if the station does not notify active mode transitioning, the station that does not have uplink data to transmit anymore may return to the PCR doze state. At this point, the station may not receive the wake-up frame from the AP for the time required to transition the WURx from the WURx doze state to the WURx awake state. Hereinafter, a method of transmitting a wake-up frame in consideration of a WURx transition delay of a station according to an embodiment of the present disclosure will be described in detail.

Figure 44:
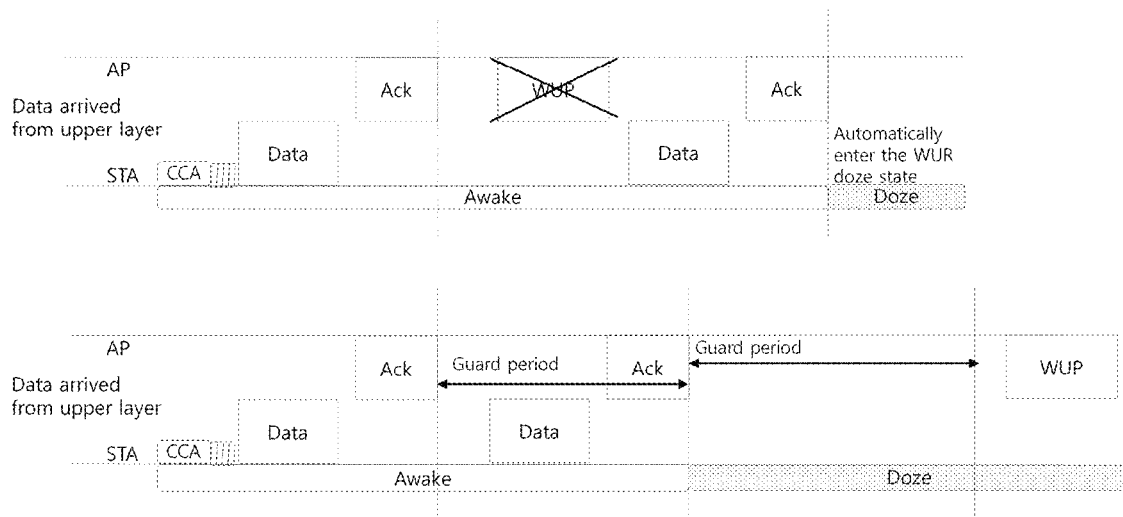
FIG. 44 is a diagram illustrating a method for setting a guard time according to an embodiment of present disclosure.

FIG. 44 is a diagram illustrating a method for setting a guard time according to an embodiment of present disclosure. A wireless communication method according to an embodiment of the present disclosure may set a guard time for a specific time so that an AP does not transmit a wake-up frame to a station during a corresponding time. Here, the guard time may be a predetermined time that restricts the wake-up frame transmission of the AP to the station.

According to an embodiment, after a first uplink transmission of a station, an AP may transmit a wake-up frame to the station. This is because the AP may determine that the station that completes uplink transmission will operate in a PCR doze state and a WURx awake state. However, the station may maintain a PCR awake state for additional data transmission. At this point, if the station does not maintain the WURx awake state, the station may not receive the wake-up frame. Since the WUR frame has a relatively longer airtime required for frame transmission than the PCR frame transmitted and received through PCR, as the number of wake-up frame transmissions increases, the efficiency of wireless network resources may be degraded. Accordingly, when the station uses the WUR mode and the PS mode at the same time, the AP may transmit the wake-up frame based on the guard time.

According to an embodiment, a guard time may be set after a station successfully completes transmitting and receiving data through PCR. For example, the guard time may be set from the time when an AP completes transmission of a response frame for uplink data received from the station. The station may set the guard time from the time when the station receives a response frame for uplink data transmission from the AP. In addition, the AP and the station may recognize information on a common guard time. Accordingly, the station may determine that the wake-up frame will not be received during the guard time from the time when the response frame is received. If there is additional data to attempt uplink transmission, the station may remain in the awake state. In this case, the AP and the station may reset the time as a reference of the guard time. Also, if the AP receives uplink data that does not require an immediate response from the station, the AP may set the guard time from the time when the AP receives the uplink data.

Figure 45:
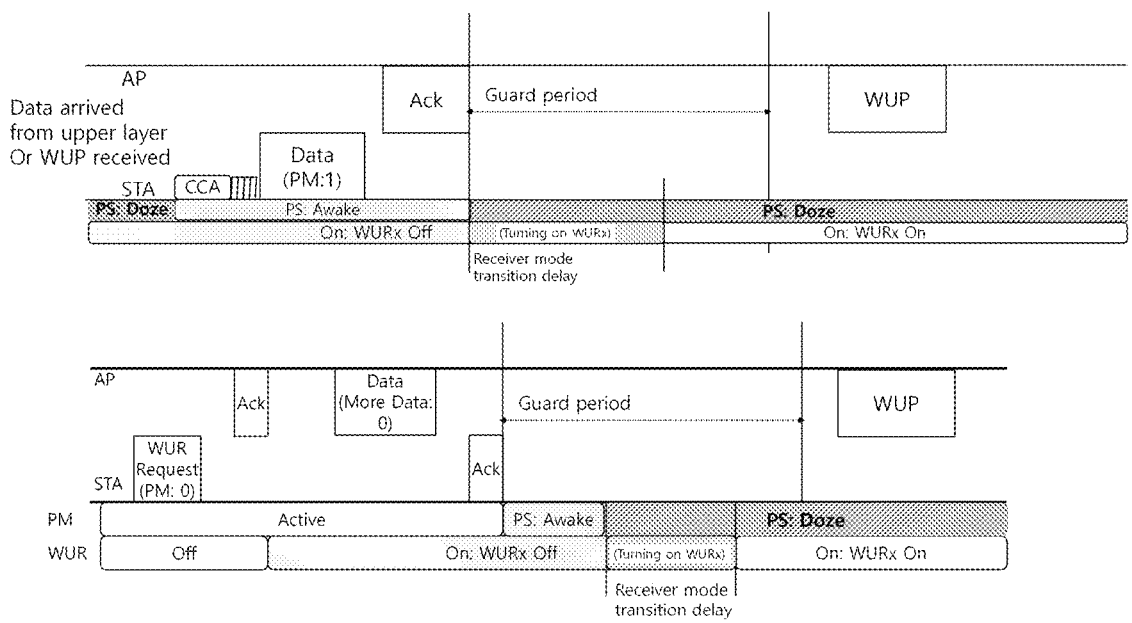
FIG. 45 is a diagram illustrating a method for setting a guard time according to an embodiment of the present disclosure.

FIG. 45 is a diagram illustrating a method for setting a guard time according to an embodiment of present disclosure.

According to an embodiment, a station may be difficult to receive a wake-up frame during a guard time based on a response frame reception time for an awake frame transmitted to an AP. In addition, when the station awakes-up to receive downlink data from the AP, the station may transmit a response frame in response to the completion of the downlink data reception. At this point, the station may be difficult to receive the wake-up frame during the guard time from the time when the response frame is transmitted.

In addition, according to an embodiment, a station operating in a WUR mode and a PCR active mode may transmit a data frame in which a PM field is set to '1'. In this case, the station may receive a response frame for data frame from an AP. At this point, the guard time may be set from the time when the station receives the response frame. In addition, the guard time may be set from the time when the station receives the response frame for the WUR mode request. The AP may set the guard time from the time when the station transmits the response frame.

In the situation described above, the station may not expect to receive a wake-up frame from the AP during a guard time. Further, after the guard time expires, the station may receive a wake-up frame from the AP. At this point, the station may maintain the awake state of WURx at least from the time when the guard time expires.

Meanwhile, if an additional PCR operation is expected even after the station completes the data transmission/reception through the PCR, the station and the AP may not set a guard time. For example, in the case of uplink data transmission, the station may set the PM field to '0' in uplink data in WUR mode and PS mode. At this point, 'PM: 0' may indicate an active mode. Accordingly, the station may operate in the active mode from the time of receiving the response frame for the uplink data including 'PM: 0' from the AP. In this case, the station and the AP may not set a guard time. The station may not expect to receive a wake-up frame from the AP.

In addition, when the station transmits an awake frame that is type of the PS-poll frame to the AP, the station may receive an immediate response frame from the AP. In this case, the station may maintain the awake state until the time when the AP transmits the downlink data in the new TXOP. At this point, the station may not set a guard time. Alternatively, if the station receives downlink data from the AP with a More Data field set to '1', the station may transmit a request frame to receive additional downlink data from the AP. At this point, the station may not set a guard time.

Figure 46:
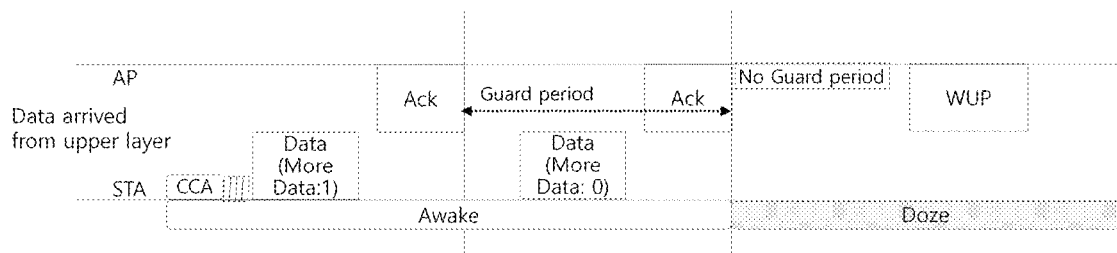
FIG. 46 is a diagram illustrating a method for early termination of a guard time according to an embodiment of the present disclosure.

FIG. 46 is a diagram illustrating a method for early termination of a guard time according to an embodiment of the present disclosure. According to an embodiment, a station may signal information indicating a status of a PCR transceiver of the station after it successfully completes uplink data transmission. At this point, the information indicating a PCR state may be signaled through a MAC header of a data frame transmitted by the station. In addition, the MAC header may include a More data field indicating whether there is data to be transmitted additionally after the corresponding frame. As described above, the station may expect not to receive a wake-up frame during the guard time from when the uplink transmission is successful. However, this is because that the station may receive a wake-up frame even before the guard time expires.

For example, the station may set the More data field of the data frame to 1. At this point, a station operating in WUR mode and PS mode may maintain PCR awake state. At this point, the AP may determine that the PCR transceiver of the station is in the awake state based on the More data field. In addition, the AP may set the guard time from when the frame is received. The AP may not transmit a wake-up frame during the guard time. Also, since the More data field indicates that the station maintains the PCR awake state, the AP may attempt downlink transmission to the corresponding terminal.

Conversely, the station may set the More data field of the data frame to 0. At this point, a station operating in the WUR mode and the PS mode may not maintain the PCR awake state. If the More data field is '0', it indicates that there is no additional data to be transmitted by the station. At this point, the AP may determine that the guard time setting is not required based on the More data field. The AP may not set the guard time. In addition, the AP may transmit a wake-up frame to the station without guard time after receiving the corresponding data frame. Thus, if the station successfully uplink transmits, the station may maintain a WURx in the WURx awake state.

According to another embodiment, an AP may cancel the set guard time. For example, with the guard time set, the AP may receive a date frame with a More data field of '0' from a station. In this case, the AP may cancel the set guard time. This is because the guard time may not be maintained. According to an embodiment, if the response frame for the uplink transmission transmitted from the station to the AP includes a More data field, the AP may set the guard time.

Figure 47:
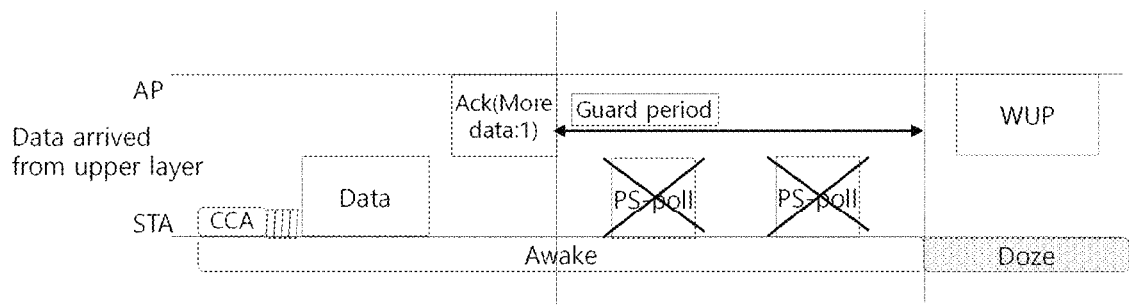
FIG. 47 is a diagram illustrating a method for setting a guard time according to an embodiment of the present disclosure.

FIG. 47 is a diagram illustrating a method for setting a guard time according to an embodiment of present disclosure. According to an embodiment, if an AP sets a More data field of a response frame to '1', the AP may expect to receive a frame requesting downlink data transmission from a station. For example, an AP may expect to receive a PS-poll frame from a station operating in WUR mode and PS mode. At this point, the AP may determine whether the reception of the request frame from the station is failed based on the guard time. This is because the AP may not receive the request frame from the station, due to the transmission of the request frame may be delayed or failed due to channel congestion. Specifically, when the AP does not receive the downlink data request frame from the station during the guard time from the completion of the transmission of the response frame, the AP may determine that the request frame fails to be received from the station. In this case, the AP may transmit a wake-up frame to the station.

The AP may not receive the PS-poll from the station during the guard time from the time when it transmits the response frame with the More data field set to '1'. The AP may not wait for a reception of a PS-poll after the guard time expires. In addition, the AP may attempt downlink transmission to the station using a wake-up frame. Also, the station may determine that it receives a wake-up frame from the AP after the guard time from the time point at which the frame with the More data field of '1' is received. Accordingly, the station may maintain the WURx awake state at least after the guard time.

Figure 48:
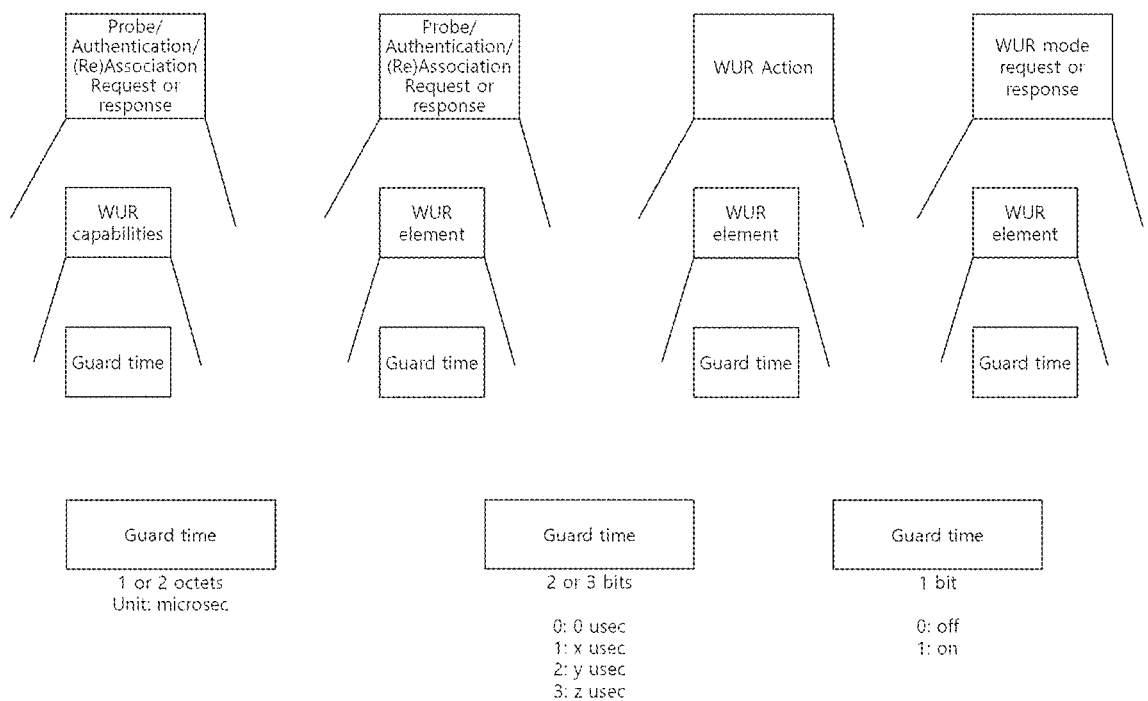
FIG. 48 is a diagram illustrating a method in which an AP and a station to exchange information on guard time according to an embodiment of the present disclosure.

FIG. 48 is a diagram illustrating a method for an AP and a station to exchange information on guard time according to an embodiment of present disclosure. According to an embodiment, information on guard time may include a plurality of octets. Further, the information on the guard time may be indicated in units of microseconds. Alternatively, the information on the guard time may be designated by a plurality of values or a predetermined definition composed of a plurality of bits. Alternatively, the information on the guard time may include information indicating whether a guard time is required. At this point, the information indicating whether the guard time is required may be information composed of one bit. Alternatively, an AP may be transmitted to a station in a manner that indicates whether the corresponding BSS is using guard time.

As described above with reference to FIG. 45, the AP and the station may exchange information on the guard time through PCR. For example, the information on the guard time may be included in the probe request and association request transmitted and received in the link establishment procedure. According to an embodiment, the WUR capability element described above may include the information on the guard time. Alternatively, the information on the guard time may be exchanged through the WUR association request procedure and the WUR association response procedure described above. At this point, the terminal may exchange the information on the guard time using a WUR management frame such as a WUR action frame, a WUR mode request frame, and a WUR mode response frame.

The AP may transmit the guard time value to the station using the WUR management frame. Also, the AP and the station may set the guard time based on the guard time value. Alternatively, the station may modify the guard time value received from the AP. For example, the station may transmit the modified guard time value to the AP through the WUR management frame. In this case, the AP may set the guard time based on the modified guard time value. The AP may set the guard time based on the value received from the station.

Figure 49:
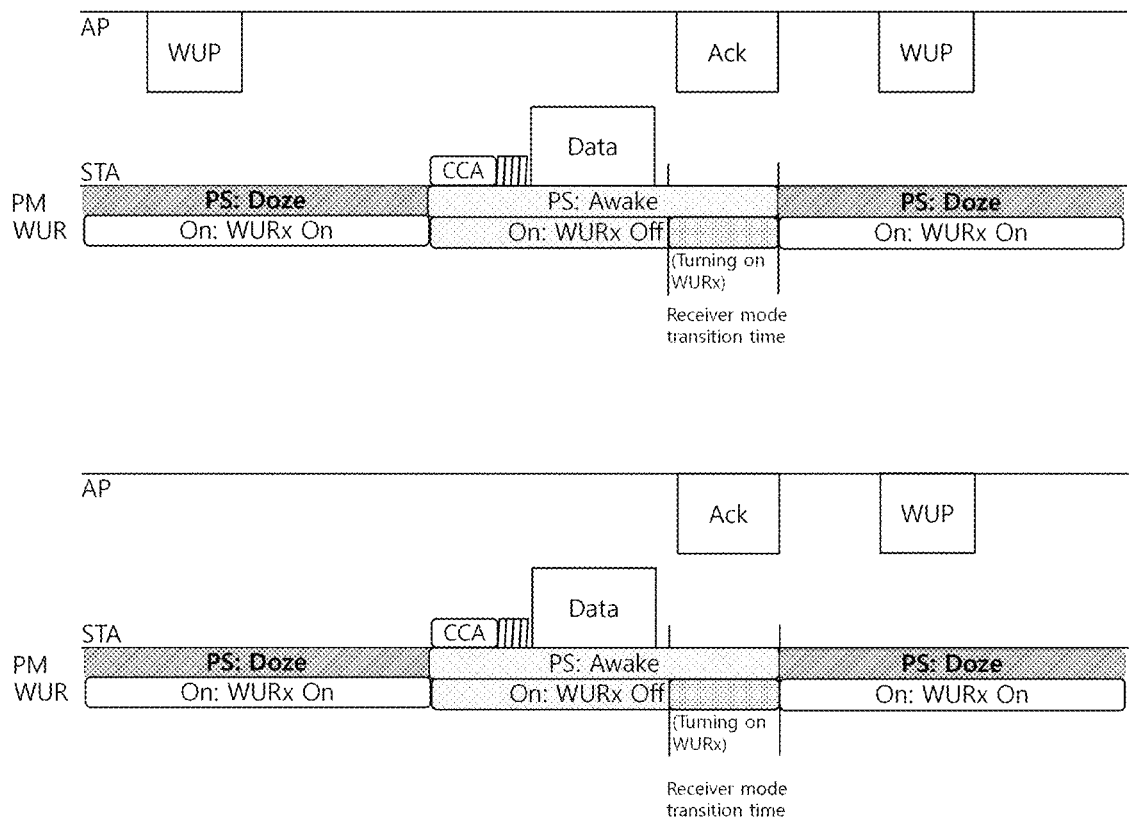
FIG. 49 is a diagram illustrating an operation of a station in PS mode according to an embodiment of the present disclosure.

FIG. 49 is a diagram illustrating an operation of a station in PS mode according to an embodiment of the present disclosure. According to an embodiment, a station may transition from a WURx doze state to a WURx awake state until the time when it successfully completes a PCR operation. The station may turn on a power of WURx before the expected time when the wake-up frame is received, to allow receiving operation of the WURx at the time when the station completes the PCR operation. This is because it is difficult for an AP to recognize from when the station operating in the PS mode transitions the state of the PCR to the PCR doze state. Even when the station changes the active mode to the PS mode while maintaining the WUR mode, the above-described method may be applied equally or correspondingly. At this point, the station may change WURx to a receivable state until the time when the reception completion of the response frame for a frame in which at least PM is set to '1' is expected.

Figure 50:
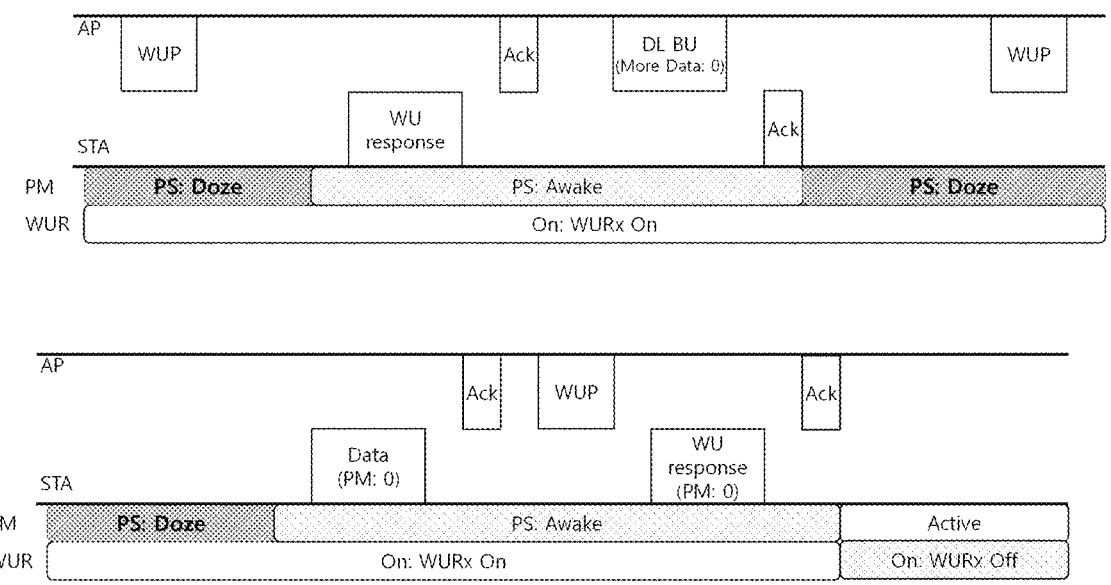
FIGS. 50 and 51 are diagrams illustrating operations of a wireless communication terminal in a PS mode according to the embodiment of the present disclosure.
Figure 51:
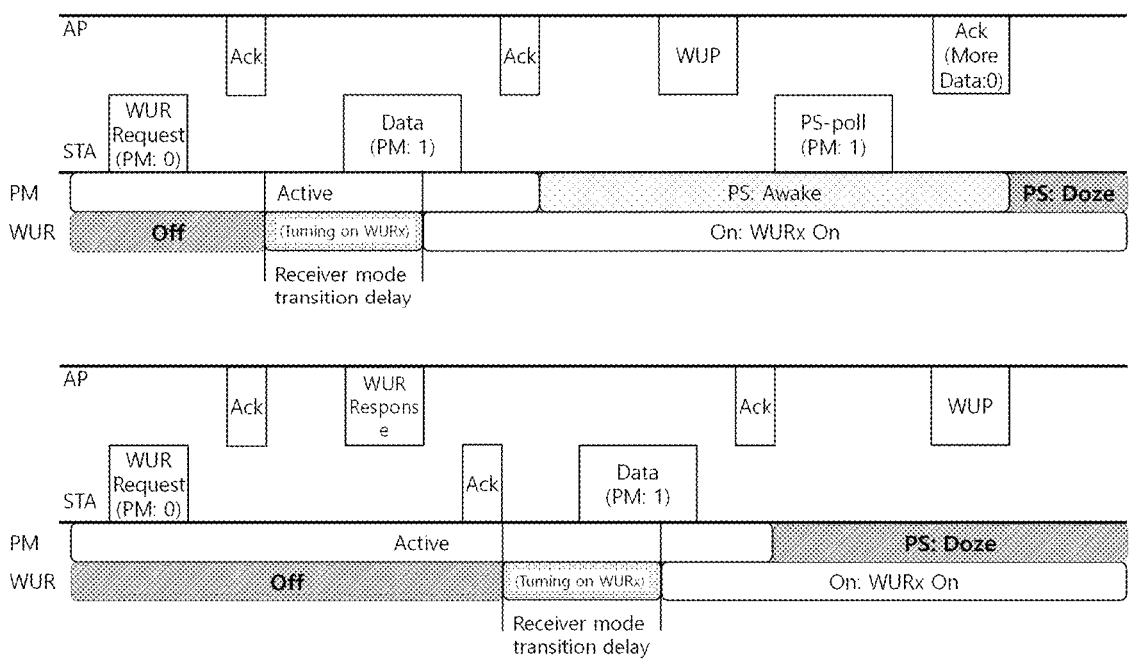

FIGS. 50 and 51 are diagrams illustrating operations of a wireless communication terminal in a PS mode according to an embodiment of the present disclosure. According to an embodiment, a station operating in a WUR mode and an active mode may maintain a WURx in the WURx awake state regardless of a PCR state. If downlink data transmission is required, an AP may indicate through a wake-up frame that there is downlink data to be transmitted to the station. Also, this is because if the station maintains a WURx awake state, the AP may not consider the WURx transition delay of the station.

A station according to an embodiment of present disclosure may receive a wake-up frame in WUR mode and PS mode or may turn on power of PCR for uplink data transmission. In this case, the station may maintain a WURx in a receivable state until it transmits a frame containing information for transitioning the PM function related mode to the active mode. In addition, the station may maintain the WURx awake state until it transmits a frame containing information to release the WUR mode. If the station completes frame transmission/reception through PCR, the station may transition the PCR from the PCR awake state to the PCR doze state. At this point, the station may receive the wake-up frame even before transitioning the PCR to the PCR doze state from the time point at which the frame transmission/reception operation through PCR is completed. In this case, the station may operate regardless of the PCR transition delay or initial CCA related conditions. For example, the station may attempt to access the channel without considering the PCR transition delay after receiving the wake-up frame. In addition, the station may transmit the above-described awake frame in the nearest TXOP.

Meanwhile, a station according to the embodiment of the present disclosure may maintain a WURx in a WURx awake state regardless of a PCR state from the time when the station enters a WUR mode. For example, in a PCR active state, when the station requests entry of the WUR mode to the AP, the station may transition a WURx to a receivable state from the time of receiving the response frame for the WUR mode entry request. In addition, the station may maintain the WURx awake state after the WURx transition delay elapses. According to an embodiment, the WUR mode entry scheme of the station may be a two-way handshake scheme. Or if the WUR mode entry method of the station is a 4-way handshake method, the WUR mode request frame may be received from the AP, and the state of the WURx may be transitioned based on the time point of transmitting the station's response frame for the response frame.

In addition, when the station maintains a WURx in the WURx awake state regardless of the PCR state, it may receive the wake-up frame transmitted to the station and immediately transmit the awake frame. Also, by receiving a wake-up frame transmitted to another station and maintaining the PCR transceiver of the station in the PCR doze state during the corresponding wake-up frame transmission period, power efficiency may be increased additionally.

Figure 52:
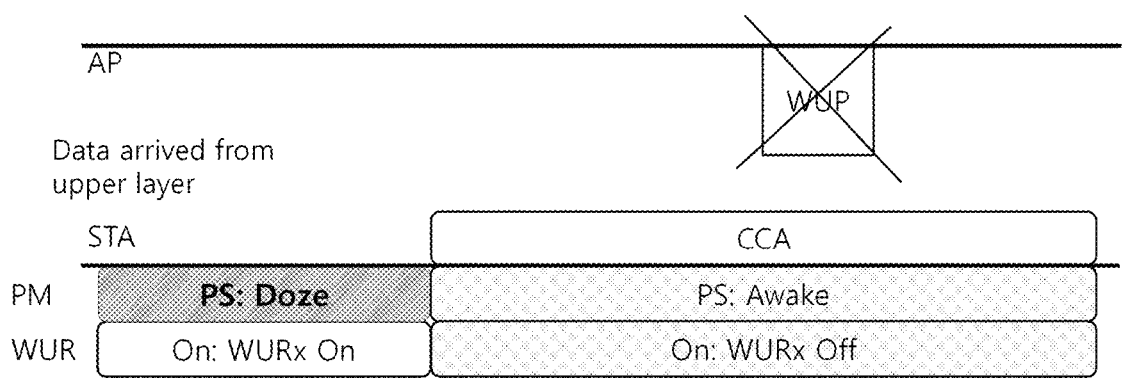
FIG. 52 is a diagram illustrating an uplink transmission operation method of a wireless communication terminal according to an embodiment of the present disclosure.

FIG. 52 is a diagram illustrating an uplink transmission method of a wireless communication terminal according to an embodiment of present disclosure. A station operating in WUR mode and PS mode may transition from a PCR doze state to a PCR awake state to transmit uplink data. In this case, the station may perform the initial CCA as described above with reference to FIG. 13. However, it may be difficult for an AP to recognize the PCR awake state of the station until it receives the uplink data from the station. That is, it may be difficult for the AP to recognize the PCR awake state of the station while the station completes the initial CCA and performs the contention procedure. If there is downlink data for the AP to transmit to the station, the AP may transmit a wake-up frame to the station. This is because the AP only recognizes that the station is operating in WUR and PS modes.

Accordingly, the AP may transmit the wake-up frame to the station while the station performs the initial CCA and contention procedure in the awake state. At this point, if the WURx of the station is not receivable, the station may be difficult to receive the wake-up frame transmitted by the AP. Also, while performing the initial CCA, the station may be difficult to catch the NAV through the wake-up frame. This is because the station may interpret only the L-SIG part when receiving a wake-up frame through PCR. Thus, a transmission wait time for the station to transmit uplink data may increase. This is because after the NAVSyncDelay elapses or until the time when the PCR frame is transmitted by another station after the wake-up frame, the station may not transmit uplink data.

Figure 53:
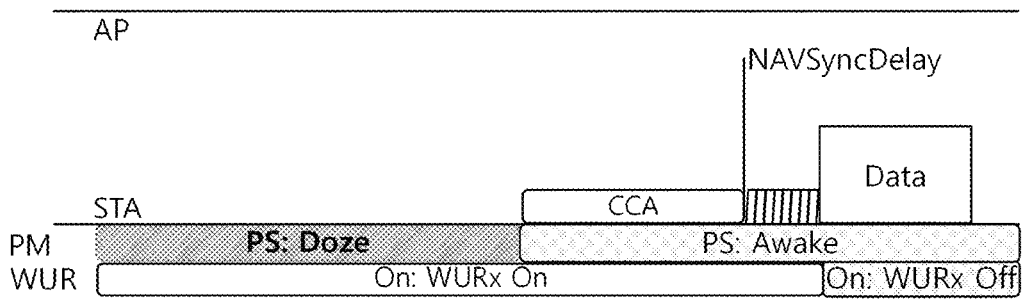
FIG. 53 is a diagram illustrating an uplink transmission operation method of a wireless communication terminal according to an embodiment of the present disclosure.
Figure 53:
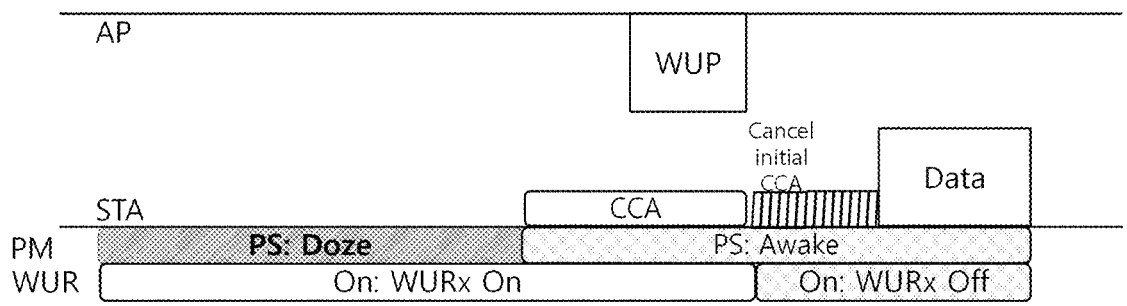
Figure 53:
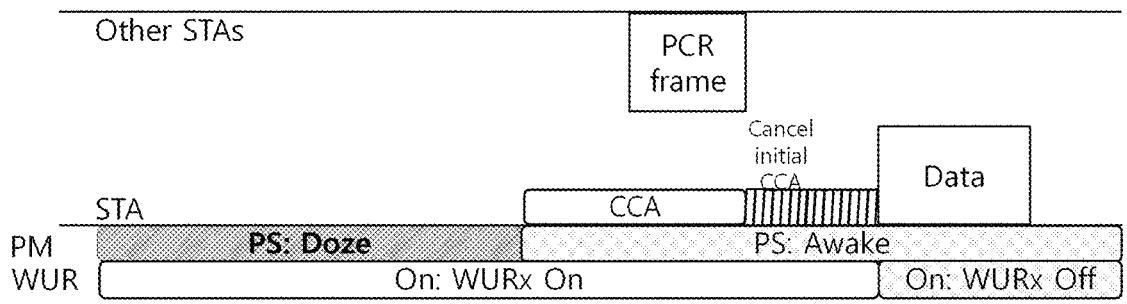

FIG. 53 is a diagram illustrating an uplink transmission method of a wireless communication terminal according to an embodiment of present disclosure. According to an embodiment, a station may maintain a PCR awake state for uplink transmission in WUR mode and PS mode. For example, while the station performs an initial CCA operation or performs a contention procedure, the station may maintain a WURx to be available for reception. In this case, the station may receive the wake-up frame transmitted from an AP while the station performs the initial CCA operation or performs the contention procedure.

In addition, when the station receives the wake-up frame transmitted from the AP during the initial CCA operation, the station may perform a subsequent sequence for uplink transmission to the AP without completing the initial CCA operation. For example, if a station receives a wake-up frame through a WURx, the station may determine a reception completion time for the wake-up frame. Also, the station may determine that immediate frame transmission/reception will not occur between the AP and another station after the reception completion time for the wake-up frame. Accordingly, the station may perform an operation similar to that in the state in which the NAV is set as described above. The station may early terminate the initial CCA operation. Specifically, the station may perform a contention procedure for occupying a channel from a time when reception of the wake-up frame is completed. Also, the station may maintain the WURx doze state from the time when the wake-up frame is received to the time when a predetermined timer expires. This is because the station receiving the wake-up frame may determine that the AP will not transmit a new wake-up frame until at least the time when the predetermined timer expires.

According to an embodiment, when a station receives a PCR frame through a PCR from another station including an AP in an initial CCA process, the station may terminate the initial CCA operation. For example, the station may check the information related to the NAV setting of another station through the duration field or the TXOP field of the preamble of the received PCR frame. If another station sets the NAV, the station may terminate the initial CCA operation. In this case, the station may perform a contention procedure based on the information related to the NAV setting, from a time when the transmission/reception operation corresponding to the NAV expires. In addition, the station may maintain a WURx to be receivable until it occupies the channel through a contention procedure. For example, the station may maintain a WURx to be receivable until it occupies the channel and transmits uplink data to the AP. This is because while the station is participating in the contention procedure, the AP may retransmit the wake-up frame.

The above-mentioned description of the present disclosure is for illustrative purposes only, and it will be understood that those of ordinary skill in the art to which the present disclosure belongs may make changes to the present disclosure without altering the technical ideas or essential characteristics of the present disclosure and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present disclosure is defined by the appended claims rather than the above detailed description, and all changes or modifications derived from the meaning and range of the appended claims and equivalents thereof are to be interpreted as being included within the scope of present disclosure.

What is claimed is:

1. A wireless communication terminal that communicates wirelessly, the terminal comprising:
   a wireless transceiver for transmitting and receiving a signal modulated by a first modulation method and receiving a signal modulated by a second modulation method different from the first modulation method; and
   a processor,
   wherein the processor is configured to:
   receive a wake-up frame which includes an indicator triggers to receive a delivery traffic indication map (DTIM) from a base wireless communication terminal using the second modulation method, and
   determine an expected reception time at which a reception of a beacon frame which includes the DTIM is expected among a plurality of reception times at which a reception of a beacon frame is expected, based on a predetermined reception period of the beacon frame which includes the DTIM and the indicator, wherein the predetermined reception period of the beacon frame which includes the DTIM is an integral multiple of a predetermined reception period of the beacon frame,
   transition from a doze state to an awake state to be in the awake state at least before the expected reception time at which the reception of the beacon frame which includes the DTIM,
   receive the beacon frame which includes the DTIM from the base wireless communication terminal after the transitioning, and
   receive a group downlink data transmitted subsequently to the received beacon frame which includes the DTIM from the base wireless communication terminal using the first modulation method when the group downlink data is present, wherein the group downlink data is transmitted to a group of a plurality of wireless communication terminals comprising the wireless communication terminal,
   wherein the awake state represents a state in which transmission and reception using the first modulation method are capable, and the doze state represents a state in which transmission and reception using the first modulation method are not capable,
   wherein the wake-up frame is a frame modulated by the second modulation method, and
   wherein the beacon frame which includes the DTIM is modulated by the first modulation method and transmitted periodically.

2. The wireless communication terminal of claim 1, wherein the processor is further configured to maintain the awake state, at least for a predetermined time from the expected reception time.

3. The wireless communication terminal of claim 2, wherein the expected reception time indicates a nearest reception period that comes after a reception time of receiving the wake-up frame.

4. The wireless communication terminal of claim 2, wherein the expected reception time indicates a nearest reception period that comes after the time required for transitioning from the doze state to the awake state of the wireless communication terminal elapses from a reception time of receiving the wake-up frame.

5. The wireless communication terminal of claim 1,
   wherein the group downlink data indicates downlink data whose receiver address is a group address.

6. The wireless communication terminal of claim 1, wherein the DTIM including a bit indicating whether the group downlink data is buffered in the base wireless communication terminal, and
   wherein the processor is further configured to receive the group downlink data transmitted immediately following the beacon frame which include the DTIM based on the bitmap information.

7. The wireless communication terminal of claim 6, wherein the processor is further configured to maintain the awake state based on the bitmap information at least from an expected reception time at which reception of the beacon frame is expected according to the second predetermined reception period to a time at which at least part of the group downlink data is received from the base wireless communication terminal.

8. The wireless communication terminal of claim 1,
   wherein the processor is configured to maintain the doze state at least for a predetermined time from the expected reception time before receiving the wake-up frame.

9. A method of operating a wireless communication terminal that communicates wirelessly, the method comprising:
   receiving a wake-up frame which includes an indicator triggers to receive a delivery traffic indication map (DTIM) modulated by a second modulation method from a base wireless communication terminal;
   determining an expected reception time at which a reception of a beacon frame which includes the DTIM is expected among a plurality of reception times at which a reception of a beacon frame is expected, based on a predetermined reception period of the beacon frame which includes the DTIM and the indicator, wherein the predetermined reception period of the beacon frame which includes the DTIM is an integral multiple of a predetermined reception period of the beacon frame,
   transitioning from a doze state to an awake state to be in the awake state at least before the expected reception time at which the reception of the beacon frame which includes the DTIM,
   receiving the beacon frame which includes the DTIM from the base wireless communication terminal using a first modulation method different from the second modulation method after transitioning, and
   receiving a group downlink data transmitted subsequently to the received beacon frame which includes the DTIM, and transmitted to a group of a plurality of wireless communication terminals comprising the wireless communication terminal, from the base wireless communication terminal using the first modulation method when the group downlink data is present, wherein the awake state represents a state in which transmission and reception using the first modulation method are capable, and the doze state represents a state in which transmission and reception using the first modulation method are not capable, wherein the wake-up frame is a frame modulated by the second modulation method, and wherein the beacon frame is a frame modulated by the first modulation method and transmitted periodically.

10. The method of claim 9, further comprises maintaining the awake state at least for a predetermined time from the expected reception time.

11. The method of claim 9, wherein the group downlink data indicates downlink data whose receiver address is a group address.

12. The method of claim 9, further comprising maintaining the doze state at least for a predetermined time from the expected reception time before receiving the wake-up frame.

\* \* \* \* \*